United States Patent
Narla et al.

(10) Patent No.: US 11,201,496 B2
(45) Date of Patent: Dec. 14, 2021

(54) ENERGY CONTROL SYSTEM

(71) Applicant: SunPower Corporation, San Jose, CA (US)

(72) Inventors: Sandeep Narla, Newark, CA (US); Brian Kuhn, Austin, TX (US); Kevin C. Fischer, Orinda, CA (US); Udo Uebel, San Francisco, CA (US); Marc A. Robinson, Cedar Park, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 16/811,832

(22) Filed: Mar. 6, 2020

(65) Prior Publication Data

US 2020/0336002 A1 Oct. 22, 2020

Related U.S. Application Data

(60) Provisional application No. 62/903,526, filed on Sep. 20, 2019, provisional application No. 62/884,808, (Continued)

(51) Int. Cl.
*H02J 9/06* (2006.01)
*H02J 3/38* (2006.01)
(Continued)

(52) U.S. Cl.
CPC .............. *H02J 9/06* (2013.01); *B60L 8/003* (2013.01); *B60L 50/60* (2019.02); *B60L 50/66* (2019.02);
(Continued)

(58) Field of Classification Search
CPC ...... H02J 7/0013; H02J 2310/12; H02J 3/004; H02J 7/007; H02J 9/062; H02J 2300/20;
(Continued)

(56) References Cited

U.S. PATENT DOCUMENTS 10,466,282 B2 * 11/2019 Uebel ................. H02J 13/0079
2014/0361725 A1 12/2014 Nishikawa et al.
(Continued)

FOREIGN PATENT DOCUMENTS

EP 3351422 A1 7/2018
EP 3358694 A1 8/2018

OTHER PUBLICATIONS

Eaton "Eaton, Powering Business Worldwide", Energy management circuit breakers, www.eaton.com/emcb/help, https://eaton-emcb.com/help, Sep. 24, 2018, 2 pages.
(Continued)

*Primary Examiner* — Jared Fureman
*Assistant Examiner* — Duc M Pham
(74) *Attorney, Agent, or Firm* — Sterne, Kessler, Goldstein & Fox P.L.L.C.

(57) ABSTRACT

The present disclosure provides energy control systems for whole home and partial home backup with integrated breaker spaces and metering. The energy control system includes a grid interconnection electrically coupled to a utility grid, a backup power interconnection electrically coupled to a backup power source, a backup load interconnection electrically coupled to at least one backup load, and a non-backup load interconnection electrically coupled to at least one non-backup load. The energy control system includes a microgrid interconnection device that switches between an on-grid mode to electrically connect the grid interconnection and the backup power interconnection with the backup and non-backup load interconnections and a
(Continued)

backup mode to electrically disconnect the grid interconnection and the non-backup load interconnection from the backup power interconnection.

22 Claims, 48 Drawing Sheets

Related U.S. Application Data filed on Aug. 9, 2019, provisional application No. 62/836,494, filed on Apr. 19, 2019.

(51) Int. Cl.
| | |
|---|---|
| *H02J 7/00* | (2006.01) |
| *H02J 3/00* | (2006.01) |
| *B60L 50/60* | (2019.01) |
| *B60L 53/51* | (2019.01) |
| *B60L 53/60* | (2019.01) |
| *B60L 58/12* | (2019.01) |
| *B60L 8/00* | (2006.01) |
| *B60L 58/18* | (2019.01) |

(52) U.S. Cl.
CPC ............... *B60L 53/51* (2019.02); *B60L 53/60* (2019.02); *B60L 58/12* (2019.02); *H02J 3/004* (2020.01); *H02J 3/381* (2013.01); *H02J 7/007* (2013.01); *H02J 7/0013* (2013.01); *H02J 7/0048* (2020.01); *B60L 58/18* (2019.02); *H02J 2300/24* (2020.01)

(58) Field of Classification Search
CPC .......... B60L 50/66; B60L 8/003; B60L 53/60; B60L 58/18; Y02E 10/56
See application file for complete search history.

(56) References Cited

U.S. PATENT DOCUMENTS

| | | | |
|---|---|---|---|
| 2018/0037121 A1* | 2/2018 | Narla | B60L 53/00 |
| 2018/0054064 A1* | 2/2018 | Narla | H02J 3/383 |
| 2018/0233914 A1 | 8/2018 | Miki et al. | |
| 2019/0081458 A1* | 3/2019 | Lapushner | H01R 33/94 |

OTHER PUBLICATIONS

"LynTec RS-232 Controlled Panels and Load Centers", Motorized Breakers Make Control Easy, www.LynTec.com, 9 pages.
SolarEdge Technologies Inc. "EV Charging Single Phase Inverter for North America", Optimized installation with HD-Wave technology and EV Charger, solaredge.com, 3 pages.
Leviton Manufacturing Co., Inc., Leviton Manufacturing of Canada ULC, "The Leviton Load Center", The Future Made Current, Smart Circuit Breakers, www.leviton.com/loadcenter, 16 pages.
Extended European Search Report issued in European Patent Application No. 20170094.5, dated Jun. 18, 2020, 8 pages.

* cited by examiner

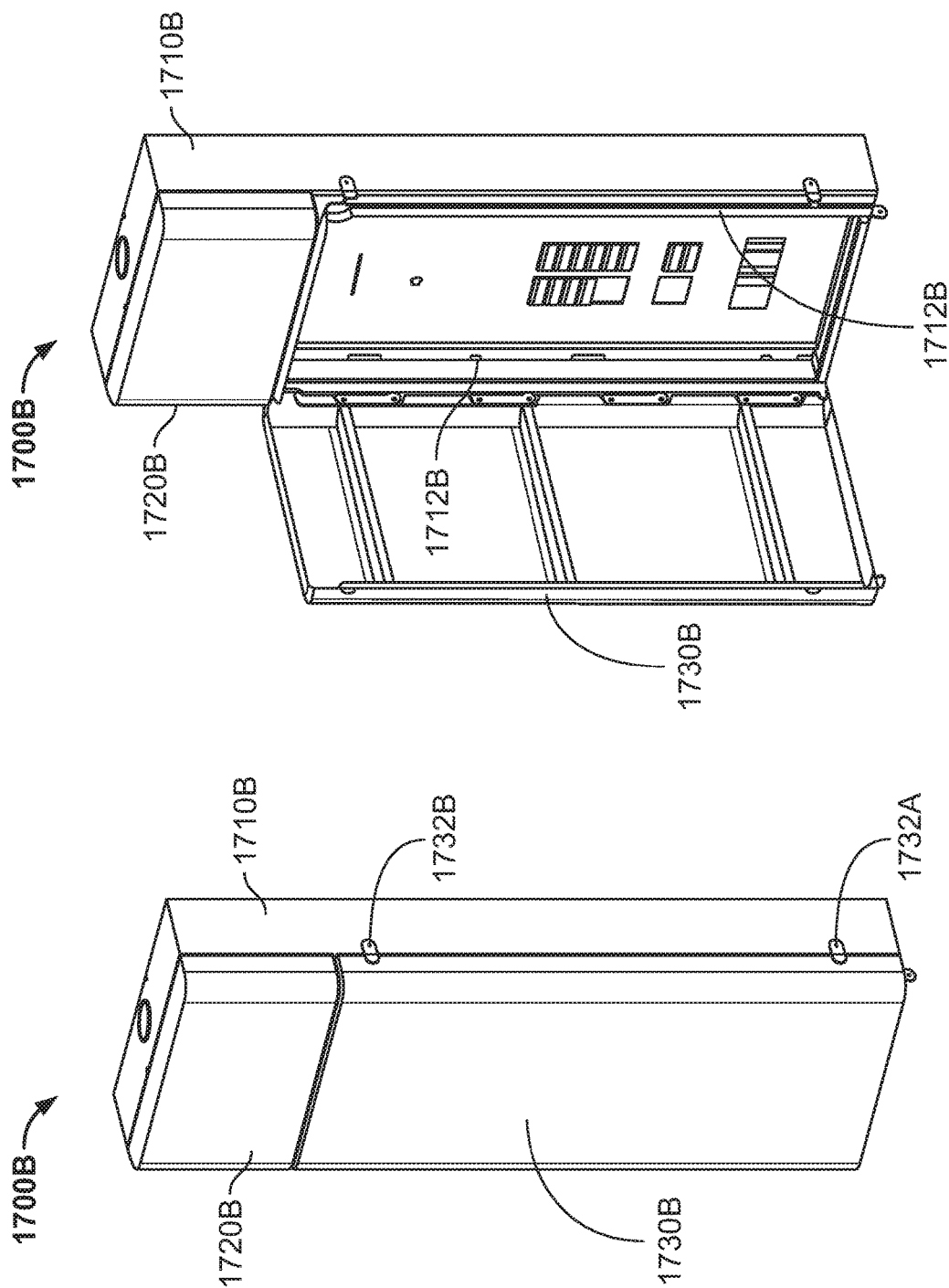

ENERGY CONTROL SYSTEM

CROSS-REFERENCE TO RELATED APPLICATIONS AND INCORPORATION BY REFERENCE

This application claims priority to U.S. Provisional Patent Application No. 62/836,494, filed on Apr. 19, 2019; U.S. Provisional Patent Application No. 62/884,808, filed Aug. 9, 2019; U.S. Provisional Patent Application No. 62/903,526, filed Sep. 20, 2019; which are incorporated by reference herein in their entirety for all purposes.

FIELD

The present disclosure relates to energy control systems. In particular, embodiments relate to energy control systems for solar electric systems, for example, solar electric systems for residential buildings.

BACKGROUND

Some existing energy control systems may only offer partial home backup and may require the user to select loads to wire to a separate load panel that are powered through the inverter at all times. Other systems provide whole home and partial home backup through a central disconnect, but require multiple subpanel boxes and have limited controls. Furthermore, existing systems do not offer flexibility in energy system sizing and load management. Therefore, there is a need for an energy control system that offers the advantages of the features and functionalities of the present disclosure.

BRIEF SUMMARY

The present disclosure provides energy control systems for whole home and partial home backup with integrated breaker spaces and metering. In order to provide both whole home and partial home backup and to provide more advanced control application functionality to customers with two types of service panels (meter integrated and meter separated), the systems described herein have unique hardware features and software functionalities. For example, in some embodiments, the system may provide a separated and metered generation (PV and Storage) panel and breaker spaces. In some embodiments, the system may provide a separated, metered, and controllable essential load panel and breaker spaces. In some embodiments, the system may provide a separated and controllable non-backup load panel and breaker spaces. In some embodiments, the system may provide metered and controllable electrical vehicle ("EV") charger integration. In some embodiments, the system may provide for docking of a standard utility electric meter, for example, on the enclosure. In some embodiments, the system may provide for two, three, four, or more electric meters which allow for electric metering at various locations in the system. In some embodiments, the system may provide a central disconnect for a building (e.g., a house, apartment building, condominium, or multi-dwelling unit), to serve both whole home and partial home backup. In some embodiments, the system may provide for direct PV Smart Controls for optimal AC storage pairing in backup mode. Advantages of these features include, but are not limited to, advanced control options, reduced need for separate subpanels (e.g., for generation, essential loads, and large non-backup loads), increased flexibility and simplicity during installation, reduced installation time and cost, a more aesthetically pleasing design, and reduced cost to the end-user.

In some embodiments, an energy control system includes a microgrid interconnection device, a non-backup load interconnection, a backup load interconnection, and a photovoltaic interconnection. In some embodiments, the non-backup load interconnection, the backup load interconnection, and the photovoltaic interconnection may be electrically coupled to the microgrid interconnection device. In some embodiments, the energy control system may include a remotely-controllable electrical switch, and the remotely-controllable electrical switch may be electrically coupled to the backup load interconnection. In some embodiments, the energy control system may include an electric vehicle charger system, and the electric vehicle charger system may be electrically coupled to the backup load interconnection.

In some embodiments, an energy control system includes a grid interconnection electrically coupled to a utility grid, a backup power interconnection electrically coupled to a backup power source, a backup load interconnection electrically coupled to at least one backup load, and a non-backup load interconnection electrically coupled to at least one non-backup load. In some embodiments, the energy control system includes a microgrid interconnection device electrically coupled to the grid interconnection, the storage interconnection, the backup load interconnection, and the non-backup load interconnection. In some embodiments, the energy control system includes a controller in communication with the microgrid interconnection device. In some embodiments, the microgrid interconnection device is configured to switch between: (1) an on-grid mode electrically connecting the grid interconnection and the backup power interconnection to the backup and non-backup load interconnections, and (2) a backup mode electrically disconnecting the grid interconnection and the non-backup load interconnection from the storage interconnection.

In some embodiments, the controller is configured to detect a power outage at the grid interconnection, and upon detecting the power outage, the controller is configured to switch the microgrid interconnection device from the on-grid mode to the backup mode. In some embodiments, the controller is configured to detect a voltage restoration at the grid interconnection, and upon detecting the voltage restoration, the controller is configured to switch the microgrid interconnection device from the backup mode to the on-grid mode.

In some embodiments, the backup load interconnection includes a plurality of remotely-controllable switches electrically coupled to a plurality of backup loads. In some embodiments, each of the remotely-controllable switches is configured to switch between: (1) a closed position electrically connecting a respective backup load to the microgrid interconnection device, and (2) an open position electrically disconnecting the respective backup load from the microgrid interconnection device. In some embodiments, the controller is in communication with the plurality of remotely-controllable switches, and upon detecting the power outage at the grid interconnection, the controller is configured to switch one or more of the plurality of remotely-controllable switches from the closed position to the open position. In some embodiments, the controller switches the one or more remotely-controllable switches according to one or more programmed rules. In some embodiments, the one or more programmed rules are based on electronic data indicating energy and/or power consumption by the respective backup loads. In some embodiments, the controller is in communication with a user device, and upon receiving an input from the user device, the controller is configured to switch one or more remotely-controllable switches from the open position to the closed position or from the closed position to the open position.

In some embodiments, the backup load interconnection includes an electric vehicle charging port configured to charge electrical energy through the backup load interconnection to an electric vehicle and discharge electrical energy from the electric vehicle to the backup load interconnection. In some embodiments, the controller is in communication with the electric vehicle charging port, and upon detecting a power outage at the grid interconnection, the controller is configured to actuate the electric vehicle charging port to discharge electrical energy from the electric vehicle to the backup load interconnection.

In some embodiments, the backup power source includes a photovoltaic (PV) power generation system, and the backup power interconnection is configured to receive electrical energy generated by the PV power generation system. In some embodiments, the backup power source includes an energy storage system, and the backup power interconnection is configured to receive electrical energy discharged from the energy storage system.

In some embodiments, the energy control system includes an enclosure housing the grid interconnection, the backup power interconnection, the backup load interconnection, the non-backup load interconnection, the microgrid interconnection device, and the controller. In some embodiments, the energy control system includes an overcurrent protection device electrically disposed between the grid interconnection and the microgrid interconnection device.

In some embodiments, an electrical system includes a power generation system configured to generate electrical energy and an energy storage system configured to store electrical energy generated by the power generation system. In some embodiments, the electrical system includes an energy control system in communication with the power generation system and the energy storage system. In some embodiments, the energy control system includes a controller configured to receive electronic data from the energy storage system and configured to transmit a command to the power generation system to adjust a power output of the power generation system based on the electronic data from the energy storage system.

In some embodiments, the electronic data from the energy storage system indicates an available storage capacity of the energy storage system. In some embodiments, the available storage capacity corresponds to a difference between a total storage capacity and a current state of charge of the energy storage system. In some embodiments, the command transmitted by the controller indicates a desired power output of the power generation system corresponding to the available storage capacity of the energy storage system.

In some embodiments, the power generation system includes at least one power generation array having a photovoltaic (PV) panel array including one or more PV panels configured to generate electrical energy and a converter configured to adjust a power output of the PV panel array and the one or more PV panels. In some embodiments, the converter is configured to receive the command transmitted by the controller, and upon receiving the command, adjust the power output of the PV panel array such that the power output of the power generation system is adjusted according to the command. In some embodiments, the converter is configured to adjust the power output of the PV panel array by selectively enabling or disabling a corresponding PV panel array. In some embodiments, the converter is configured to adjust the power output of the PV panel array by adjusting a frequency of a power output of the PV panel array. In some embodiments, the controller determines a predicted power output of the power generation system based on a forecasted PV generation by the plurality of power generation arrays.

In some embodiments, the energy control system includes a load interconnection electrically coupled to a plurality of loads configured to consume electrical energy. In some embodiments, the energy control system is configured to receive electrical energy from the power generation system and the energy storage system. In some embodiments, the energy control system is configured to distribute the received electrical energy to the plurality of loads through the load interconnection. In some embodiments, the controller is configured to receive electronic data indicating an energy and/or power demand associated with the plurality of loads. In some embodiments, the energy demand is based on recorded data from detected energy consumption by at least one load of the plurality of loads. In some embodiments, the command transmitted by the controller indicates a desired power output of the power generation system corresponding to a sum of the energy demand associated with the plurality of loads and the available storage capacity of the energy storage system.

In some embodiments, an electrical system includes an energy control system. In some embodiments, the electrical system includes a photovoltaic (PV) power generation system electrically connected to the energy control system, and the PV power generation system is configured to generate electrical energy. In some embodiments, the electrical system includes an energy storage system electrically connected to the energy control system. In some embodiments, the energy storage system includes one or more energy storage units that are all interconnected on an AC terminal electrically coupled to the energy control system. In some embodiments, each storage unit includes a battery (e.g., a group of batteries) configured to be charged by the electrical energy generated by the power generation system and configured to discharge electrical energy to the energy control system. In some embodiments, each storage unit includes a storage converter (e.g., a bi-directional converter) configured to adjust a charging rate and a discharging rate of the battery. In some embodiments, the energy control system includes a controller configured to receive electronic data from the PV power generation system, the energy storage system, or both. In some embodiments, the controller is configured to transmit a command to the storage converter of at least one energy storage unit to adjust the charging rate or discharging rate of the battery.

In some embodiments, the command transmitted by the controller sets each battery of the one or more energy storage units at an equal charging rate or discharging rate.

In some embodiments, the electronic data indicates a predicted amount of electrical energy generated by the PV power generation system. In some embodiments, the command transmitted by the controller adjusts the charging rate or discharging rate of the battery based on the predicted amount of electrical energy generated by the PV power generation system. In some embodiments, the predicted amount of electrical energy generated by the PV power generation system is based on a weather forecast. In some embodiments, the predicted amount of electrical energy generated by the PV power generation system is based on prior generation information across a week or month or year.

In some embodiments, the electronic data indicates that a current state of charge of the battery has reached an upper threshold, and the command transmitted by the controller decreases the charging rate of the battery. In some embodiments, the upper threshold is in the range from approximately 90% to approximately 99% of a maximum battery storage capacity.

In some embodiments, the electronic data indicates that the current state of charge of the battery has reached a lower threshold, and the command transmitted by the controller decreases the discharging rate of the battery. In some embodiments, the lower threshold is in the range from approximately 1% to approximately 10% of a maximum battery storage capacity.

In some embodiments, the command transmitted by the controller indicates a state-of-charge mode, and upon receiving the command indicating the state-of-charge mode, the storage converter adjusts the charging rate or discharging rate of the battery to maintain the state of charge within a target state of charge. In some embodiments, the state-of-charge mode is a self-consumption mode, and the target state of charge in the self-consumption mode is in the range from approximately 1% to approximately 99% of a maximum battery storage capacity. In some embodiments, the state-of-charge mode is a backup mode, and the target state of charge in the backup mode is in the range from approximately 5% to approximately 95% of a maximum battery storage capacity.

In some embodiments, the electrical control system includes a backup load interconnection electrically coupled to at least one backup load and a non-backup load interconnection electrically coupled to at least one non-backup load. In some embodiments, the controller is configured to receive load consumption data from the backup and non-backup load interconnections. In some embodiments, the controller is configured to transmit a command to the storage converter of at least one energy storage unit to adjust the charging rate or discharging rate of the battery based on the load consumption data.

In some embodiments, the load consumption data indicates a peak power consumption, and the command transmitted by the controller increases the discharging rate of the battery of at least one storage unit. In some embodiments, the load consumption data indicates an off-peak power consumption, and the command transmitted by the controller increases the charging rate of the battery of at least one storage unit.

In some embodiments, each of the energy storage units includes an enclosure housing the battery (e.g., a group of batteries) and the converter. In some embodiments, the enclosure includes a clamp configured to couple to the battery such that the battery is removably secured within the enclosure.

The present disclosure includes a method for controlling an energy control system having a grid interconnection, a backup load interconnection, a non-backup load interconnection, and a backup power interconnection. In some embodiments, the method includes a step of receiving electronic data from a plurality of backup loads. In some embodiments, the method includes a step of detecting a power outage at the grid interconnection electrically coupled to a utility grid. In some embodiments, the method includes a step of disconnecting the grid interconnection from the backup power interconnection, in which the backup power interconnection is electrically coupled to a backup power source. In some embodiments, the method includes a step of connecting a first set of the plurality of backup loads to the backup load interconnection, in which the backup load interconnection is electrically coupled to the backup power interconnection such that power is supplied from the backup power source to the first set of backup loads. In some embodiments, the first set of the plurality of backup loads is determined based on the electronic data from the plurality of backup loads.

In some embodiments, the method includes a step of disconnecting a second set of the plurality of backup loads from the backup load interconnection such that power is interrupted between the backup power source and the second set of backup loads.

In some embodiments, the second set of the plurality of backup loads is determined based on the electronic data from the plurality of backup loads.

In some embodiments, the electronic data indicates a detected power consumption and a usage time associated with each of the plurality of loads. In some embodiments, the electronic data includes data from a database defining a circuit load average associated with each of the plurality of loads with respect to discrete time blocks.

In some embodiments, the backup power source includes an electrical storage system. In some embodiments, the method includes a step of measuring a state of charge of the electrical storage system. In some embodiments, the first set of the plurality of backup loads is determined based on the measured state of charge of the electrical storage system. In some embodiments, a power load demand of the first set of the plurality of backup loads is less than the measured state of charge of the electrical storage system.

In some embodiments, the backup power source includes a photovoltaic (PV) power generation system. In some embodiments, the method includes a step of measuring a power output of the photovoltaic power generation system. In some embodiments, the first set of the plurality of backup loads is determined based on the measured power output of the photovoltaic power generation system. In some embodiments, a power load demand of the first set of the plurality of backup loads is less than the measured power output of the photovoltaic power generation system.

The present disclosure includes methods for controlling an energy control system having a grid interconnection electrically connected to a utility grid, a backup load interconnection configured to be selectively electrically connected to a plurality of backup loads, and a backup power interconnection electrically connected to a backup power source. In some embodiments, the method includes a step of detecting a power outage at the grid interconnection. In some embodiments, the method includes a step of connecting a first set of the plurality of backup loads to the backup load interconnection, in which the backup load interconnection is electrically coupled to the backup power interconnection such that power is supplied from the backup power source to the first set of backup loads. In some embodiments, the method includes a step of disconnecting a second set of the plurality of backup loads from the backup load connection such that power is interrupted between the backup power source and the second set of backup loads. In some embodiments, the method includes a step of receiving a request from a user device to connect at least one load of the second set of the plurality of backup loads to the backup load interconnection. In some embodiments, the user device is a portable computing device. In some embodiments, the method includes a step of determining whether to connect the at least one load of the second set of the plurality of backup loads to the backup load interconnection according to one or more programmed rules.

In some embodiments, the method includes a step of receiving electronic data from the plurality of backup loads.

In some embodiments, the first and second sets of the plurality of backup loads are determined based on the electronic data from the plurality of backup loads.

In some embodiments, the one or more programmed rules includes a step of determining an expected load demand associated with the at least one load of the second set of the plurality of backup loads and a step of comparing the expected load demand associated with the at least one load of the second set of the plurality of backup loads to an available power output of the backup power source. In some embodiments, the method includes a step of connecting the at least one load of the second set of the plurality of backup loads to the backup load interconnection based on the comparison between the expected load demand and the available power output of the backup power source. In some embodiments, the step of determining the expected load demand of the at least one load of the second set of the plurality of backup loads includes checking a database defining a circuit load average associated with each of the plurality of loads with respect to discrete time blocks.

In some embodiments, the backup power source is an electrical storage system, and the available power output is based on a measured state of charge of the electrical storage system. In some embodiments, the backup power source is a photovoltaic (PV) power generation system, and the available power output is based on a measured power output of the PV power generation system.

The present disclosure includes methods for controlling an electrical system having a power generation system, an energy storage system, and an energy control system, the energy control system electrically coupled to the power generation system, the energy storage system, and a plurality of loads. In some embodiments, the method includes a step of receiving electronic data from the power generation system, the energy storage system, the plurality of loads, or a combination thereof. In some embodiments, the method includes a step of determining a desired power output for the power generation system based on the received electronic data. In some embodiments, the method includes a step of determining an expected power output by the power generation system. In some embodiments, the method includes a step of comparing the expected power output to the desired power output to calculate a first adjustment to a power output of the power generation system. In some embodiments, the method includes a step of transmitting a first command indicating the first adjustment to the power generation system such that the power generation system adjusts the power output according to the first adjustment.

In some embodiments, the electronic data indicates a current state of charge and a total storage capacity of the energy storage system. In some embodiments, the desired power output corresponds to a difference between the total storage capacity and the current state of charge of the energy storage system.

In some embodiments, the electronic data indicates an energy demand associated with the plurality of loads. In some embodiments, the desired power output corresponds to the energy demand associated with the plurality of loads. In some embodiments, the energy demand is based on recorded data from detected energy consumption by the plurality of loads.

In some embodiments, the electronic data indicates an energy demand associated with the plurality of loads and a difference between a current state of charge and a total storage capacity of the energy storage system. In some embodiments, the desired power output corresponds to a sum of the energy demand associated with the plurality of loads and the difference between the current state of charge and the total storage capacity of the energy storage system.

In some embodiments, the power generation system includes a plurality of power generation arrays, each of the power generation arrays having a photovoltaic (PV) panel array configured to generate electrical energy and a converter configured to adjust a power output of the PV panel array. In some embodiments, the expected power output of the power generation system is determined based on a time of day, a weather forecast, a geographical location, a recorded power output by the power generation system, or any combination thereof. In some embodiments, the first command indicating the first adjustment is transmitted to at least one converter of the plurality of power generation arrays to enable or disable a corresponding PV panel array. In some embodiments, the first command indicating the first adjustment is transmitted to at least one converter of the plurality of power generation arrays to adjust a frequency of a power output of a corresponding PV panel array.

In some embodiments, the method includes a step of receiving power monitoring measurements indicating an actual power output of the power generation system. In some embodiments, the method includes a step of comparing the actual power output to the expected power output to calculate a second adjustment to the power output of the power generation system. In some embodiments, the method includes a step of transmitting a second command indicating the second adjustment to the power generation system such that the power generation system adjusts the power output according to the second adjustment.

In some embodiments, the second command indicates the second adjustment actuates the power generation system to increase the power output of the power generation system when the actual power output is lower than the estimated power output. In some embodiments, the second command indicates the second adjustment actuates the power generation system to decrease the power output of the power generation system when the actual power output is greater than the estimated power output.

In some embodiments, the method includes a step of exporting an excess power output generated by the power generation system through a utility interconnection of the energy control system, in which the utility interconnection is electrically coupled to a utility grid. In some embodiments, the excess power output corresponds to a difference between the actual power output and the expected power output.

In some embodiments, the method includes a step of exporting an excess power output generated by the power generation system to the energy storage system. In some embodiments, the excess power output corresponds to a difference between the actual power output and the expected power output.

In some embodiments, the method includes a step of exporting an excess power output generated by the power generation system to an electric vehicle battery through a backup load interconnection of the energy control system. In some embodiments, the excess power output corresponds to a difference between the actual power output and the expected power output.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

FIGS. 17B-17C illustrate an energy control system according to an embodiment.

The features and advantages of the embodiments will become more apparent from the detail description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Figure 1:
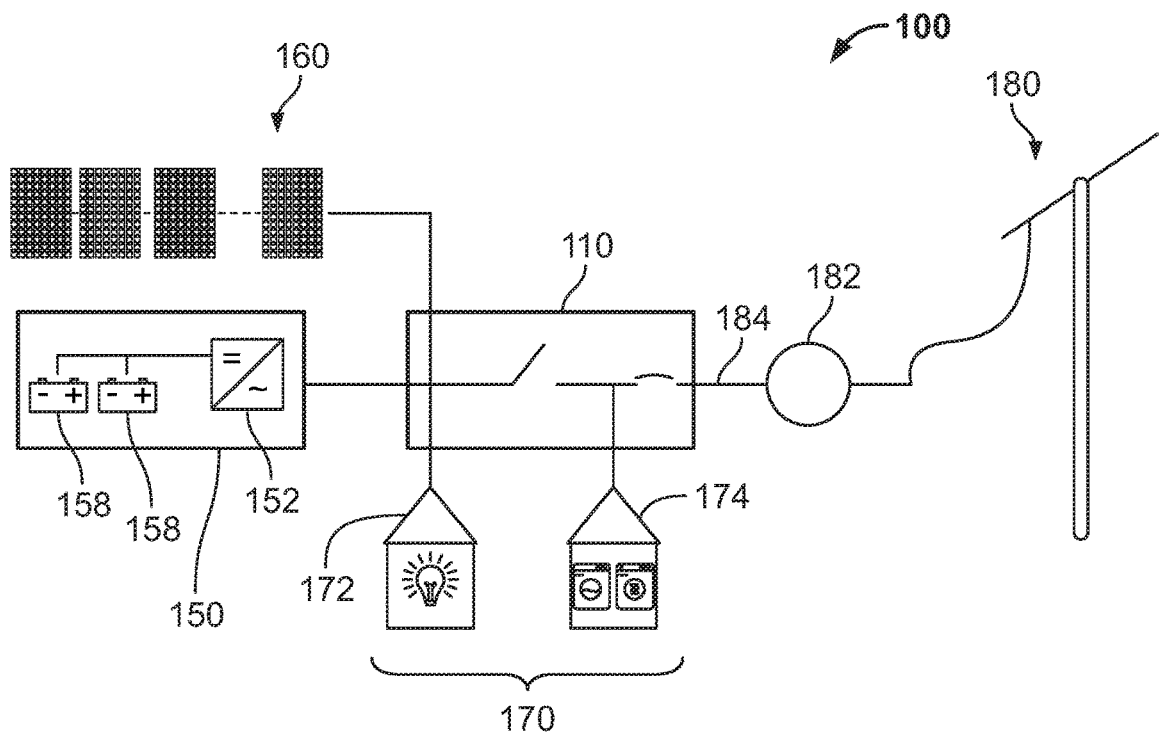
FIG. 1 illustrates an electrical system according to an embodiment.

FIG. 1 shows an electrical system 100 according to some embodiments. In some embodiments, electrical system 100 may include an energy control system 110 (e.g., "HUB+"). In some embodiments, energy control system 110 may control the flow of energy between an energy storage system 150, a photovoltaic ("PV") system 160, electrical grid power 180, and an electrical load 170. Energy control system 110 may include, for example, batteries 158 for storing energy and a converter (e.g., an inverter) 152 for converting direct current ("DC") to alternating current ("AC") or vice versa. In some embodiments, energy storage system 150 may be expandable, which is to say that additional energy storage (e.g., additional batteries 158) may be added to the system after initial installation. In some embodiments, photovoltaic system 160 may include, for example, one or more photovoltaic panels. In some embodiments, a plurality of photovoltaic panels may be disposed on a building, for example, a residential home, office building, storage facility, or the like. In some embodiments, photovoltaic system 160 may be an AC coupled system and may include micro-inverters. In some embodiments, photovoltaic system 160 may include one or more string inverters. In some embodiments, photovoltaic system 160 may include other devices and/or systems for converting direct current ("DC") to alternating current ("AC") or vice versa.

In some embodiments, energy control system 110 may include a grid interconnection 184 electrically coupled to grid power 180. In the context of the present disclosure, an interconnection includes any suitable electrical structure, such as a power bus, wiring, a panel, etc., configured to establish electrical communication between two set of circuits. In some embodiments, electrical system 100 may include an electrical meter 182 (e.g., "M"). In some embodiments, an electrical meter 182 may be electrically disposed between energy control system 110 and grid power 180 and may be used to measure and/or record the amount of electrical energy passing through the meter. In some embodiments, electrical meter 182 may measure and/or record the amount of electrical energy passing through the meter from grid power 180 to energy control system 110 and/or vice versa. Electrical load 170 may be, for example, one or more devices or systems that consume electricity. In some embodiments, electrical load 170 may include all or some of the electrical devices associated with a building. In some embodiments, electrical load 170 may include 240 volt loads. In some embodiments, electrical load 170 may include, for example, an electric range/oven, an air conditioner, a heater, a hot water system, a swimming pool pump, and/or a well pump. In some embodiments, electrical load 170 may include 120 volt loads. In some embodiments, electrical load 170 may include, for example, power outlets, lighting, networking and automation systems, a refrigerator, a garbage disposal unit, a dishwasher, a washing machine, a septic pump, and/or an irrigation system. In some embodiments, electrical load 170 may be separated into backup load 172 (e.g., one or more essential loads) and non-backup load 174 (e.g., one or more non-essential loads). In some embodiments, when electrical system 100 does not receive electricity from grid power 180 (e.g., during a power outage), backup load 172 may continue to receive power from energy storage system 150 and/or photovoltaic system 160, while non-backup load 174 does not receive power from energy storage system 150 or photovoltaic system 160.

Figure 2A:
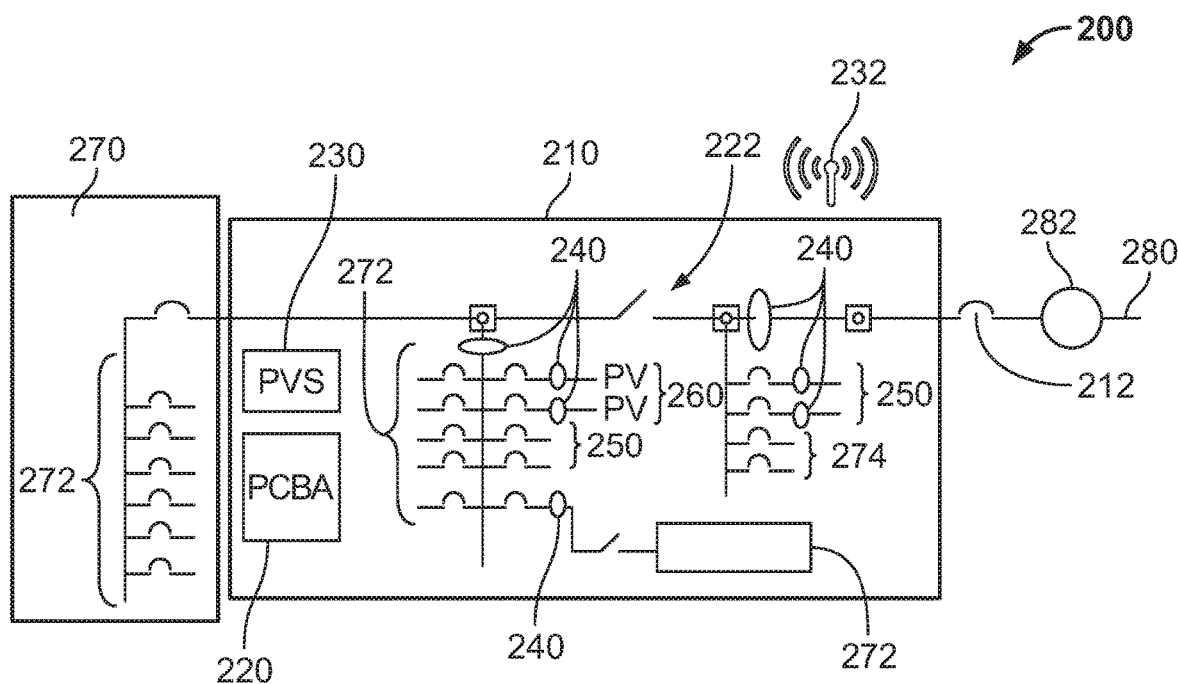
FIG. 2A illustrates an electrical system according to an embodiment.

FIG. 2A shows an electrical system 200 according to some embodiments. In some embodiments, energy control system 210 may be electrically disposed between grid power 280 and a main service panel 270. Main service panel 270 may, for example, distribute power to backup load 272 and may include overcurrent protection devices. In some embodiments, energy control system 210 may include a photovoltaic supervisory or monitoring system 230 (e.g., "PVS6") that monitors, for example, the status and/or performance of photovoltaic system 260. In some implementations, the photovoltaic supervisory or monitoring system 230 can further control or modify operation of the PV system and/or provide communication functions relating to PV operation. In some embodiments, photovoltaic supervisory or monitoring system 230 may include the same features of and operate in the same manner as the photovoltaic supervisor system described in U.S. patent application Ser. No. 14/810,423, filed Jul. 27, 2015, the disclosure of which is incorporated herein in its entirety by reference thereto.

In some embodiments, energy control system 210 may include what is referred to herein synonymously as a microgrid interconnection device and/or an automatic transfer and/or disconnect switch 222 (e.g., "MID" or "ATS" or "ADS"). Microgrid interconnection device as described herein may be, for example, any device or system that is configured to automatically connect circuits, disconnect circuits, and/or switch one or more loads between power sources. In some embodiments, microgrid interconnection device 222 may include any combination of switches, relays, and/or circuits to selectively connect and disconnect respective circuits electrically coupled to energy control system 210. In some embodiments, such switches may be automatic disconnect switches that are configured to automatically connect circuits and/or disconnect circuits. In some embodiments, such switches may be transfer switches that are configured to automatically switch one or more loads between power sources. In some embodiments, electrical system 200 may include a main overcurrent protection device 212 (e.g., "Primary OCPD") that is electrically disposed between grid power 280 and components of energy control system 210. In some embodiments, an electrical meter 282 may be electrically disposed between grid power 280 and energy control system 210. In some embodiments, energy control system 210 may receive power from photovoltaic system 260. In some embodiments, energy control system 210 may control the flow of power to and/or from energy storage system 250. In some embodiments, energy control system 210 includes one or more load meters 240 that monitor the flow of electricity between certain elements of the electrical system 200. In some embodiments, energy control system 210 may include ports for charging an electric vehicle (e.g., "EV Charger").

In some embodiments, energy control system 210 may include a controller 220 (e.g., "PCBA") that controls various operations of energy control system 210. For example, controller 220 may control, for example, microgrid interconnection device 222, energy storage system 250, photovoltaic system 260, a generator, and/or electric vehicle charging. In some embodiments, controller 220 may include a power supply, a MID controller that controls microgrid interconnection device 222, a communications module (e.g., for Ethernet, RS-485, controller area network (CAN), power line communication (PLC), Wi-Fi™, and/or cellular), a generator control that controls a generator (described in further detail below), and/or an external jump start connector. In some embodiments, energy control system 210 may communicate wirelessly (e.g., send and/or receive data) via a wireless communication module 232. In some embodiments, electrical system 200 may include backup loads 272 and non-backup loads 274. In some embodiments, backup loads 272 may receive power from energy storage system 250 when electrical system 200 does not receive electricity from grid power 280, while non-backup loads 274 may not receive power from energy storage system 250 when electrical system 200 does not receive electricity from grid power 280.

Figure 2B:
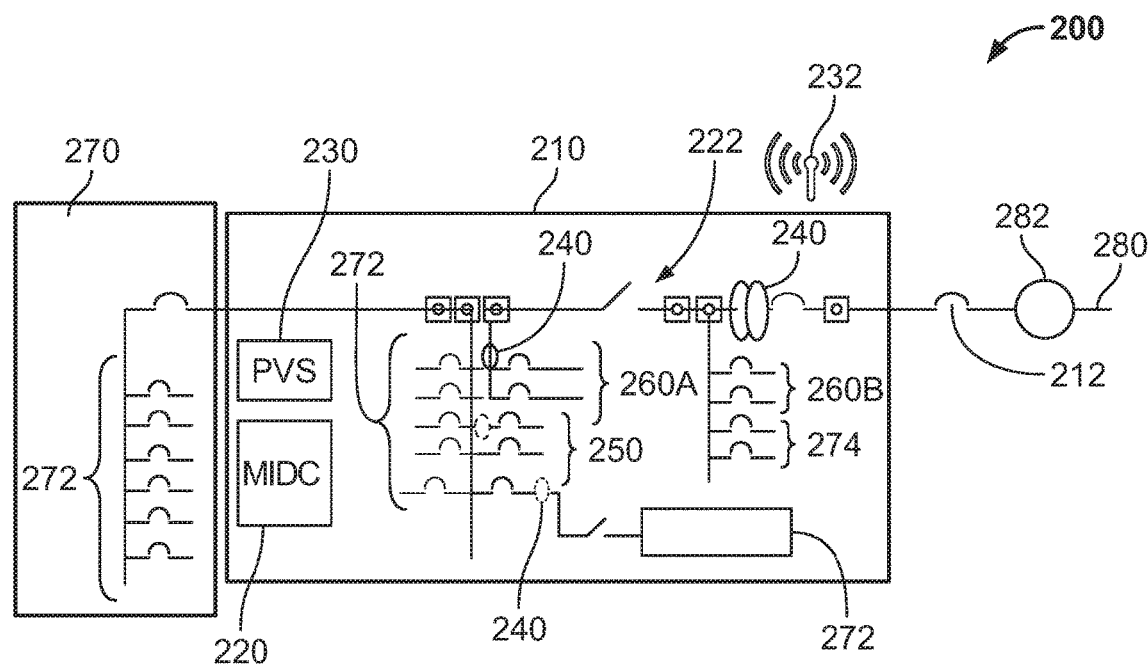
FIG. 2B illustrates an electrical system according to an embodiment.

FIG. 2B shows electrical system 200 in another configuration. Electrical system 200 as shown in FIG. 2B may include features and/or functionality similar to or the same as electrical system 200 described above with reference to FIG. 2A. With reference to FIG. 2A, in some embodiments, photovoltaic system 260 may be configured to provide power to backup loads 272 and non-backup loads 274 when microgrid interconnection device 222 is closed (set in on-grid mode), but may provide power only to backup loads 272 when microgrid interconnection device 222 is opened (set in backup mode, e.g., during a grid power outage). With reference to FIG. 2B, in some embodiments, portion 260A of photovoltaic system 260 may be configured to provide power to backup loads 272 and non-backup loads 274 when microgrid interconnection device 222 is closed, but may provide power only to backup loads 272 when microgrid interconnection device 222 is opened (set in backup mode, e.g., during a grid power outage). Further, portion 260B of photovoltaic system 260 may be configured to provide power to backup loads 272 and non-backup loads 274 when microgrid interconnection device 222 is closed (set in on-grid mode), but may not provide power to backup loads 272 when microgrid interconnection device 222 is opened (set in backup mode, e.g., during a grid power outage).

Figure 3:
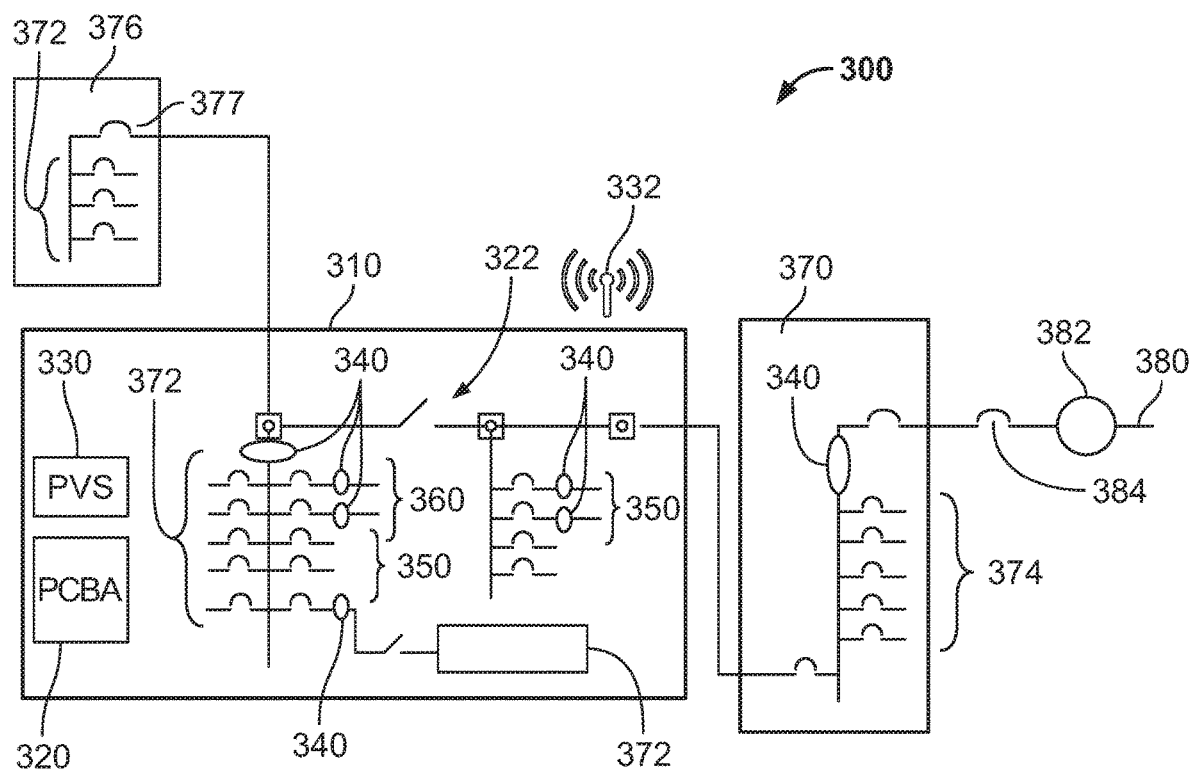
FIG. 3 illustrates an electrical system according to an embodiment.

FIG. 3 shows an electrical system 300 according to some embodiments. In some embodiments, energy control system 310 may be electrically disposed between main service panel 370 and backup loads 372. In some embodiments, electrical system 300 may include backup loads 372 and non-backup loads 374. In some embodiments, backup loads 372 may receive power from energy storage system 350 when electrical system 300 does not receive electricity from grid power 380, while non-backup loads 374 may not receive power from energy storage system 350 when electrical system 300 does not receive electricity from grid power 380. In some embodiments, backup loads 372 may be connected directly to ports in energy control system 310. In some embodiments, backup loads 372 may be connected to energy control system 310 via a sub panel 376. In some embodiments, a generator may be interconnected to energy control system 310 via sub panel 376. In some embodiments, sub panel 376 may include a main subfeed overcurrent protection device 377 that is electrically disposed between, for example, backup loads 372 and the source of power for sub panel 376. In some embodiments, electrical system 300 may include a main service panel 370. Main service panel 370 may, for example, distribute power to non-backup loads 374 and may include overcurrent protection devices. In some embodiments, main service panel 370 may be electrically interconnected to energy control system 310 and may include an overcurrent protection device that is electrically disposed between grid power 380 and energy control system 310.

In some embodiments, energy control system 310 may include a photovoltaic monitoring system 330 that monitors, for example, the status and/or performance of photovoltaic system 360. In some embodiments, photovoltaic monitoring system 330 may be electrically connected to and in communication with (directly or indirectly) energy storage system 350. In some embodiments, energy control system 310 may include a microgrid interconnection device 322. In some embodiments, main service panel 370 may be electrically disposed between grid power 380 and microgrid interconnection device 322. In some embodiments, an electrical meter 382 may be electrically disposed between grid power 380 and main service panel 370. In some embodiments, electrical system 300 may include a main overcurrent protection device 384 (e.g., "Primary OCPD") that is electrically disposed between grid power 380 and main service panel 370. In some embodiments, main overcurrent protection device 384 may be integrated into main service panel 370. In some embodiments, energy control system 310 may receive power from photovoltaic system 360. In some embodiments, energy control system 310 may control the flow of power to and/or from energy storage system 350. In some embodiments, energy control system 310 includes one or more load meters 340 that monitor the flow of electricity between certain elements of the electrical system 300. In some embodiments, main service panel 370 includes a load meter 340 that monitors the flow of electricity through main service panel 370. In some embodiments, energy control system 310 may include ports for charging an electric vehicle.

In some embodiments, energy control system 310 may include a controller 320 that controls various operations of energy control system 310. For example, controller 320 may control, for example, microgrid interconnection device 322, energy storage system 350, photovoltaic system 360, and/or electric vehicle charging. In some embodiments, controller 320 may include a power supply, a MID controller that controls microgrid interconnection device 322, a communications module (e.g., for Ethernet, RS-485, Wi-Fi, and/or cellular), a generator control that controls a generator (described in further detail below), and/or an external jump start connector. In some embodiments, energy control system 310 may communicate wirelessly (e.g., send and/or receive data) via a wireless communication module 332.

Figure 4A:
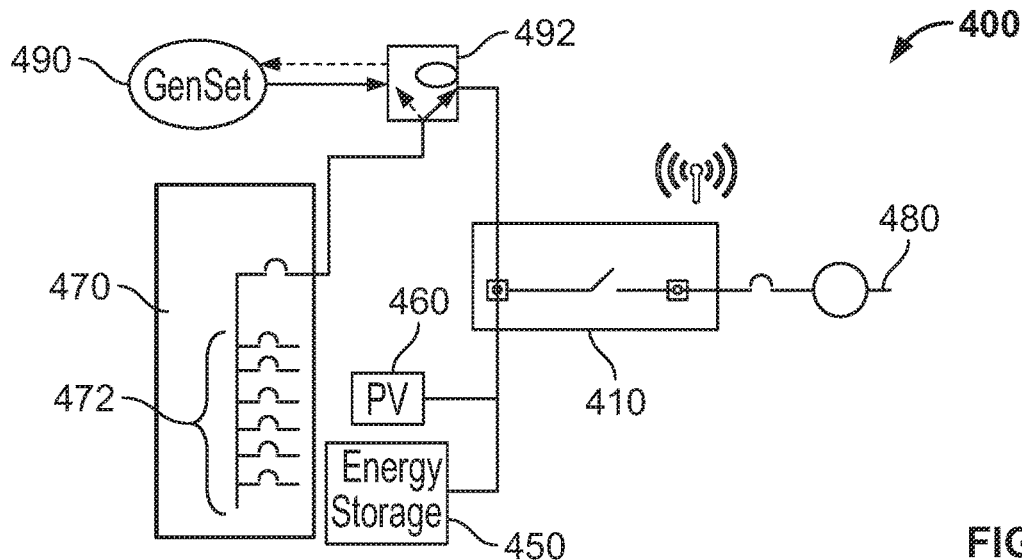
FIG. 4A illustrates an electrical system according to an embodiment.
Figure 4B:
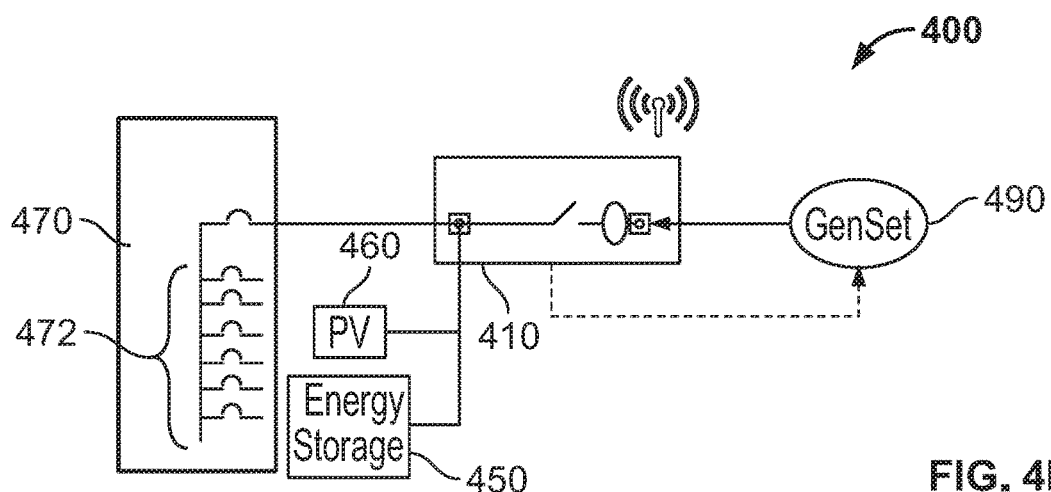
FIG. 4B illustrates an electrical system according to an embodiment.
Figure 4C:
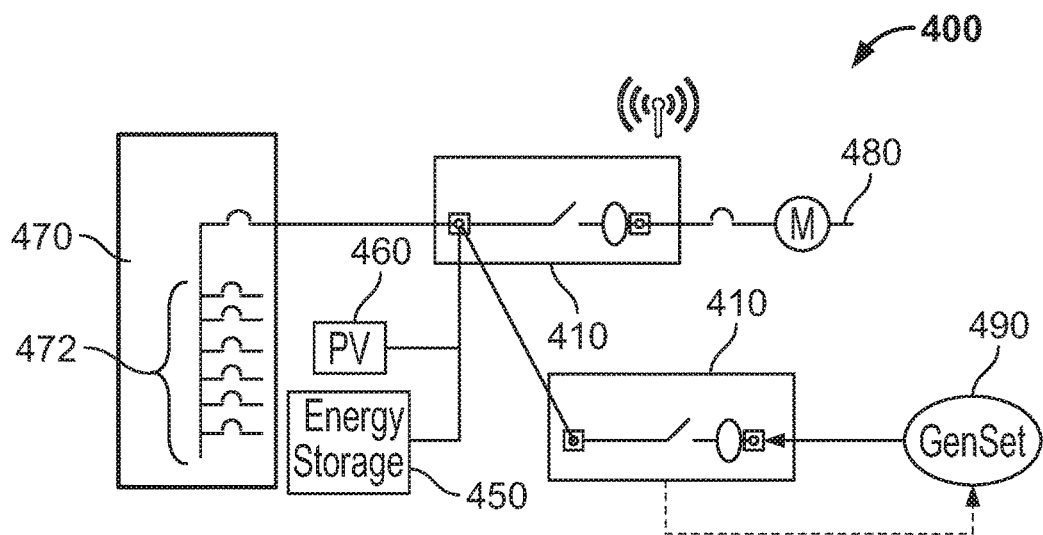
FIG. 4C illustrates an electrical system according to an embodiment.

FIGS. 4A-4C illustrate electrical system 400 according to some embodiments. As shown in FIGS. 4A-4C, in some embodiments, electrical system 400 may include a generator 490. Generator 490 may be, for example, powered by a fuel such as natural gas, propane, gasoline, oil, or the like. Generator 490 may be, for example, a portable generator (e.g., gas-powered), a standby generator, a home-backup generator, a smart generator, or the like. In some embodiments, electrical system 400 may include energy control system 410, which may receive power from photovoltaic system 460 and/or electrical grid 480. In some embodiments, electrical system 400 may include energy storage system 450. In some embodiments, energy control system 410 may control the flow of power to and/or from energy storage system 450. In some embodiments, electrical system 400 may include a microgrid interconnection device 492 that controls the flow of electricity between generator 490 and other components of electrical system 400. In some embodiments, electrical system 400 may include a main service panel 470 that distributes power to electrical loads 472.

Figure 5A:
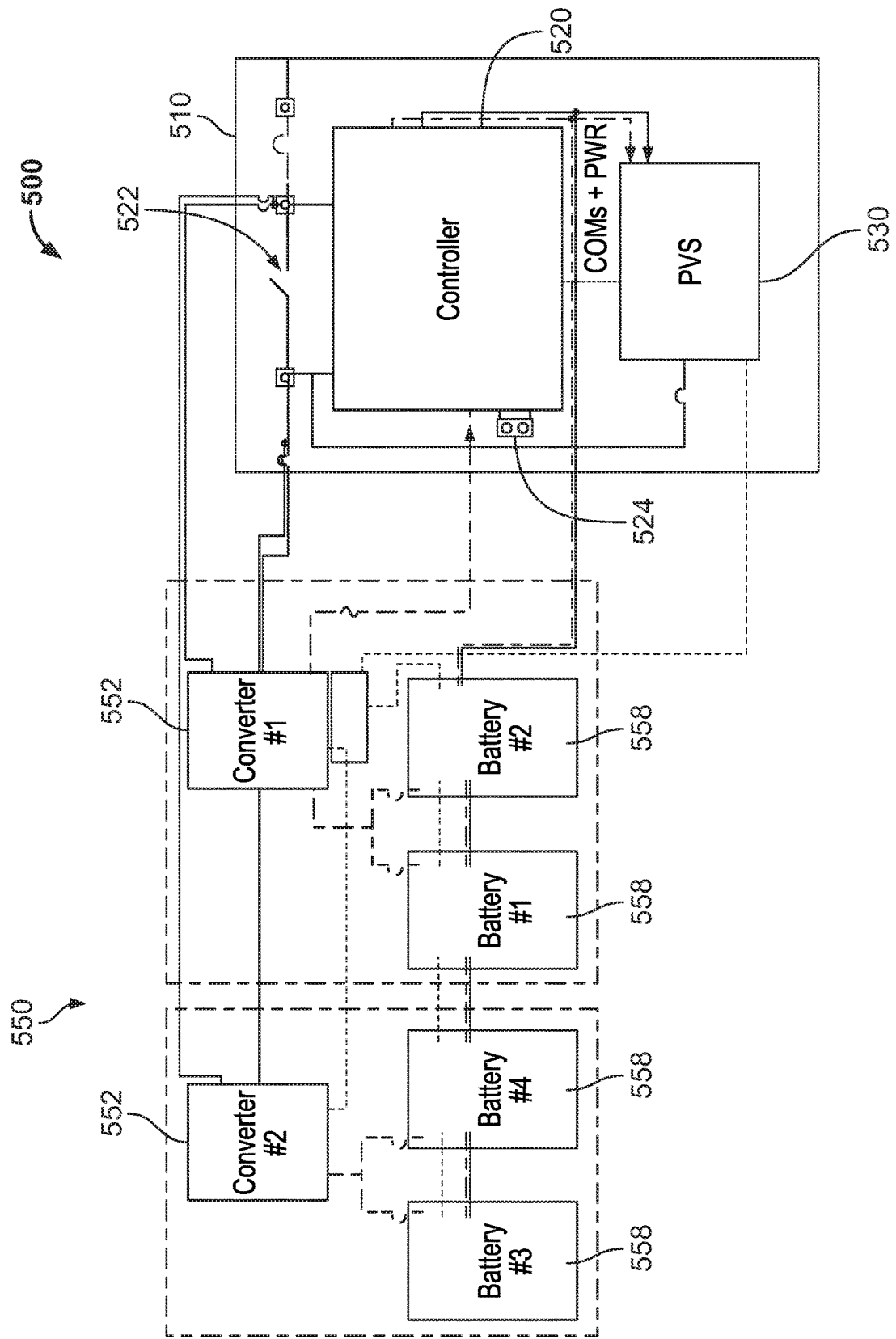
FIG. 5A illustrates an electrical system according to an embodiment.

FIG. 5A shows an electrical system 500, which may be used to control power from AC and DC, according to some embodiments. In some embodiments, electrical system 500 includes an energy control system 510. In some embodiments, energy control system 510 includes a controller 520. In some embodiments, energy control system 510 includes a microgrid interconnection device 522. In some embodiments, energy control system 510 includes a photovoltaic monitoring system 530. In some embodiments, electrical system 500 includes an energy storage system 550. In some embodiments, energy storage system 550 includes one or more converters 552. In some embodiments, energy storage system 550 includes one or more batteries 558. In some embodiments, electrical system 500 may be configured to allow an automatic "black start." In some embodiments, electrical system 500 may be configured to allow a manual jumpstart (e.g., a "black start," "dark start," or the like) using, for example, jumpstart terminals 524.

Figure 5B:
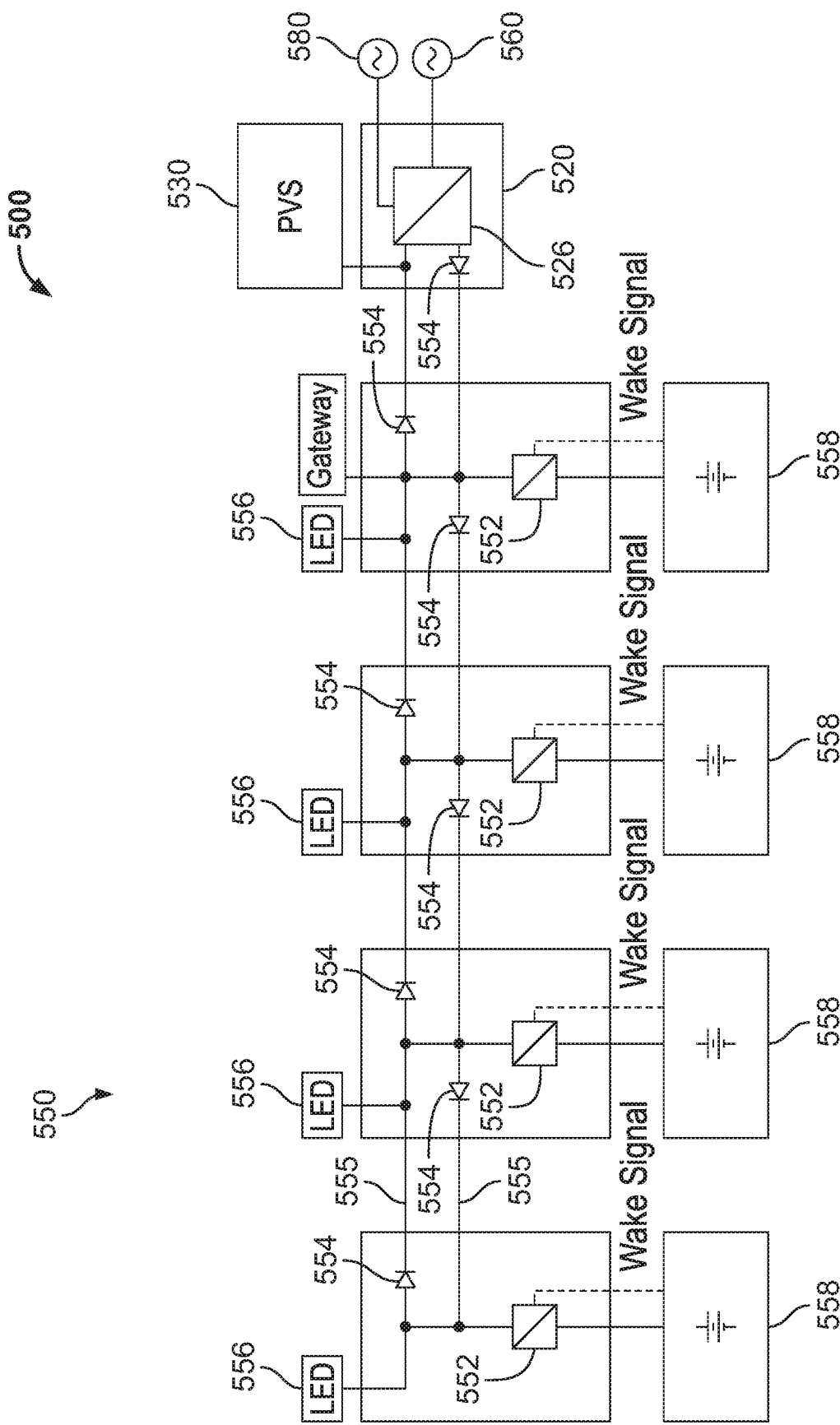
FIG. 5B illustrates an electrical system according to an embodiment.

FIG. 5B shows another electrical system 500 according to some embodiments. In some embodiments, electrical system 500 may be configured to permit current flow in several directions (e.g., bidirectional) simultaneously between certain portions of electrical system 500. For example, in some embodiments, electrical system 500 may include parallel conductors 555 (e.g., electrical wires) that allow current to flow both from energy storage system 550 and to energy storage system 550 simultaneously. For example, in some embodiments, electrical system 500 may include parallel conductors 555 that allow current to flow between energy storage system 550 and controller 520 simultaneously. In some embodiments, the power flowing between energy storage system 550 and controller 520 is DC power (e.g., 12V DC).

In some embodiments, parallel conductors 555 may allow current to simultaneously flow to, from, and between certain portions of energy storage system 550. For example, in some embodiments, parallel conductors 555 may allow current to simultaneously flow to, from, and/or between one or more converters 552 of energy storage system 550. Likewise, in some embodiments, parallel conductors 555 may allow current to simultaneously flow to, from, and/or between one or more batteries 558 of energy storage system 550. In some embodiments, parallel conductors 555 may include one or more flow control devices 554 that each conducts current primarily in one direction. Flow control devices 554 may be, for example, diodes, semiconductor diodes, thermionic diodes, vacuum tubes, or other devices with asymmetric conductance. In this manner, flow control devices 554 may limit the flow of current through parallel conductors 555 to one direction.

In some embodiments, current may flow from controller 520 to converters 552, and also between converters 552, simultaneously. Similarly, current may flow from controller 520 to batteries 558, and also between batteries 558, simultaneously. During a system startup, for example, power from energy storage system 550 may be used to initiate controller 520 and/or inverter 526. Since power may also flow from controller 520 to energy control system 550, however, power from grid 580, power generation system 560, and/or a jumpstart battery (e.g., via jumpstart terminals 524 of FIG. 5A) may also be used to initiate converters 552. In some embodiments, power shared between certain portions of electrical system 500 may be used to initiate other portions of energy control system 550 (e.g., photovoltaic monitoring system 530).

In some embodiments, controller 520 may be configured to communicate with energy storage system 550. For example, in some embodiments, controller 520 may be configured to control the state of energy storage system 550 (e.g., whether or not the system provides power to other portions of electrical system 500) or the state of portions of energy control system 550 (e.g., particular converters 552 and/or batteries 558). In some embodiments, converters 552 and/or batteries 558 may receive commands from controller 520 and may change their state (e.g., whether or not the converters and/or batteries provide power to other portion of electrical system 500) based on the commands received from controller 520. In some embodiments, batteries 558 may receive commands from converters 552 and may change their state (e.g., whether or not the batteries provide power to other portion of electrical system 500) based on the commands received from converters 552. In some embodiments, energy storage system 550 may include one or more status indicators 556 configured to communicate (e.g., to a homeowner or service technician) the state of energy storage system 550. In some embodiments, status indicators 556 may be lights (e.g., light emitting diodes) that are illuminated when portions of energy storage system 550 are energized.

Figure 6:
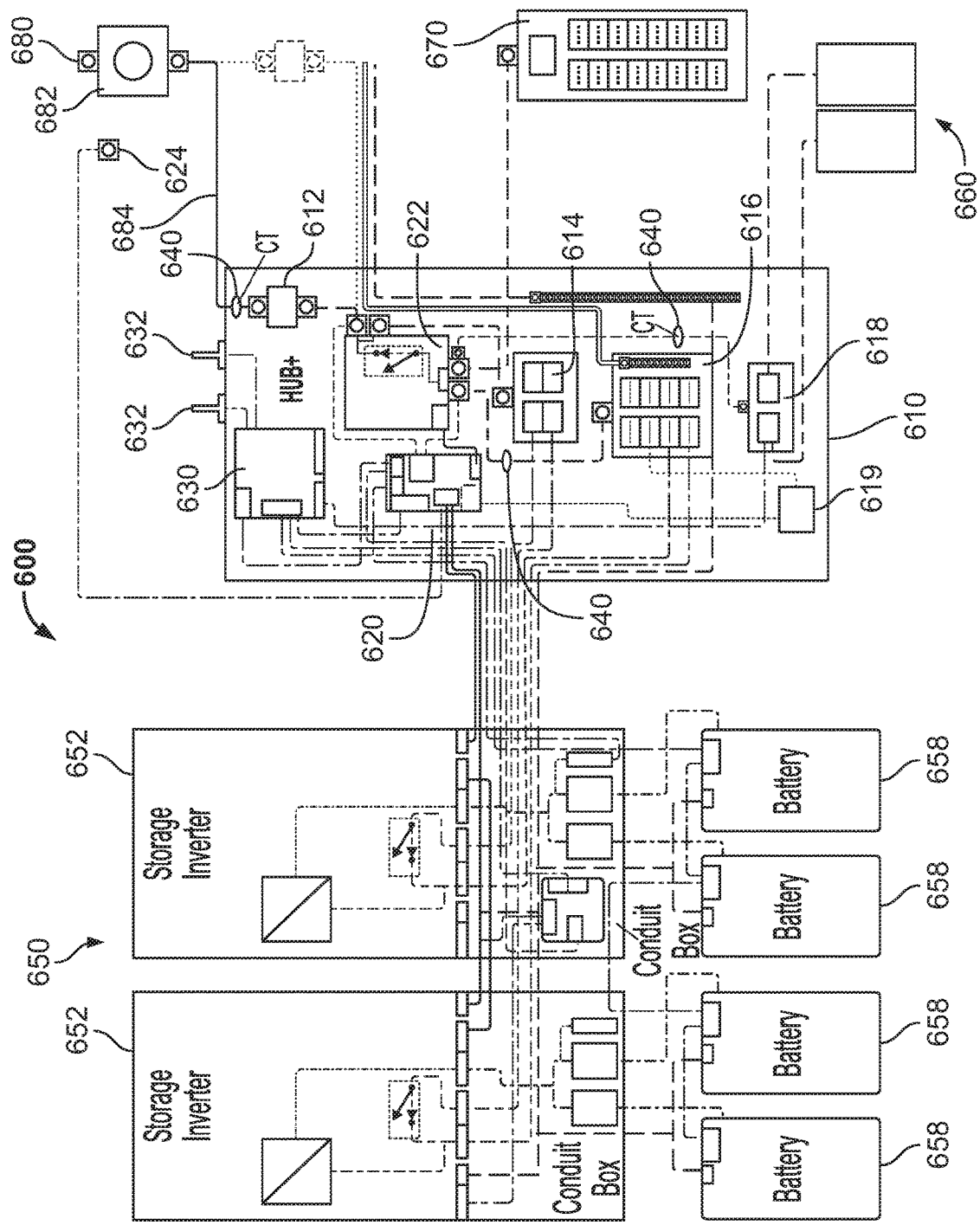
FIG. 6 illustrates an electrical system according to an embodiment.

FIG. 6 shows an electrical system 600 according to some embodiments. In some embodiments, electrical system 600 includes an energy control system 610. In some embodiments, energy control system 610 may include a grid interconnection 684 electrically coupled to a grid power 680. In some embodiments, energy control system 610 includes an overcurrent protection device 612 between grid power 680 and other components of energy control system 610. In some embodiments, energy control system 610 includes a non-backup load interconnection 614, a backup load interconnection 616, and/or a photovoltaic interconnection 618. In some embodiments, non-backup load interconnection 614 may be, for example, a non-backup load interconnection panel, service panel, sub-panel, or the like. In some embodiments, backup load interconnection 616 may be, for example, a backup load interconnection panel, service panel, sub-panel, or the like. In some embodiments, non-backup loads may be connected to energy control system 610 using non-backup load interconnection 614. In some embodiments, backup loads may be connected to energy control system 610 using backup load interconnection 616. In some embodiments, photovoltaic system 660 may be connected to energy control system 610 using photovoltaic interconnection 618. In some embodiments, energy control system 610 includes an electric vehicle connection 619. In some embodiments, an electrical vehicle may be connected to and charged using electric vehicle connection 619.

In some embodiments, energy control system 610 includes a controller 620. In some embodiments, energy control system 610 includes a microgrid interconnection device 622. In some embodiments, energy control system 610 includes a rapid shutdown switch 624. In some embodiments, rapid shutdown switch 624 may be an emergency shutdown switch. As described in further detail below, in some embodiments, rapid shutdown switch 624 may be configured to, for example, de-energize portions of photovoltaic system 660, energy storage system 650, and/or other portions of electrical system 600. In some embodiments, energy control system 610 includes a photovoltaic monitoring system 630. In some embodiments, photovoltaic monitoring system 630 includes one or more antennas 632 for sending and/or receiving data over a wireless network. In some embodiments, energy control system 610 includes one or more load meters 640 that monitor the flow of electricity through certain elements of electrical system 600. For example, a load meter 640 may monitor the flow of electricity from microgrid interconnection device 622 to backup load interconnection 616. A load meter 640 may monitor the flow of electricity from microgrid interconnection device 622 to photovoltaic interconnection 618. A load meter 640 may monitor the flow of electricity from grid power 680 to microgrid interconnection device 622. Other locations for load meters 640 are also contemplated.

In some embodiments, electrical system 600 includes an energy storage system 650. In some embodiments, energy storage system 650 includes one or more converters 652. In some embodiments, energy storage system 650 includes one or more batteries 658. In some embodiments, electrical system 600 includes a photovoltaic system 660. In some embodiments, electrical system includes a main service panel 670. In some embodiments, electrical system 600 includes a connection to grid power 680. In some embodiments, an electrical meter 682 may be electrically disposed between energy control system 610 and grid power 680.

Figure 7:
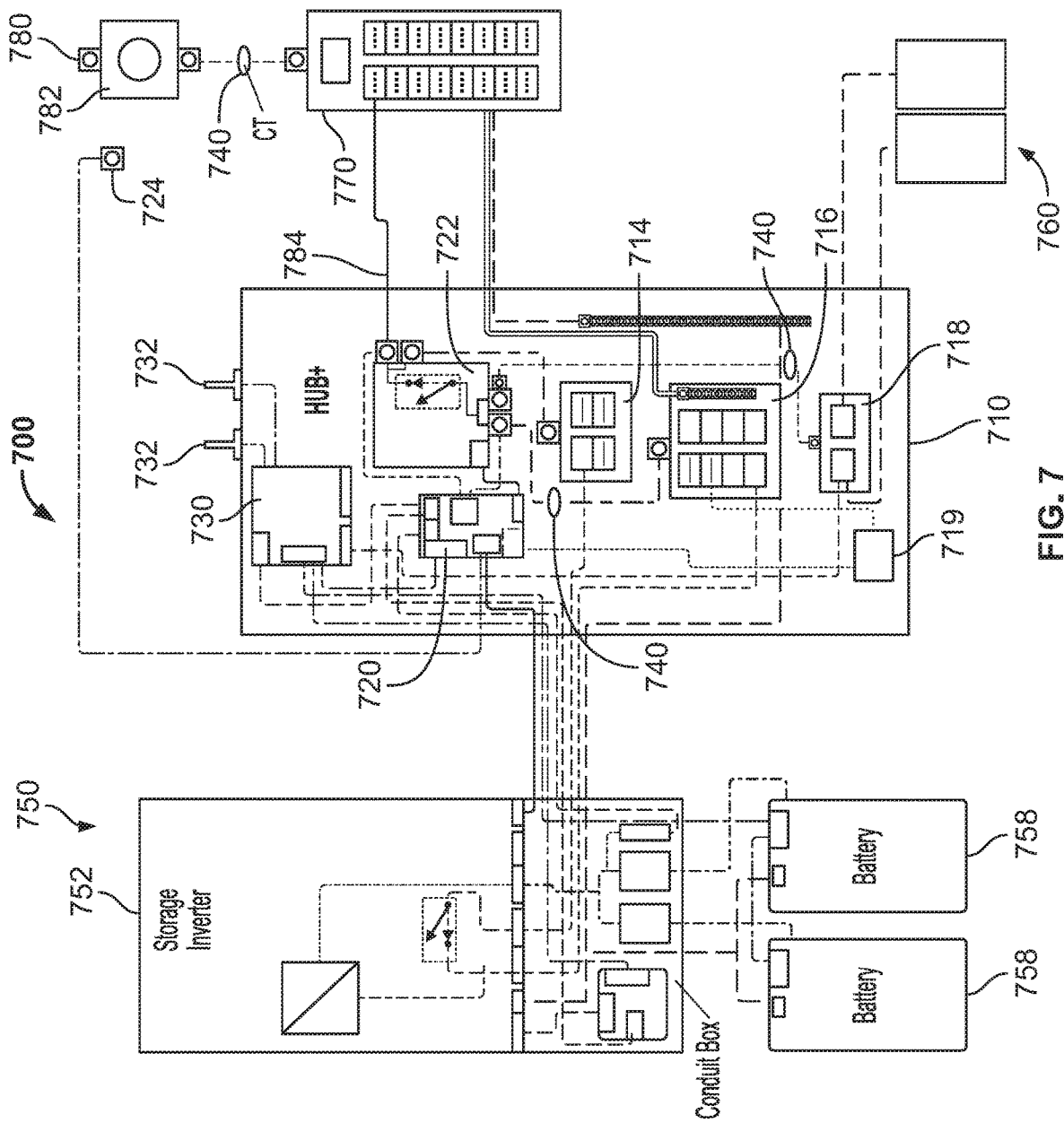
FIG. 7 illustrates an electrical system according to an embodiment.

FIG. 7 shows an electrical system 700 according to some embodiments. In some embodiments, electrical system 700 includes an energy control system 710. In some embodiments, energy control system 710 includes a non-backup load interconnection 714, a backup load interconnection 716, and/or a photovoltaic interconnection 718. In some embodiments, non-backup loads may be connected to energy control system 710 using non-backup load interconnection 714. In some embodiments, backup loads may be connected to energy control system 710 using backup load interconnection 716. In some embodiments, photovoltaic system 760 may be connected to energy control system 710 using photovoltaic interconnection 718. In some embodiments, energy control system 710 includes an electric vehicle connection 719. In some embodiments, an electrical vehicle may be connected to and charged using electric vehicle connection 719.

In some embodiments, energy control system 710 includes a controller 720. In some embodiments, energy control system 710 includes a microgrid interconnection device 722. In some embodiments, energy control system 710 includes a rapid shutdown switch 724. In some embodiments, energy control system 710 includes a photovoltaic monitoring system 730. In some embodiments, photovoltaic monitoring system 730 includes one or more antennas 732 for sending and/or receiving data over a wireless network. In some embodiments, energy control system 710 includes one or more load meters 740 that monitor the flow of electricity through certain elements of electrical system 700. For example, a load meter 740 may monitor the flow of electricity from microgrid interconnection device 722 to backup load interconnection 716. A load meter 740 may monitor the flow of electricity from microgrid interconnection device 722 to photovoltaic interconnection 718. A load meter 740 may monitor the flow of electricity from grid power 780 to main service panel 770. Other locations for load meters 740 are also contemplated.

In some embodiments, electrical system 700 includes an energy storage system 750. In some embodiments, energy storage system 750 includes one or more converters 752. In some embodiments, converters 752 may be connected in parallel to one another. In some embodiments, energy storage system 750 includes one or more batteries 758. In some embodiments, batteries 758 may be connected to converters 752 individually, serially, or in parallel. In some embodiments, electrical system 700 includes a photovoltaic system 760. In some embodiments, electrical system includes a main service panel 770. In some embodiments, electrical system 700 may include a connection to grid power 780. In some embodiments, energy control system 710 may include a grid interconnection 784 forming part of the connection to grid power 780 such that the energy control system 710 is electrically coupled to grid power 784. In some embodiments, an electrical meter 782 may be electrically disposed between energy control system 710 and grid power 780, for example, between grid power 780 and main service panel 770.

Figure 33:
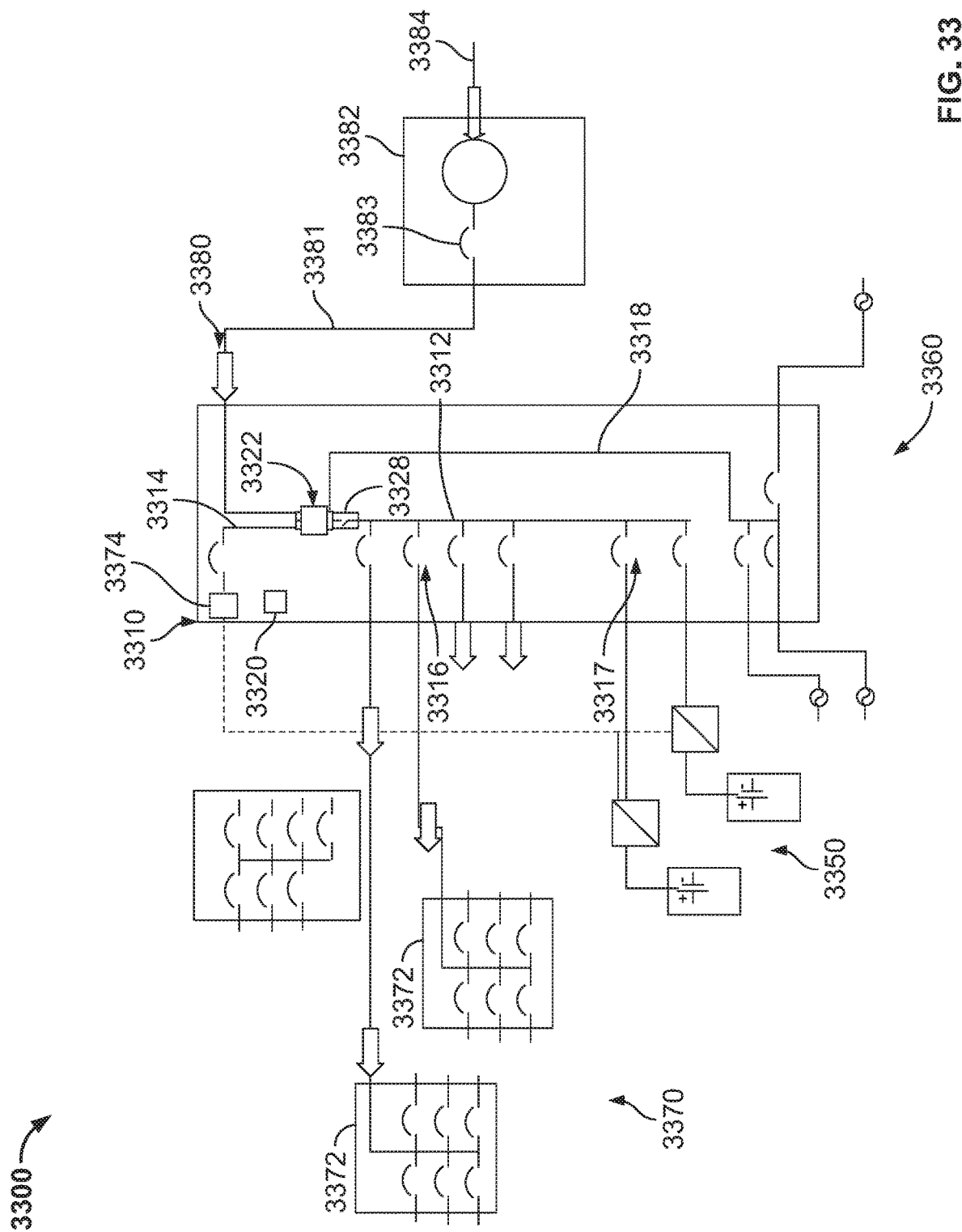
FIG. 33 illustrates an energy control system according to an embodiment.

FIG. 33 shows an electrical system 3300 according to some embodiments. Electrical system 3300 may include the same or similar features as the embodiments the electrical systems described herein (e.g., electrical system 600). In some embodiments, electrical system 3300 may include an energy control system 3310, an energy storage system 3350 electrically coupled to energy control system 3310, a PV system 3360 electrically coupled to energy control system 3310, and a plurality of loads 3370 electrically coupled to energy control system 3310. In some embodiments, the plurality of loads 3370 may be separated into a plurality of backup loads 3372 and a plurality of non-backup loads 3374.

In some embodiments, energy control system may include a grid interconnection 3380 electrically coupled to a utility grid 3384. In some embodiments, grid interconnection 3380 may include an AC bus 3381 and main service panel 3382 with a main circuit breaker 3383 (e.g., 200A circuit breaker) electrically coupled to utility grid 3384 so that grid power is distributed to energy control system 3310. In some embodiments, energy control system 3310 may include a non-backup load interconnection 3314 electrically coupled to the plurality of non-backup loads 3374. In some embodiments, energy control system 3310 may include a power bus 3312 having a backup load interconnection 3316 electrically coupled to the plurality of backup loads 3372 and a storage interconnection 3317 electrically coupled to energy storage system 3350. In some embodiments, energy control system 3310 may include a photovoltaic interconnection 3318 electrically coupled to the photovoltaic system 3360. Any one of interconnections 3314, 3316, 3317, and 3318 may include an AC bus, a panel, a sub-panel, a circuit breaker, or a combination thereof. In some embodiments, energy control system 3310 may include a controller 3320 configured to control the distribution of electrical energy between energy storage system 3350, PV system 3360, utility grid 3384, and the plurality of loads 3370.

In some embodiments, energy control system 3310 may include a microgrid interconnection device 3322 (e.g., an automatic transfer or disconnect switch) electrically coupled to grid interconnection 3380, non-backup load interconnection 3314, photovoltaic interconnection 3318, and the combination of backup load interconnection 3316 and storage interconnection 3317 via power bus 3312. In some embodiments, microgrid interconnection device 3322 may include any combination of switches, relays, and/or circuits to selectively connect and disconnect the grid interconnection 3380, non-backup load interconnection 3314, photovoltaic interconnection 3318, and power bus 3312. In some embodiments, controller 3320 is in communication with microgrid interconnection device 3322.

Figure 34:
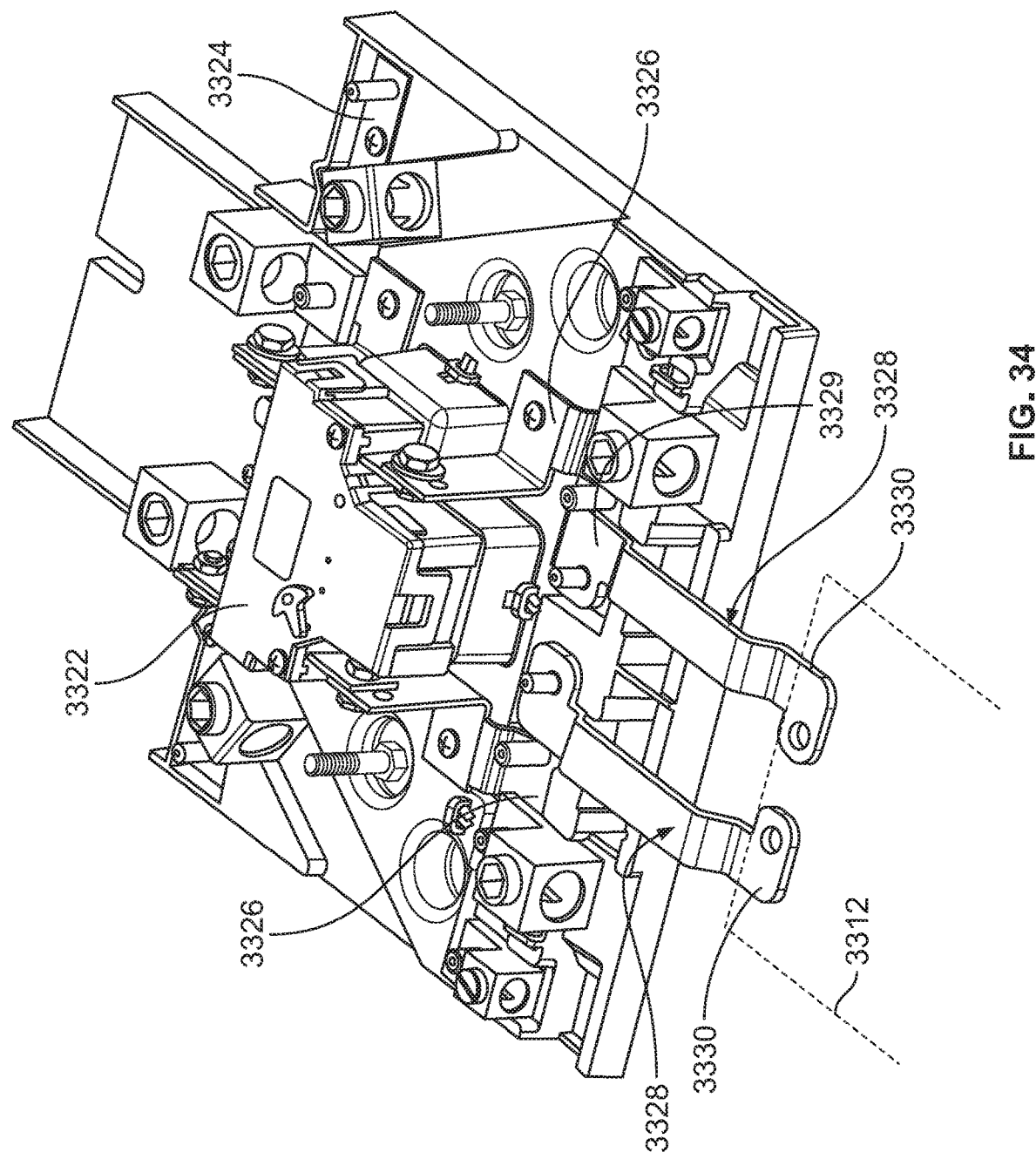
FIG. 34 illustrates a microgrid interconnection device with a load-side overcurrent protection device according to an embodiment.

As shown in FIG. 34, for example, in some embodiments, microgrid interconnection device 3322 may include a first bus bar 3324 disposed at a line side of microgrid interconnection device 3322 and a second bus bar 3326 disposed at a load side of microgrid interconnection device 3322. In some embodiments, first bus bar 3324 may be electrically coupled grid interconnection 3380 and non-backup load interconnection 3314. In some embodiments, second bus bar 3326 may be electrically coupled to photovoltaic interconnection 3318 and power bus 3312 having backup load interconnection 3316 and storage interconnection 3317. In some embodiments, as shown in FIG. 33 for example, energy control system 3310 may include a secondary overcurrent protection device 3328 disposed between the load side of microgrid interconnection device 3322 and the line side of power bus 3312. In some embodiments, as shown in FIG. 34 for example, secondary overcurrent protection device 3328 may be a removable circuit breaker having a first end 3329 with a moveable contact 3329 disposed at second bus bar 3326 and a second end 3330 bolted to line side of power bus 3312. In some embodiments, secondary overcurrent protection device 3328 is configured to interrupt power delivered to power bus 3312 when current at second bus bar 3326 reaches a maximum operating current.

In some embodiments, the maximum operating current associated with secondary overcurrent protection device 3328 and the current rating associated with second bus bar 3326 may be set to allow maximum distribution of PV power output while protecting the power bus 3312 from potentially harmful power surges. In some embodiments, the second bus bar 3326 is selected as a 400A rated common bus bar, and secondary overcurrent protection device 3328 is set at a maximum operating current of 200 A. In some embodiments, power bus 3312 may include a 200A rated bussing corresponding to secondary overcurrent protection device 3328 being rated at 200A such that power bus 3312 may receive simultaneously 60A from PV interconnection 3318, 80A from storage interconnection 3317, and 60A from grid interconnection 3380.

Figure 8A:
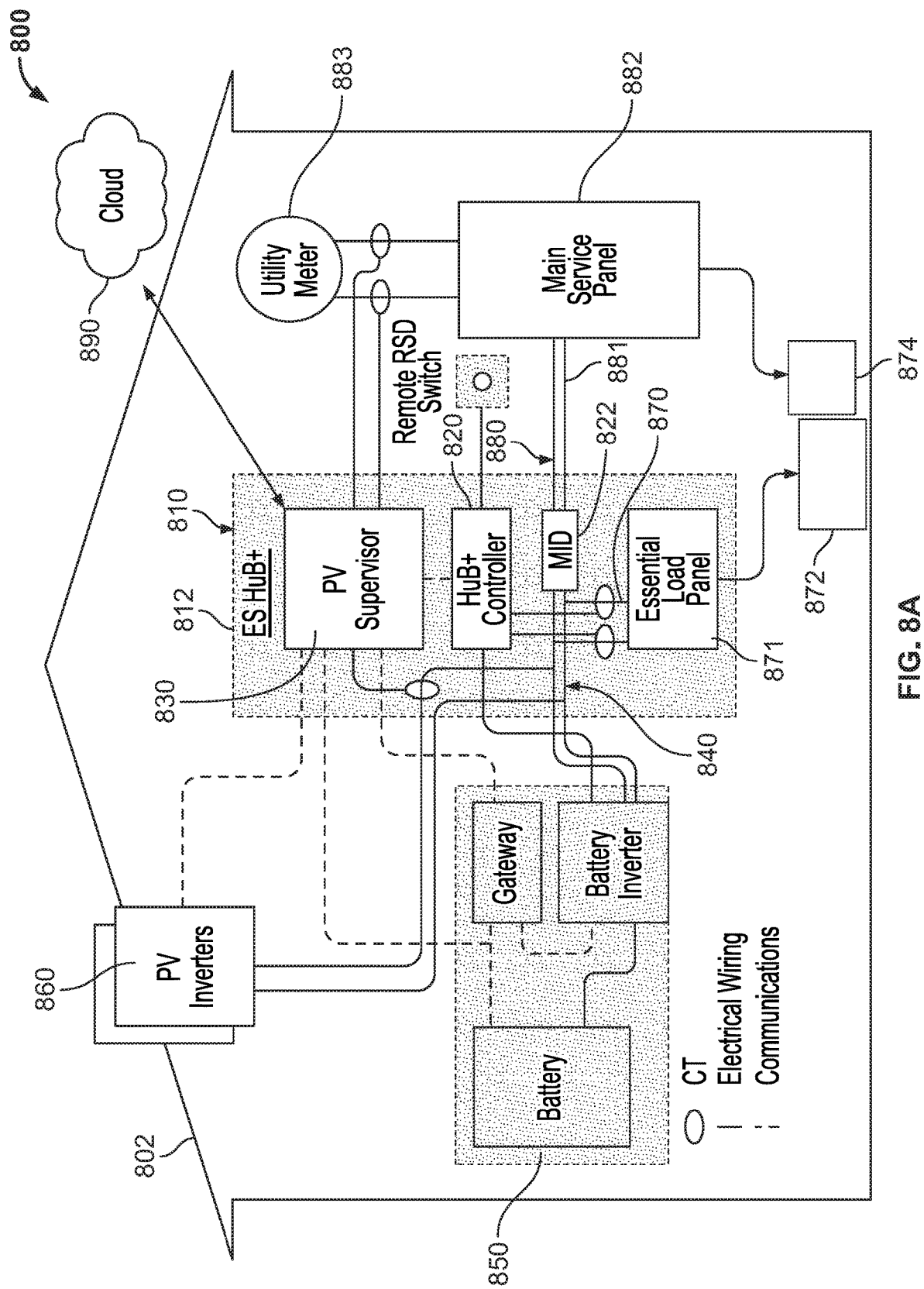
FIGS. 8A-B illustrate an electrical system according to an embodiment.

FIG. 8A shows an electrical system 800 according to some embodiments. In some embodiments, electrical system 800 includes an energy control system 810, an energy storage system 850, and/or a photovoltaic system 860. In some embodiments, energy control system 810 may include a photovoltaic monitoring system 830. In some embodiments, energy control system 810 may send and/or receive data (e.g., via photovoltaic monitoring system 830) over a network 890, for example, a wireless network. For example, energy control system 810 may send timeseries data and alerts from devices, receive tariff information (e.g., manually and/or automatically), receive control parameters and operational constraints, etc. In some embodiments, energy control system 810 may synchronize the transition from non-backup mode (where electrical system 800 is receiving electricity from grid power) to backup mode (where electrical system is not receiving electricity from grid power), using the microgrid interconnection device and energy storage system 850. In some embodiments, photovoltaic monitoring system 830 may read timeseries data and/or disable a reconnection timer of photovoltaic system 860. In some embodiments, photovoltaic monitoring system 830 may initiate a grid reconnection timer of photovoltaic system 860. In some embodiments, photovoltaic monitoring system 830 may communicate with a battery monitoring system ("BMS") of energy storage system 850. In some embodiments, photovoltaic monitoring system 830 may communicate with energy storage system 850 and may, for example, read timeseries data, read power information, write charge/ discharge targets, and/or write "heartbeats." In some embodiments, photovoltaic monitoring system 830 may receive status and/or power information from a microgrid interconnection device.

In some embodiments, as shown in FIG. 8A for example, energy control system 810 may include a controller 820 configured to monitor and adjust the status and operation of PV system 860 and energy storage system 850. In some embodiments, controller 820 may be linked (e.g., wired or wirelessly) to PV monitoring system 830 such that controller 820 receives electronic data related to PV system 860 from PV monitoring system 830 and relays data received over network 890 to PV monitoring system 830. In some embodiments, controller 820 may transmit commands to PV monitoring system 830 to adjust (e.g., increase or decrease) power output of PV system 860 based on data received over network 890 and electronic data received from PV monitoring system 830. In some embodiments, controller 820 may be configured as a master controller and PV monitoring system 830 may be configured to communicate electronic data (e.g., status of power generation) with controller 820 such that controller 820 controls control energy distribution based on the electronic data transmitted by PV monitoring system 830.

In some embodiments, as shown in FIG. 8A for example, energy control system 810 may include a grid interconnection 880 electrically coupled to a utility grid. In some embodiments, grid interconnection 880 may include an AC bus 881, main service panel 882, and a utility meter 883 electrically coupled to a utility grid so that grid power is distributed to energy control system 810. In some embodiments, main service panel 882 may be electrically coupled to a plurality of non-backup loads 874. In some embodiments, energy control system 810 may include a backup power interconnection 840 electrically coupled to PV system 860 and energy storage system 850. In some embodiments, backup power interconnection 840 may include any number of conductors (e.g., an AC power bus) to distribute electrical energy between energy control system 810, energy storage system 850, and PV system 860. In some embodiments, energy control system 810 may include a backup load interconnection 870 electrically coupled to a plurality of backup loads 872 configured to consume electrical energy. In some embodiments, backup load interconnection 870 may include a load panel 871 having a plurality of switches to selectively distribute electrical energy to the plurality of backup loads 872. In some embodiments, energy control system 810 may include a microgrid interconnection device 822 (e.g., a microgrid interconnection switch) electrically coupled to grid interconnection 880, backup power interconnection 840, and backup load interconnection 870. In some embodiments, microgrid interconnection device 822 is configured to switch between: (1) an on-grid mode electrically connecting grid interconnection 880 and backup power interconnection 840 to backup load interconnection 870, and (2) a backup mode electrically disconnecting grid interconnection 880 from the backup power interconnection 840 and backup load interconnection 870. In some embodiments, PV system 860 may be coupled to main service panel 882 so that when microgrid interconnection device 822 is set in the backup mode, both PV system 860 and the utility grid are electrically disconnected from the backup power interconnection 840. In some embodiments, energy storage system 850 may be coupled to main service panel 882 so that when microgrid interconnection device 822 is set in the backup mode, both energy storage system 850 and the utility grid are electrically disconnected from the backup power interconnection 840.

Figure 8B:
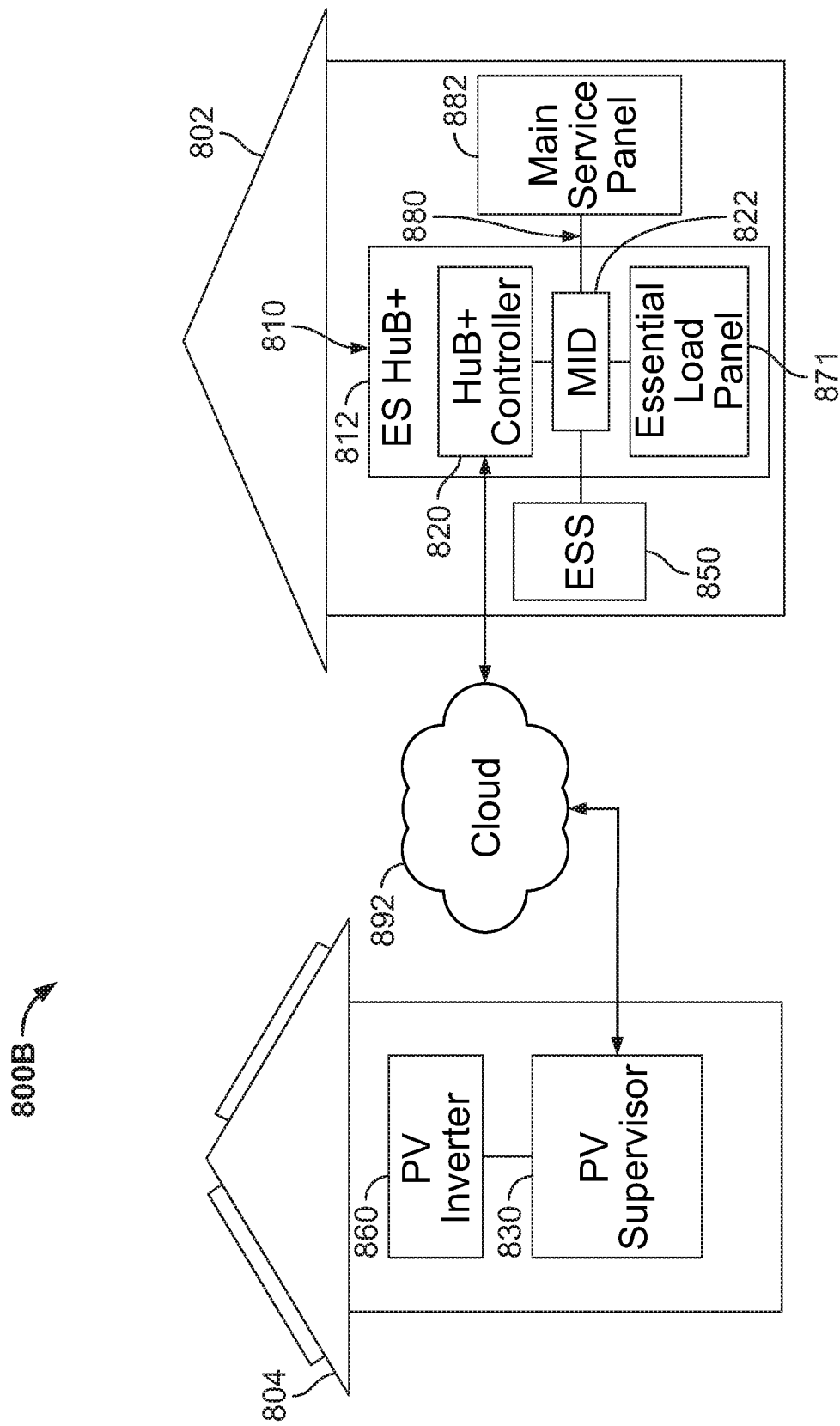

In some embodiments, as shown in FIG. 8A for example, energy control system 810 may include a housing 812 enclosing controller 820, microgrid interconnection device 822, PV monitoring system 830, and backup power interconnection 870, in which controller 820 is linked via hardwire to PV monitoring system 830. In some embodiments, PV system 860, energy storage system 850, and energy control system 810 may each be disposed in a main residential building 802. In some embodiments, as shown in FIG. 8B for example, PV monitoring system 830 may be physically separated from housing 812 and linked wirelessly to controller 820 over a local-area-network 892 (e.g., residential Wi-Fi network). For example, in some embodiments, PV system 860 and PV monitoring system 830 may be disposed on an auxiliary building 804 (e.g., a garage) that is separate from the main residential building 802 (e.g., a house), where housing 812 having controller 820, microgrid interconnection device 822, and backup power interconnection 870 is located. In some embodiments, energy control system 810 may include a local-area-network access point (e.g., Wi-Fi access point) disposed in housing 812 so that controller 820 may communicate wirelessly with PV monitoring system 830 over the local-area-network 892. In some embodiments, energy control system 810 may include a second access point (e.g., Bluetooth®) so that a user may employ a user device (e.g., portable computer device) to communicate directly with controller 820 via the second access point, for example, during a power outage that disables the local-area-network access point.

Figure 9:
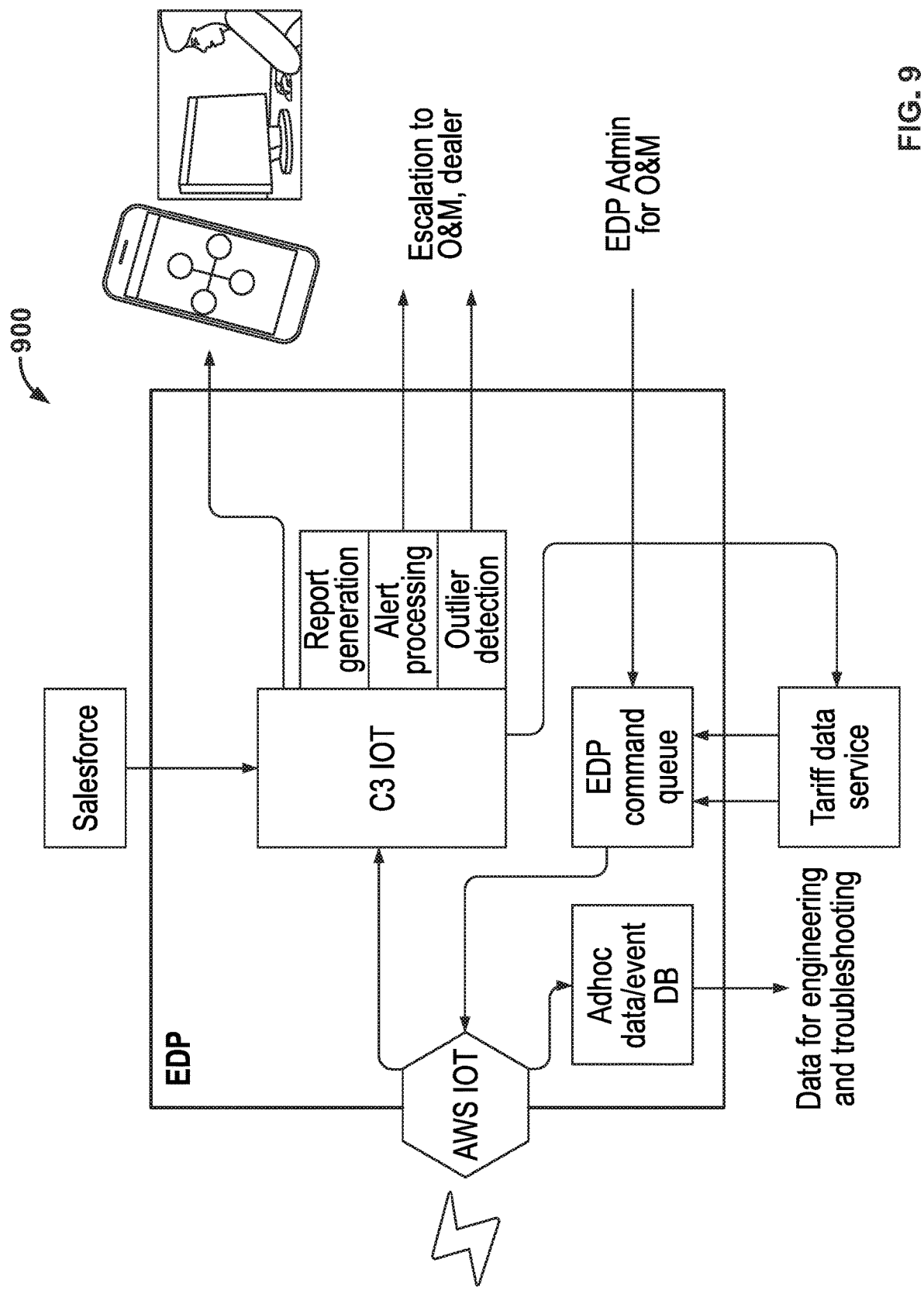
FIG. 9 illustrates a network according to an embodiment.

FIG. 9 shows a network 900 according to some embodiments. In some embodiments, an energy control system (e.g., any energy control system described herein) may send and or receive data via network 900. In some embodiments, timeseries data, alerts, metadata, outage reports, power usage information, greenhouse gas generation reports, service codes, runtime data, etc. may be sent and/or received using network 900. In some embodiments, the data may be stored locally (e.g., in the memory of controller 2330, described below) for review, for example, by a homeowner and/or service personnel. In some embodiments, an administrator may remotely send commands using network 900. In some embodiments, the information may be sent and/or received by a personal computing device, for example, a desktop computer, laptop computer, or mobile phone (e.g., using an application program).

Figure 10:
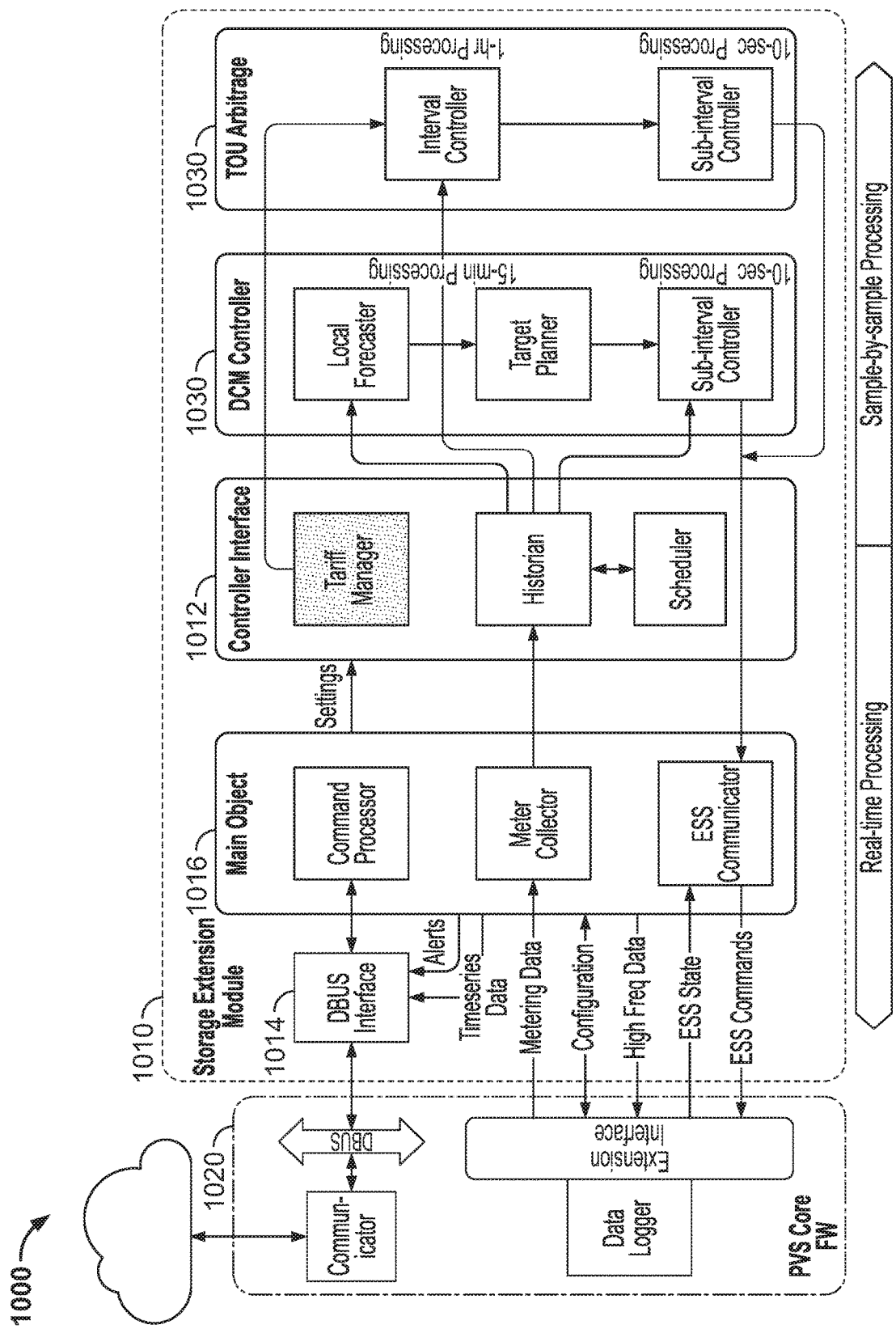
FIG. 10 illustrates a controller architecture according to an embodiment.

FIG. 10 shows a controller architecture 1000 according to some embodiments. In some embodiments, information may be communicated along the pathways and between the system components as indicated in FIG. 10. In some embodiments, controller architecture 100 may include a storage module 1010 adapted to collect information (e.g., operating status and electronic data) directly from converters of electronic storage system (e.g., electronic storage system 150) and a photovoltaic (PV) supervisor module 1020 adapted to collect information (e.g., operating status and electronic data) directly from a PV system (e.g., PV system 160). In some embodiments, storage module 1010 may include a storage interface 1012 configured to communicate with modules 1030 of electronic storage system. In some embodiments, storage module 1010 may include a PV interface 1014 (DBUS interface) configured to communicate with PV module 1020. In some embodiments, storage module 1010 may include a processing sub-module 1016 configured to process information received from storage and PV interface sub-modules 1012, 1014 and transmit commands to modules 1030 of the electronic storage system.

Figure 11:
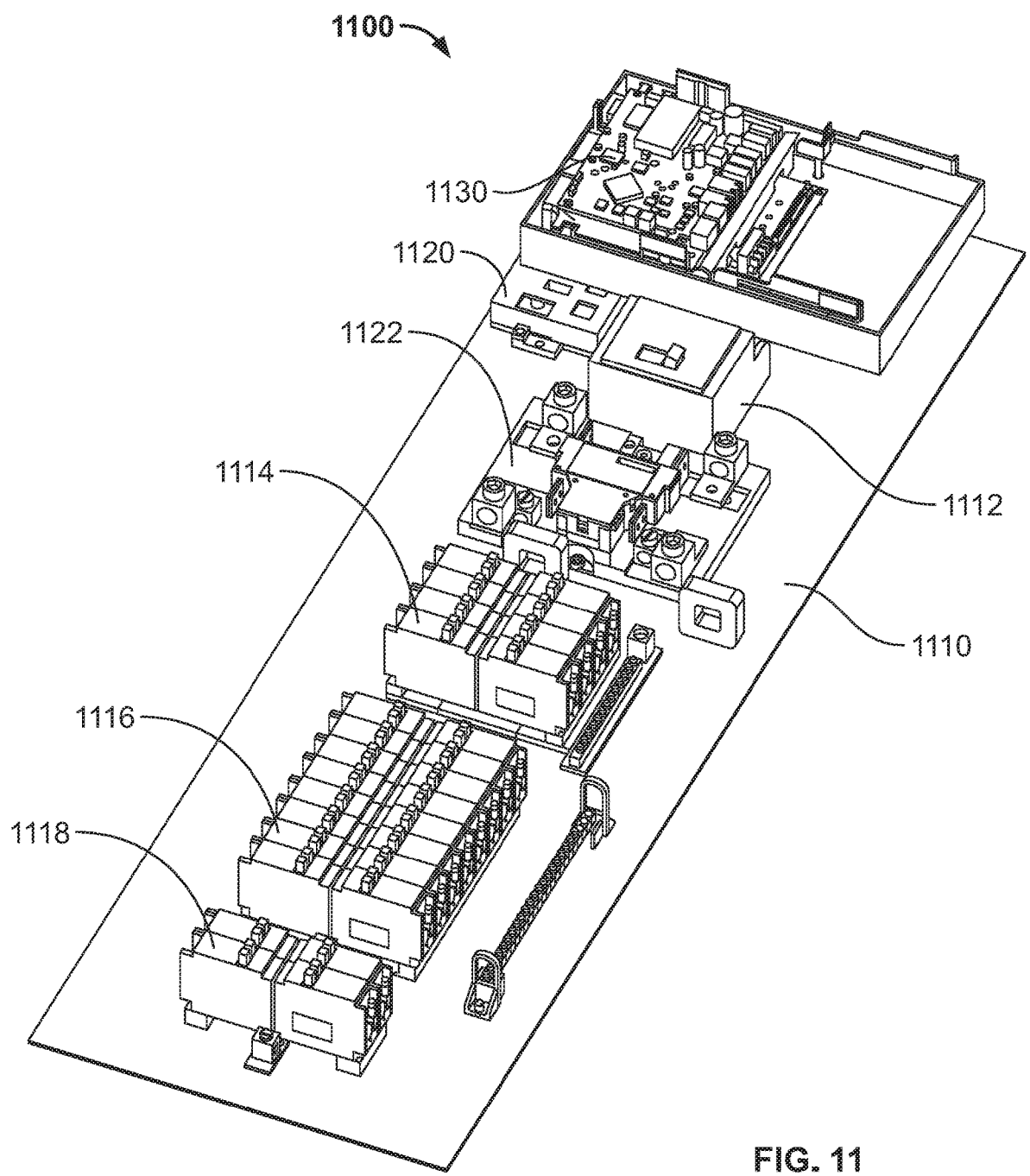
FIG. 11 illustrates an energy control system according to an embodiment.

As shown in FIG. 11, in some embodiments, energy control system 1100 may include a mounting plate 1110 to which components of energy control system 1100 may be mounted. As shown in FIG. 11, in some embodiments, energy control system 1100 may include a controller 1120, a microgrid interconnection device 1122, and/or a photovoltaic monitoring system 1130. In some embodiments, energy control system 1100 may include a main overcurrent protection device 1112. As shown in FIG. 11, in some embodiments, energy control system 1100 may include a non-backup load interconnection 1114, a backup load interconnection 1116, and/or a photovoltaic interconnection 1118. In some embodiments, non-backup loads may be connected to energy control system 1100 using non-backup load interconnection 1114. In some embodiments, backup loads may be connected to energy control system 1100 using backup load interconnection 1116. In some embodiments, the photovoltaic system may be connected to energy control system 1100 using photovoltaic interconnection 1118. Mounting plate 1110 may be sized and shaped to accommodate all of the components of energy control system 1100. In some embodiments, mounting plate 1110 may be rectangular. In some embodiments, mounting plate 1110 may have a greater length than width. In some embodiments, mounting plate 1110 may be configured for indoor enclosures such as, for example, NEMA-1 enclosures. In some embodiments, mounting plate 1110 may be configured for outdoor and/or weather rated enclosures such as, for example, NEMA-3 enclosures. In some embodiments, the internal components of energy control system 1100 may be used with different types of enclosures without being reconfigured.

Figure 12:
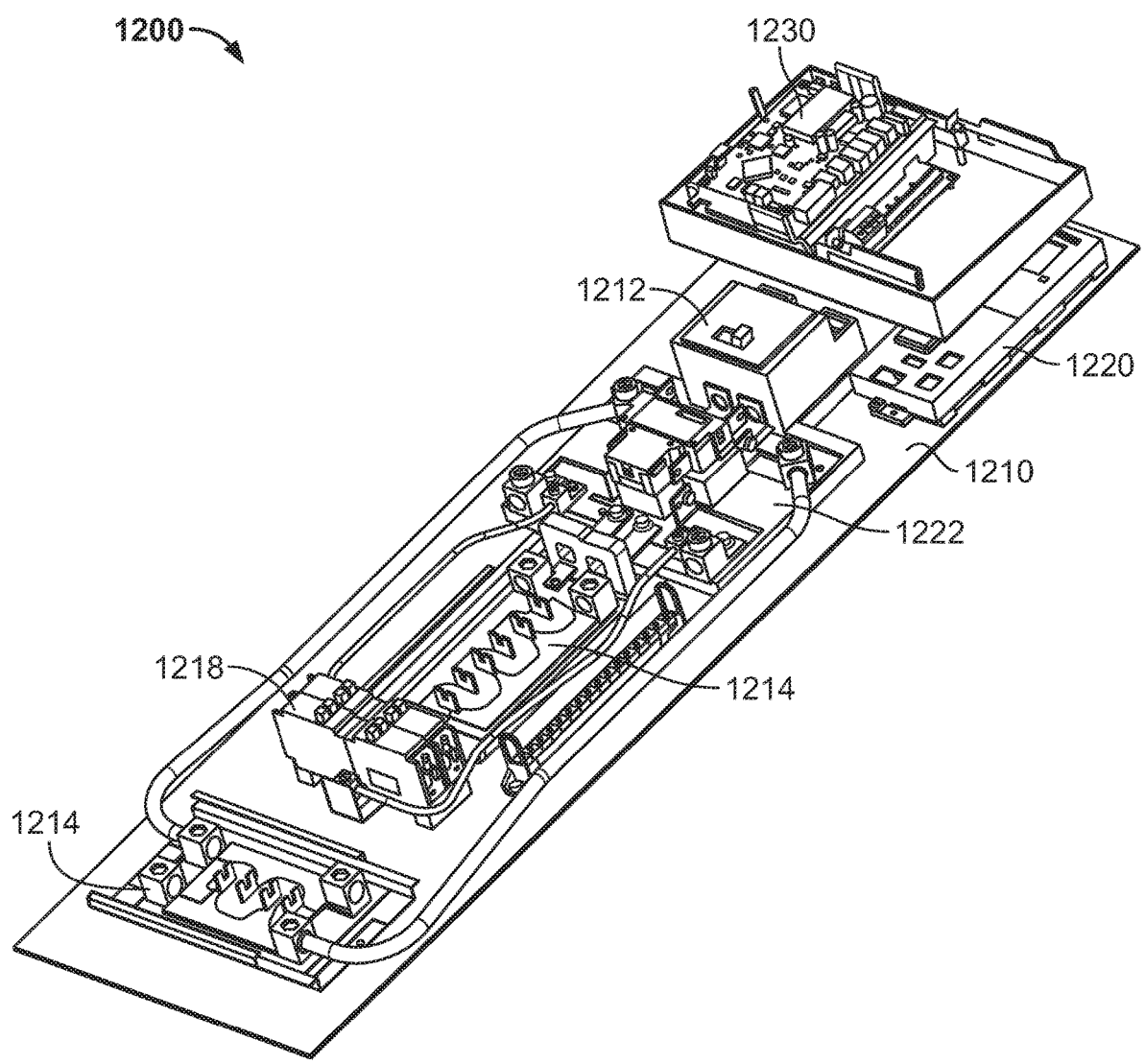
FIG. 12 illustrates an energy control system according to an embodiment.

As shown in FIG. 12, in some embodiments, energy control system 1200 may include a mounting plate 1210 on which components of energy control system 1200 may be mounted. As shown in FIG. 12, in some embodiments, energy control system 1200 may include a controller 1220, a microgrid interconnection device 1222, and/or a photovoltaic monitoring system 1230. In some embodiments, energy control system 1200 may include a main overcurrent protection device 1212. As shown in FIG. 12, in some embodiments, energy control system 1200 may include a photovoltaic interconnection 1218. In some embodiments, energy control system 1200 may include load interconnections 1214. In some embodiments, the photovoltaic system may be connected to energy control system 1200 using photovoltaic interconnection 1218. In some embodiments, loads may be connected to energy control system 1100 using load interconnections 1214. In some embodiments, electrical loads may be indirectly connected to energy control system 1200 using, for example, a main service panel and/or a sub panel.

Figure 38A:
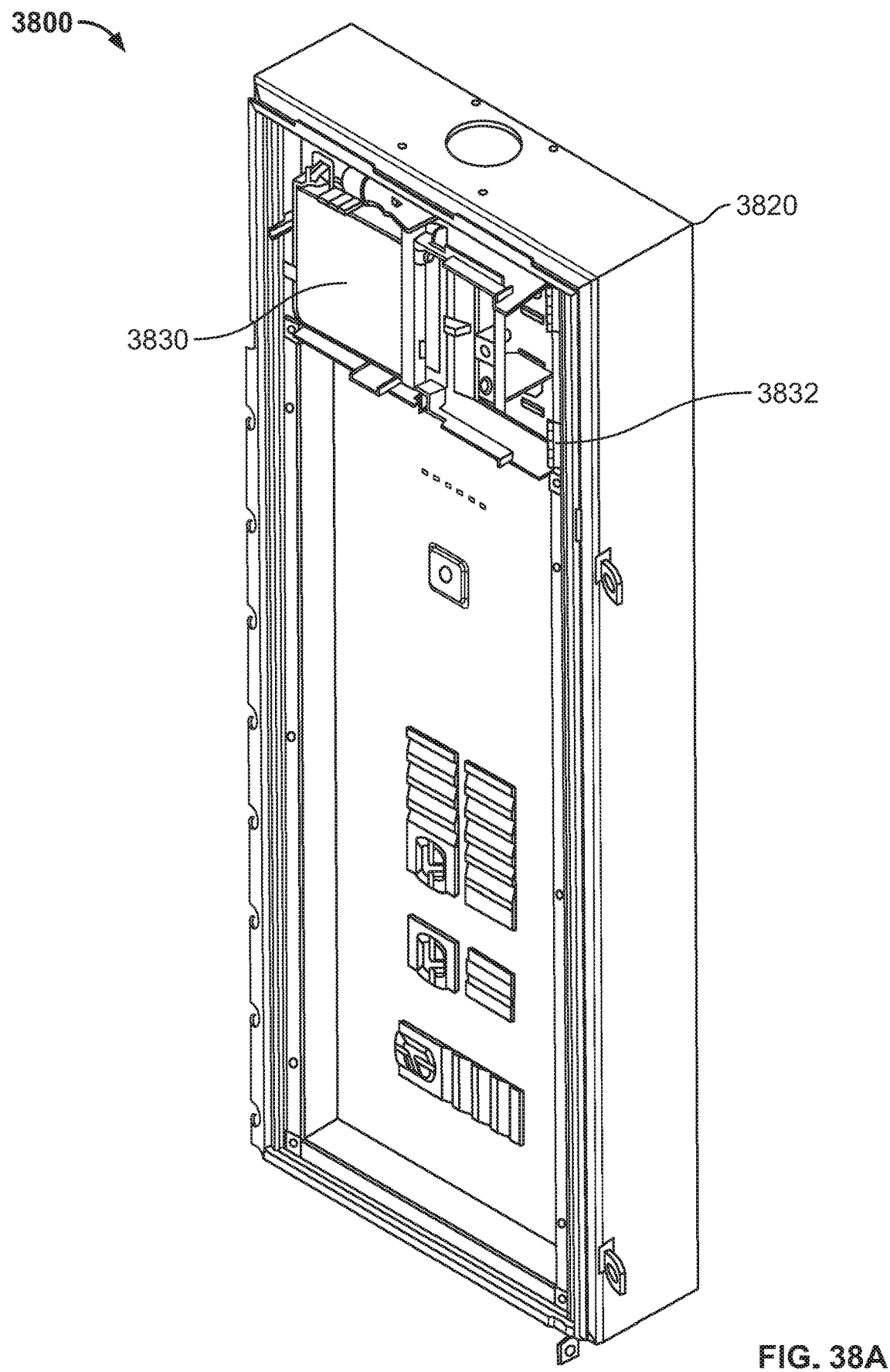
FIGS. 38A-38B illustrate an energy control system according to an embodiment.
Figure 38B:
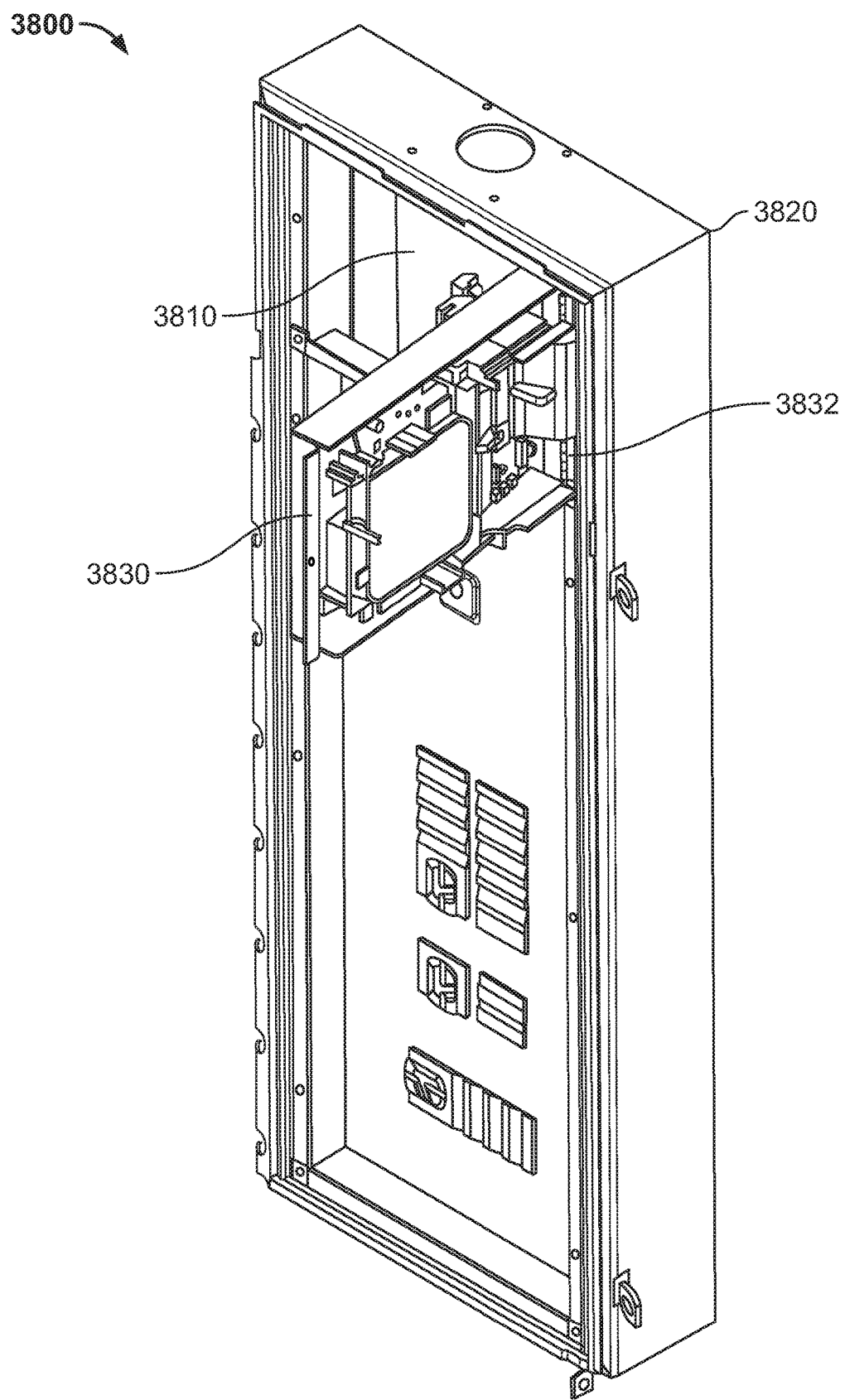

As shown in FIG. 38B for example, in some embodiments, energy control system 3800 may include a mounting plate 3810 on which components (e.g., controller, MID load pan) of energy control system 3800 may be mounted. In some embodiments, energy control system 3800 may include a housing 3820 receiving mounting plate 3810. In some embodiments, energy control system may include a PV monitoring system 3830 or another monitoring/control system that is connected to housing 3820 or mounting plate 3810, for example, by a hinge 3832 such that PV monitoring system 3830 is configured to pivot between an operating position and a service position. In some embodiments, as shown in FIG. 38A for example, at the operating position, PV monitoring system 3830 may be disposed against or parallel with mounting plate 3810. In some embodiments, as shown in FIG. 38B for example, at the service position, PV monitoring system 3830 may be pivoted away from mounting plate 3810 to allow a user to access cabling or service other components secured to mounting plate 3810.

Figure 13:
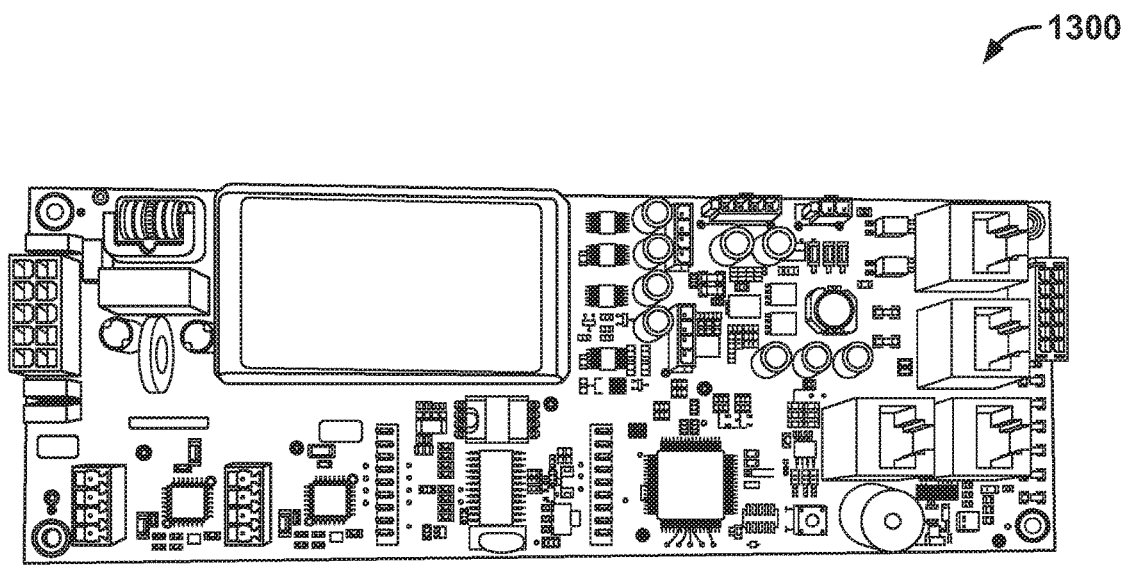
FIG. 13 illustrates a controller according to an embodiment.

FIG. 13 shows a controller 1300 (e.g., microgrid interconnection device controller PCBA) according to some embodiments. Controller 1300 may include any of the features disclosed herein related to controllers.

Figure 14:
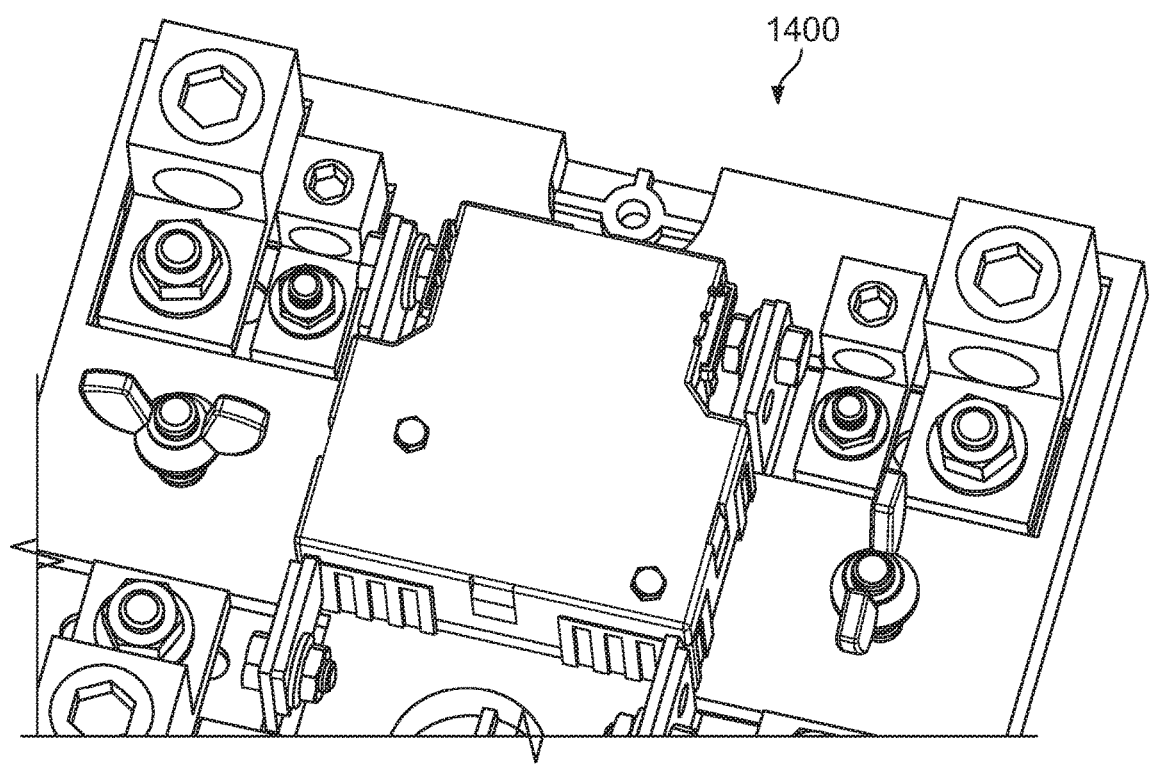
FIG. 14 illustrates a microgrid interconnection device according to an embodiment.

FIG. 14 shows a portion of a microgrid interconnection device 1400 according to some embodiments. Microgrid interconnection device 1400 may include any of the features disclosed herein related to microgrid interconnection devices.

Figure 15:
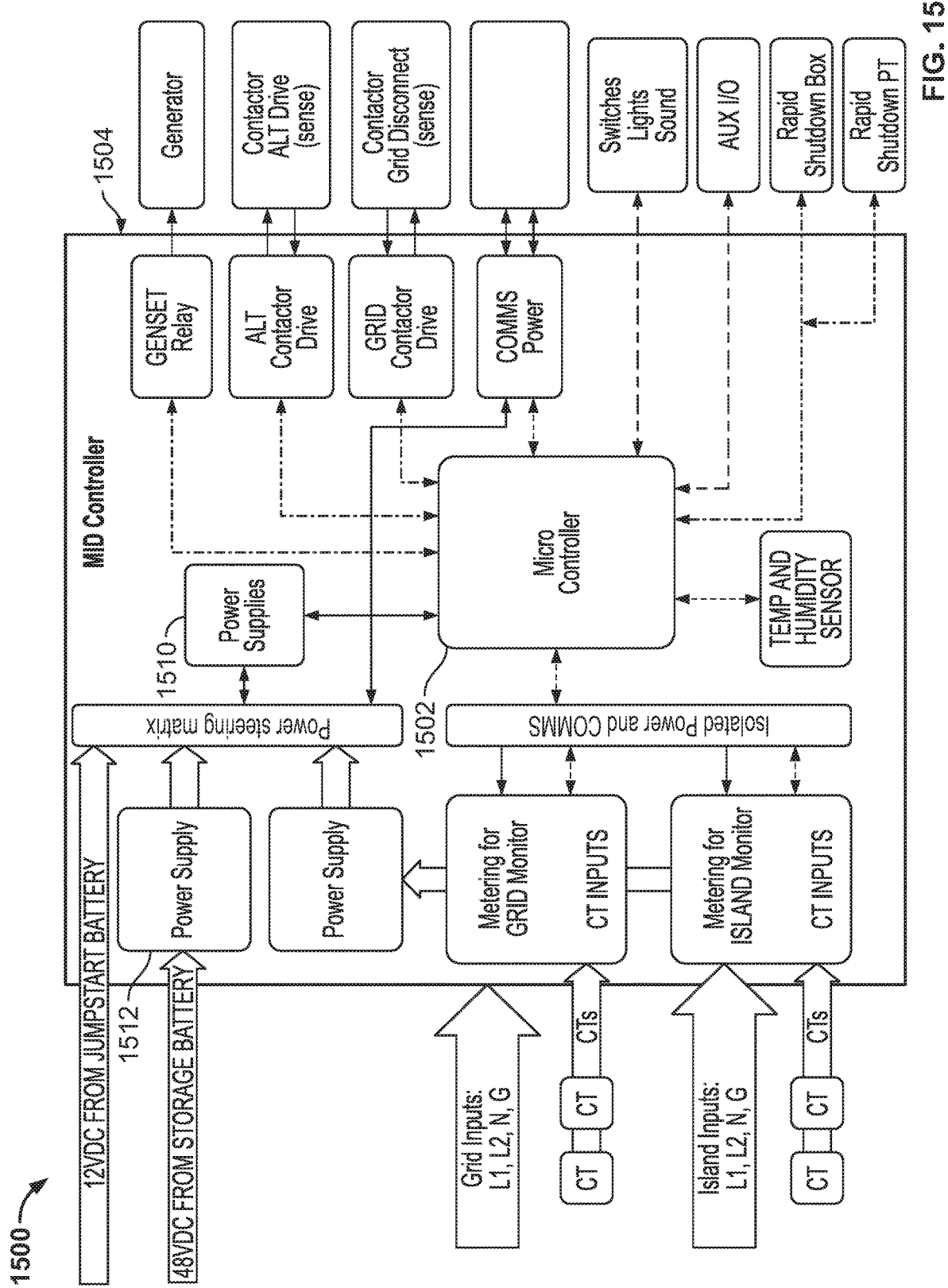
FIG. 15 illustrates a block diagram of a controller according to an embodiment.

FIG. 15 shows a block diagram of a controller 1500 (e.g., a microgrid interconnection device controller) according to some embodiments. In some embodiments, controller 1500 may include a microcontroller 1502 having a central-processing-unit (e.g., programmable system-on-chip controller). In some embodiments, controller 1500 may handle microgrid interconnection device coils of 12 volts using an ALT contactor drive 1504. In some embodiments, controller 1500 may control relays. In some embodiments, controller 1500 may measure current and voltage (e.g. via current transformer "CT" or Potential transformer "PT"). In some embodiments, controller 1500 may measure the differences between grid power and backup power such as, for example, differences in phase, frequency, voltage, etc. In some embodiments, controller 1500 may have an internal power supply 1510 (e.g., 5 VDC & 3.3 VDC internal power supply). In some embodiments, controller 1500 may have external power inputs 1512 (e.g., 48V to 12 VDC power supply from storage battery). In some embodiments, controller 1500 may receive power from the electrical grid, an energy storage system, and/or a power generation system. In some embodiments, controller 1500 may control microgrid interconnection device coils that need to reverse coil polarity to reset. In some embodiments, controller 1500 may include an auxiliary power input to receive power from batteries. In some embodiments, controller 1500 may include connectors for communicating with and/or controlling the microgrid interconnection device. In some embodiments, controller 1500 may include a "test mode" for simulating a grid outage and/or an emergency system shutdown. In some embodiments, controller 1500 may include visual and/or audible alarms, for example, to indicate system status. In some embodiments, controller 1500 may allow a rapid system shutdown (including remote shutdown) and/or a direct pass-through to system inverters for safety. In some embodiments, controller 1500 may include generator start relays for continuous backup and/or battery jump-start relays for "dark-start" situations.

Figure 16:
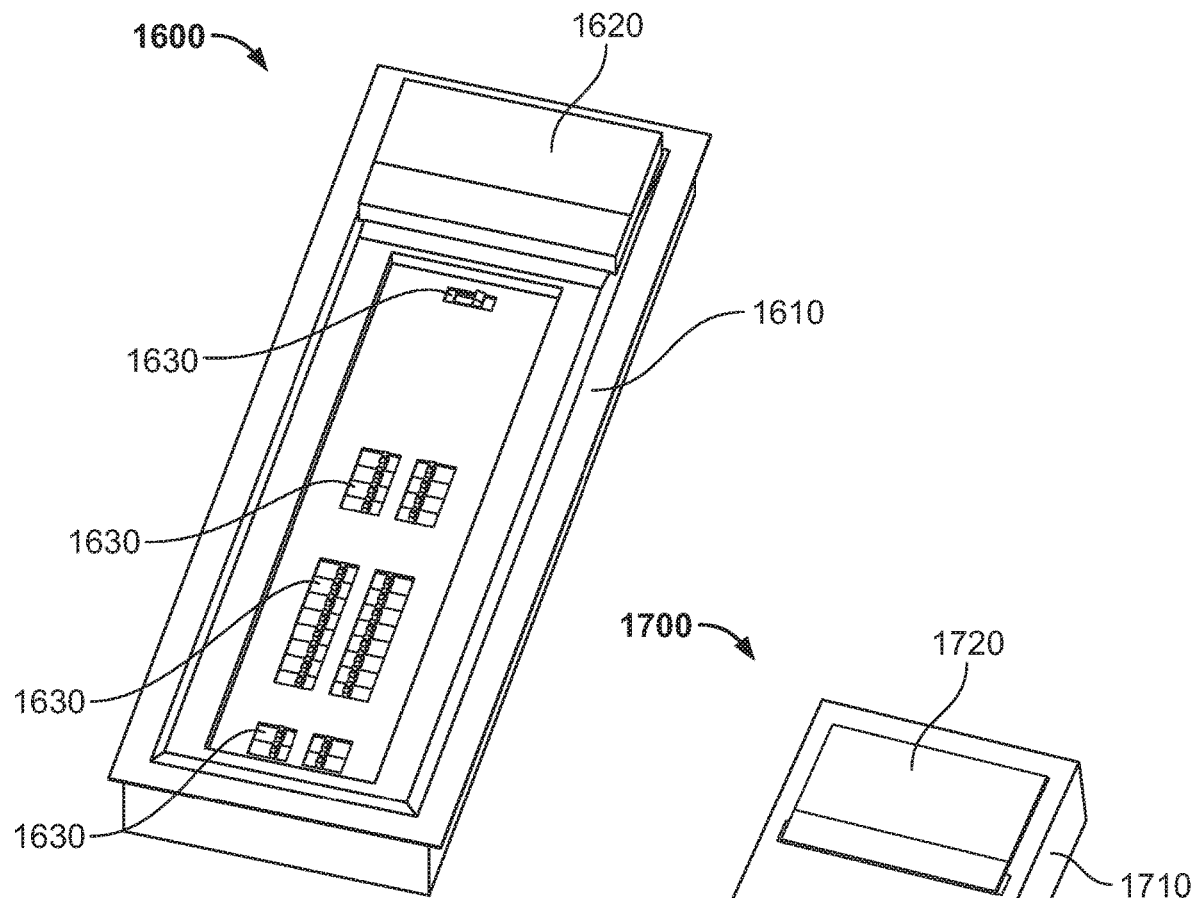
FIG. 16 illustrates an energy control system according to an embodiment.

FIG. 16 shows an energy control system 1600 according to some embodiments. In some embodiments, energy control system 1600 includes a housing 1610. In some embodiments, energy control system 1600 includes a cover 1620 for the photovoltaic monitoring system. In some embodiments, cover 1620 may be plastic. In some embodiments, cover 1620 may be removable. In some embodiments, energy control system 1600 includes a door (not shown) that may be opened and closed in order to access components mounted on mounting plate 1110 (see FIG. 11), for example, overcurrent protection devices 1630. In some embodiments, the door may be hinged. In some embodiments, energy control system 1600 may be used indoors. As described in further detail below, in some embodiments, energy control system 1600 may be, for example, mounted between the studs of a wall in a building. In some embodiments, energy control system 1600 with housing 1610 meets NEMA-1 enclosure standards. In some embodiments, housing 1610 may be about 12-16" wide, about 40-50" tall, and about 3-5" deep. In some embodiments, housing 1610 may be about 13-15" wide, about 43-47" tall, and about 3.5-4.5" deep. In some embodiments, housing 1610 may be about 14" wide, about 45" tall, and about 3.8" deep. In some embodiments, housing 1610 may be about 20-40" tall.

Figure 17A:
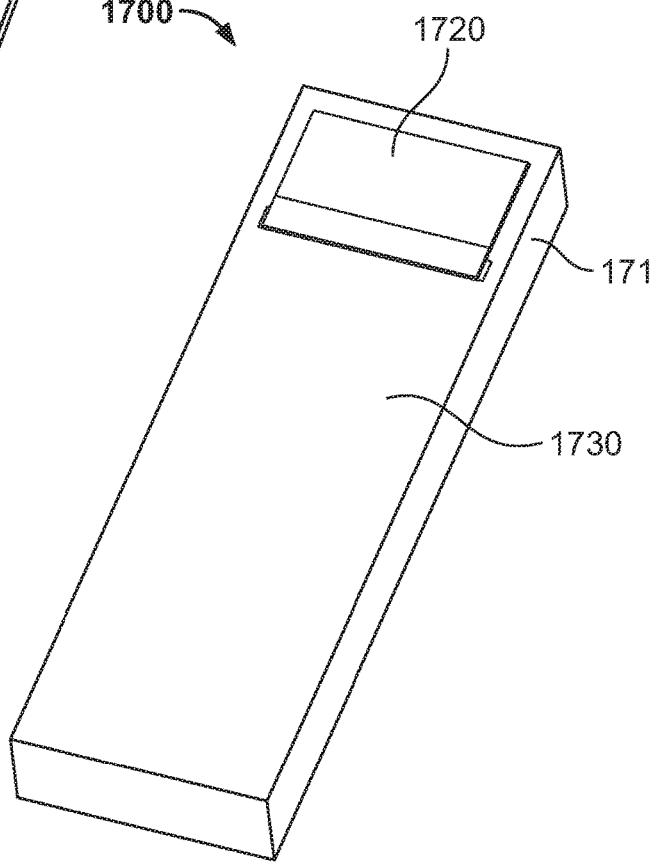
FIG. 17A illustrates an energy control system according to an embodiment.

FIG. 17 shows an energy control system 1700 according to some embodiments. In some embodiments, energy control system 1700 includes a housing 1710. In some embodiments, energy control system 1700 includes a cover 1720 for the photovoltaic monitoring system. In some embodiments, cover 1720 may be plastic, metal, or a combination of plastic and metal. In some embodiments, cover 1720 may be removable. In some embodiments, cover 1720 may be rotatably and/or removably connected to housing 1710. In some embodiments, energy control system 1700 includes a door 1730 that may be opened and closed in order to access components mounted on mounting plate 1110 (see FIG. 11). In some embodiments, the door may be hinged. In some embodiments, the door may include a latch for securing the door in a closed position. In some embodiments, the door may be lockable. In some embodiments, energy control system 1700 may be used outdoors. In some embodiments, housing 1710, cover 1720, and/or door 1730 may be sealed to prevent or reduce the amount of water, dirt, or debris, for example, from entering the unit. In some embodiments, a seal may be disposed between door 1730 and housing 1710. As described in further detail below, in some embodiments, energy control system 1700 may be, for example, mounted to a wall of a building. In some embodiments, energy control system 1700 with housing 1710 meets NEMA-3 enclosure standards. In some embodiments, housing 1710 may include one or more openings and/or knockout holes disposed on several sides of housing 1710 for flexibility during installation of electrical conduit and/or wiring. In some embodiments, housing 1710 may be about 15-19" wide, about 43-53" tall, and about 4-6" deep. In some embodiments, housing 1710 may be about 16-18" wide, about 46-50" tall, and about 4.5-5.5" deep. In some embodiments, housing 1710 may be about 17" wide, about 48" tall, and about 5" deep.

FIGS. 17B-C show an energy control system 1700B according to some embodiments. In some embodiments, energy control system 1700B may include a housing 1710B. In some embodiments, housing 1710B may be plastic, metal, or a combination of plastic and metal. In some embodiments, energy control system 1700B may include a cover 1720B enclosing a photovoltaic monitoring system (e.g., PV monitoring system 1230). In some embodiments, cover 1720B may be plastic, metal, or a combination of plastic and metal. In some embodiments, cover 1720B may be removable. In some embodiments, cover 1720B may be rotatably and/or removably connected to housing 1710B. In some embodiments, energy control system 1700B may include a door 1730B that is configured to be opened and closed to access components (e.g., switches) mounted within housing 1710B, for example on a mounting plate (e.g., mounting plate 1110 shown in FIG. 11). In some embodiments, door 1730B may be hinged, for example having one or more hinges coupling door 1730B and housing 1710B. In some embodiments, door 1730B may include one or more latch, for example an upper latch 1732B and/or a lower latch 1732C for securing door 1730B in a closed position. The latches may increase the compression of the door 1730B (e.g., against the seals or gaskets discussed below) to meet NEMA-3 enclosure standards. In some embodiments, door 1730B may be magnetically coupled to housing 1710B to secure door 1730B in a closed position. In some embodiments, the door may be lockable. In some embodiments, door 1730B may include a padlock, for example disposed along a bottom edge thereof to securely lock door 1730B to housing 1710B when set in the closed position.

In some embodiments, energy control system 1700B may be used outdoors. In some embodiments, housing 1710B meets NEMA-3 enclosure standards by forming a sealed enclosure with cover 1720B and door 1730B. In some embodiments, housing 1710B and/or door 1730B may include one or more gaskets 1712B disposed along one or more side edges and an upper side thereof to form a seal between housing 1710B and door 1370B when set in a closed position. In some embodiments, housing 1710B, cover 1720B, and/or door 1730B may include a gasket disposed along each longitudinal and upper side thereof to prevent or reduce the amount of water, dirt, or debris, for example, from entering the unit. In some embodiments, the gasket may be formed of, for example, a foam-based material having elastic properties.

Figures 18A, 18B, 18C:
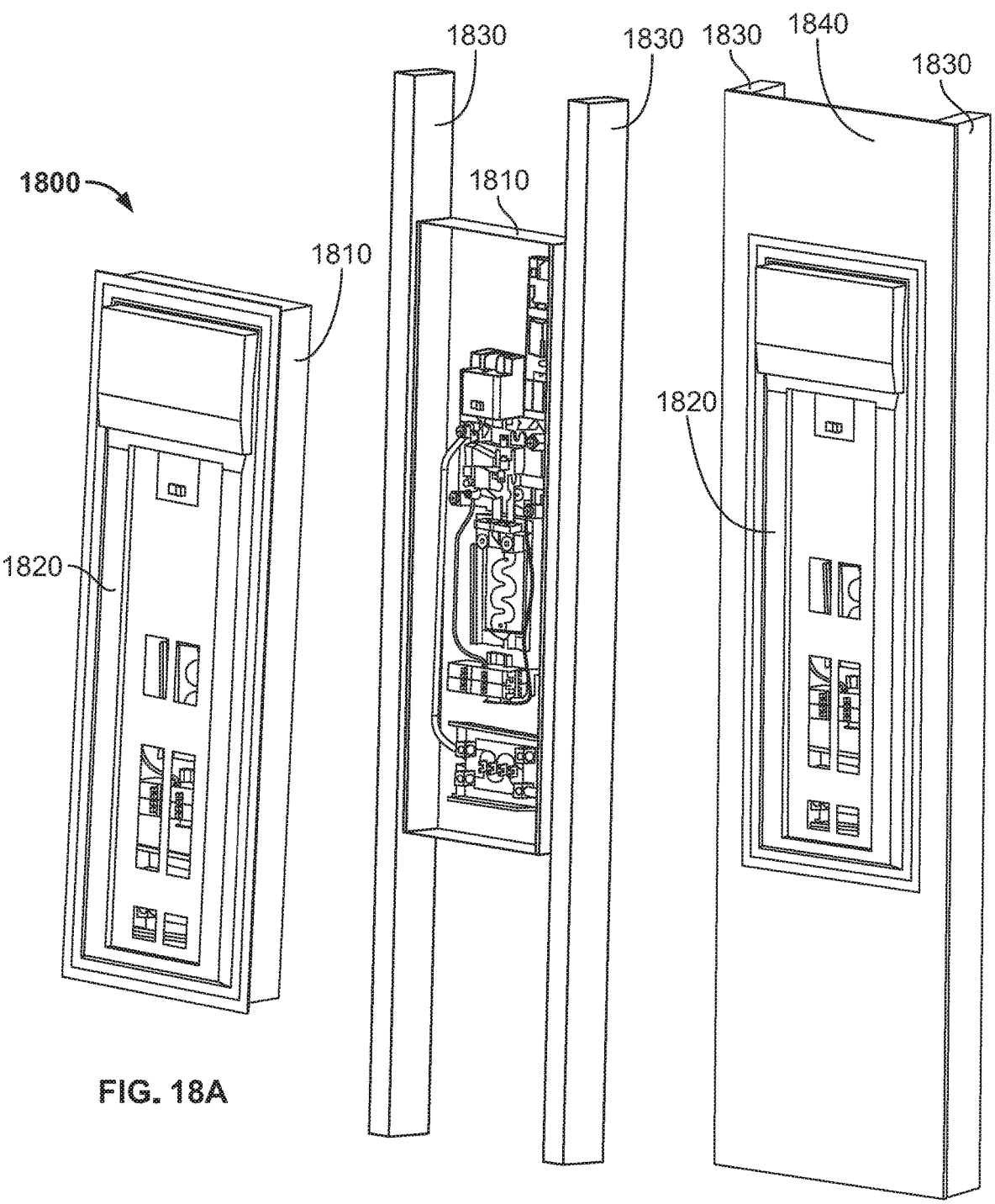
FIGS. 18A-18C illustrate an energy control system according to an embodiment.

FIGS. 18A-18C show an energy control system 1800 according to some embodiments. In some embodiments, energy control system 1800 may include rear housing portion 1810 and a front housing portion 1820. As shown in FIG. 18B, in some embodiments, rear housing portion 1810 may be mounted between studs 1830 of a wall of a building. As shown in FIG. 18C, in some embodiments, front housing portion 1820 may be mounted to a wall panel 1840 (e.g., drywall) of a wall of a building. Thus, energy control system 1800 and its associated housing(s) may be conveniently and securely mounted for indoor use. In some embodiments, for example, rear housing portion 1810 and mounting plate 1110 (see FIG. 11) with associated energy control system components may be mounted between adjacent studs 1830. A wall panel 1840 having an opening approximately the same size as rear housing portion 1810 may be attached to the studs 1830. Front housing portion 1820 may be coupled to rear housing portion 1810. In some embodiments, energy control system 1800 may be mounted flush with wall panel 1840. In some embodiments, rear housing portion 1810 and front housing portion 1820 may be installed prior to other components of energy control system 1800. For example, rear housing portion 1810 and front housing portion 1820 may be installed during initial construction of the building along with, for example, electrical conduit for routing electrical wiring. Then, a mounting plate with electrical components (e.g., mounting plate 1110, described above) may be installed and wired after construction of the building is complete. Thus, homeowners may more easily integrate energy control system 1800 into their home even if it is not installed during initial construction, without requiring substantial alterations to the existing structure of the building.

Figure 19A:
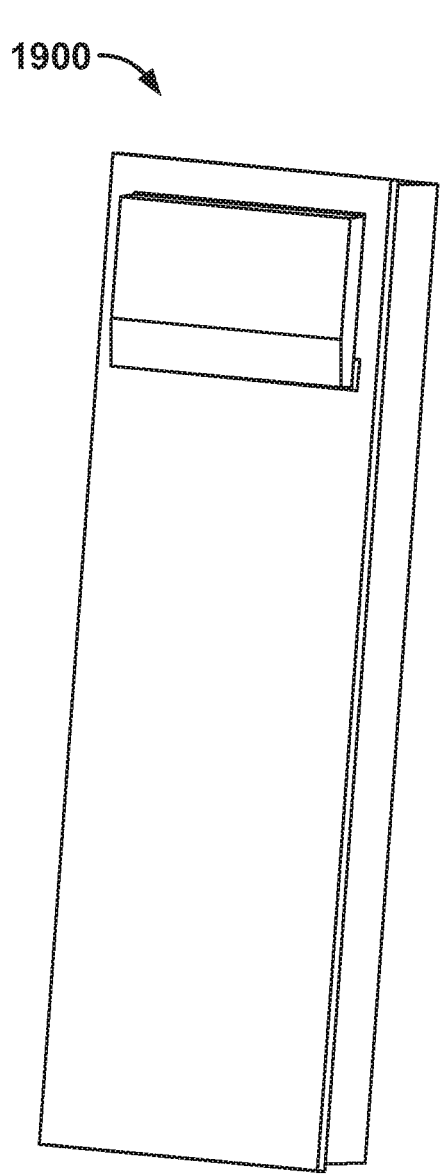
FIGS. 19A-19B illustrate an energy control system according to an embodiment.
Figure 19B:
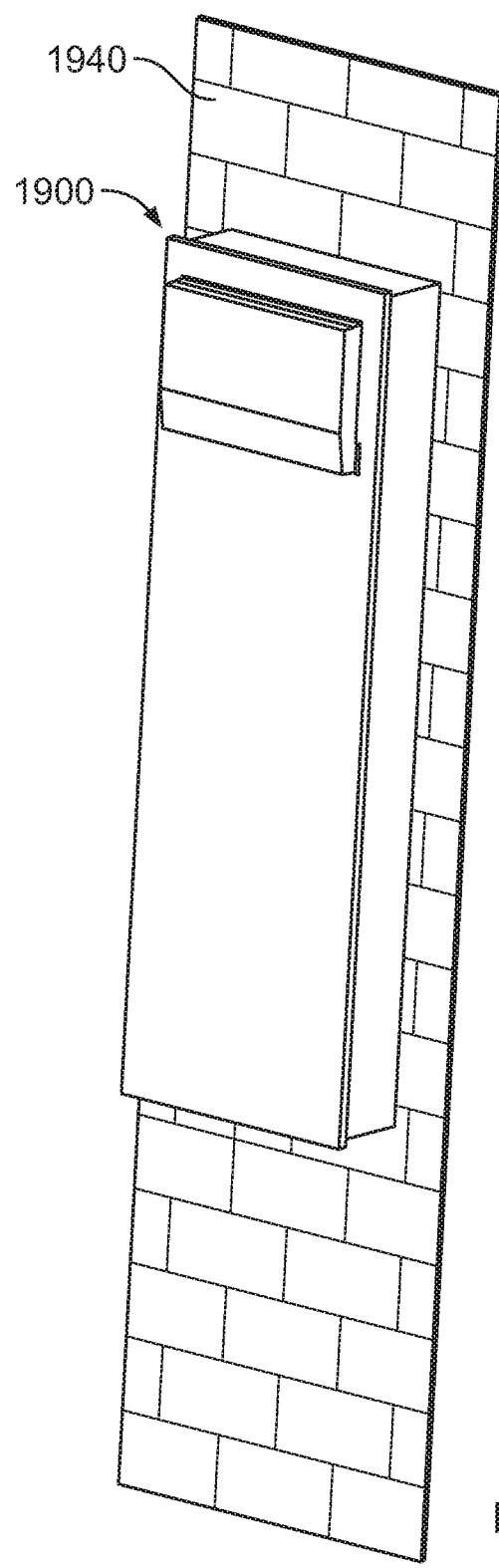

FIGS. 19A-19B show an energy control system 1900 according to some embodiments. Energy control system 1900 may have a housing and/or a door (see e.g., FIG. 17, housing 1710 and door 1730). As shown in FIG. 19B, in some embodiments, energy control system 1900 may be mounted to a wall 1940 of a building.

Figure 20C:
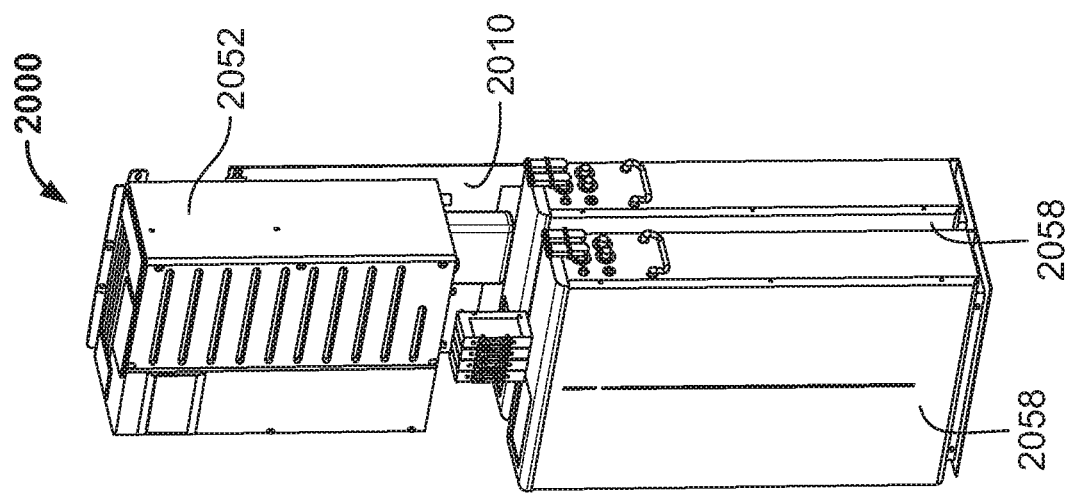
FIGS. 20A-20C illustrate an energy storage system according to an embodiment.
Figure 20B:
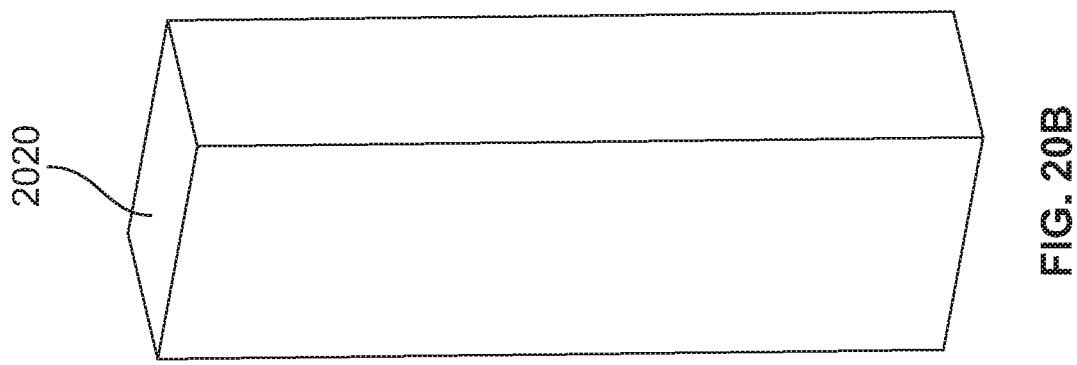
Figure 20A:
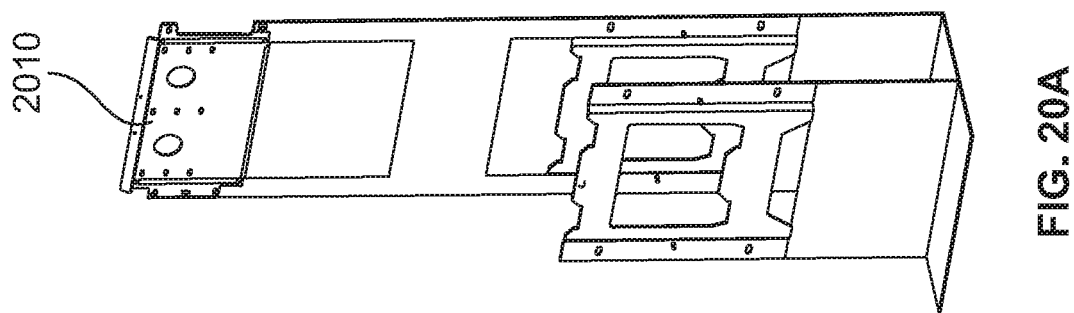
Figure 20D:
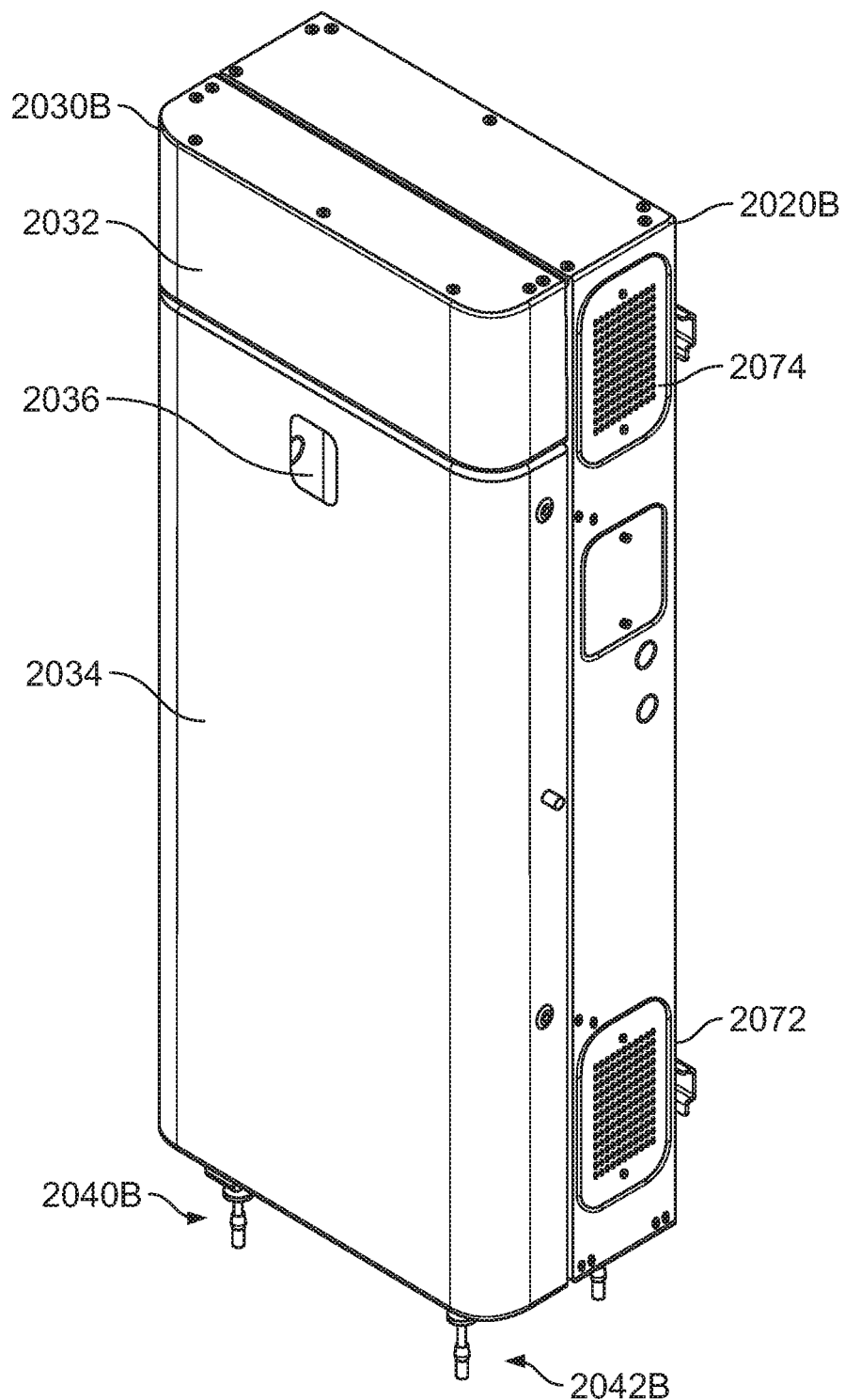
FIGS. 20D-20G illustrate an energy storage system according to an embodiment.
Figure 20E:
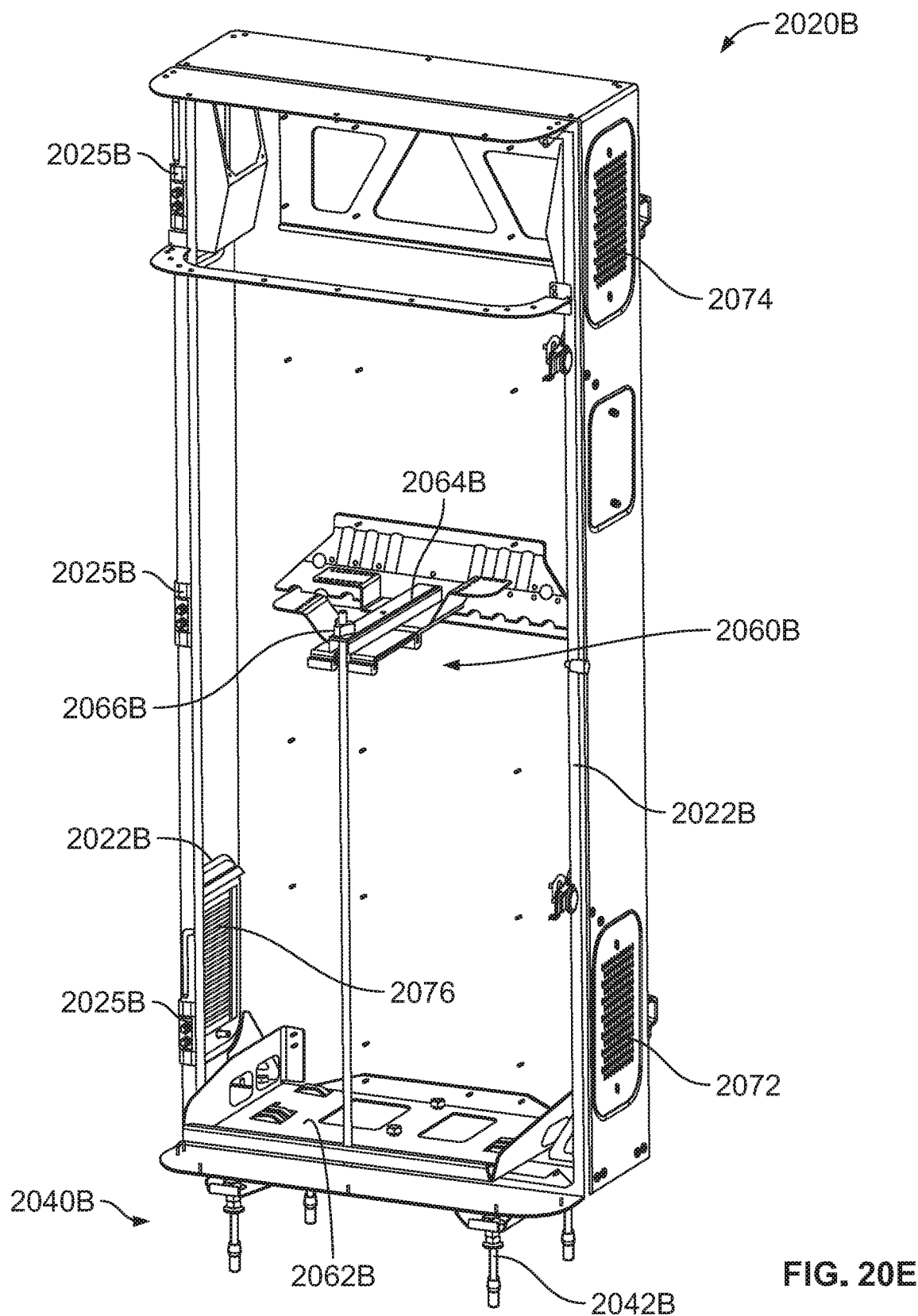
Figure 20F:
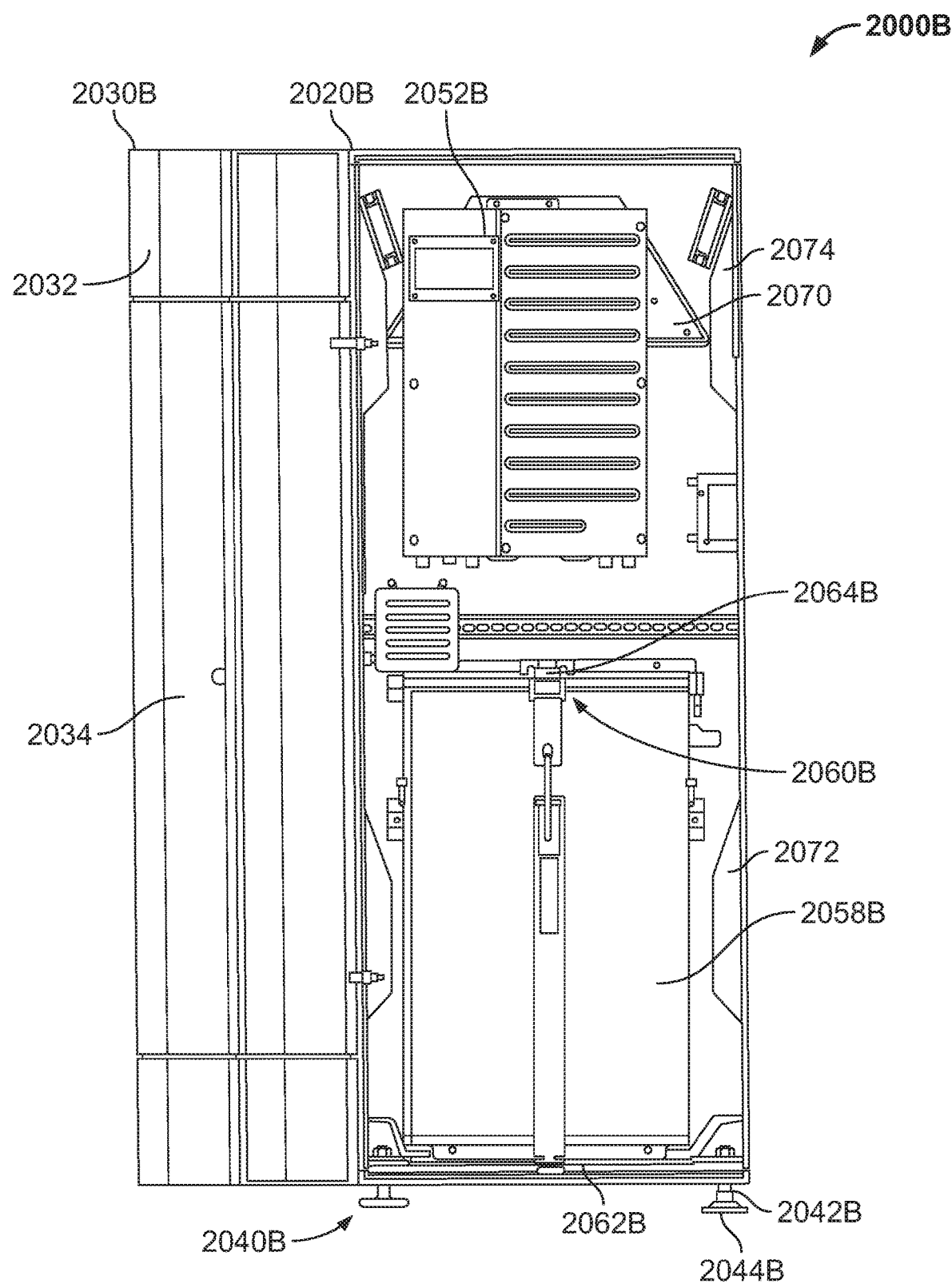
Figure 20G:
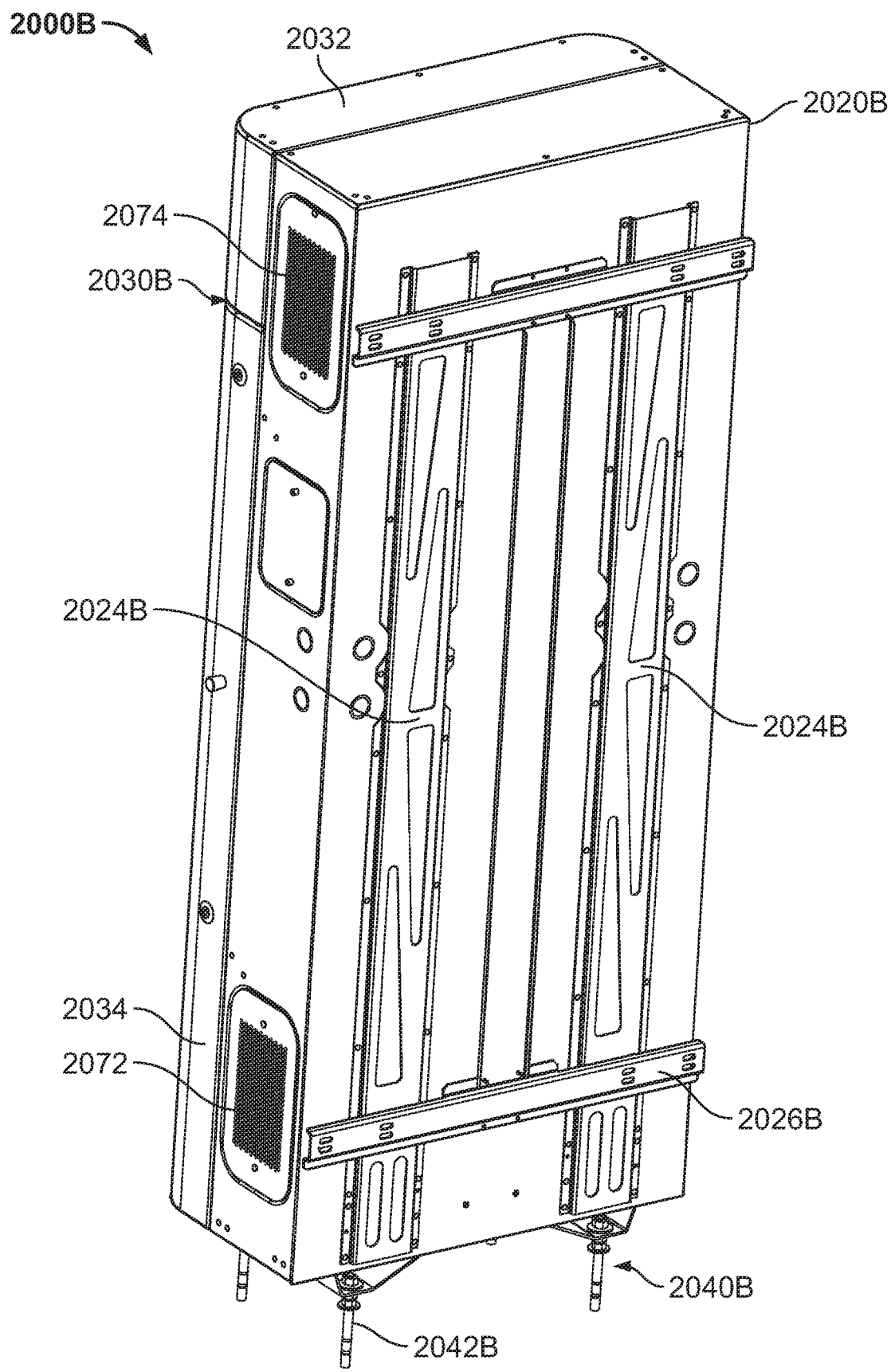
Figure 22A:
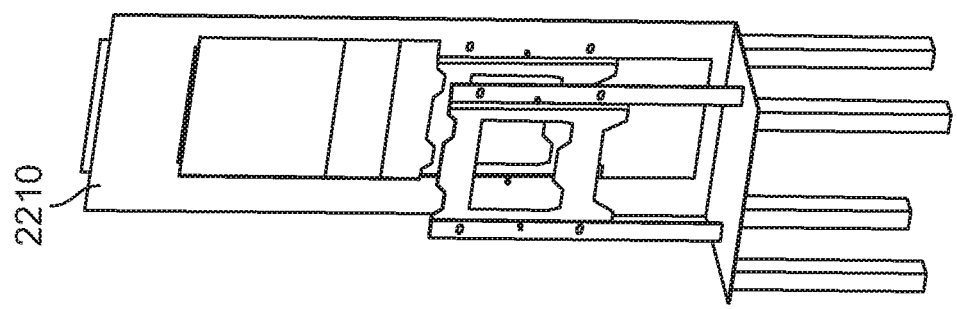
FIGS. 22A-22D illustrate an energy storage system according to an embodiment.

FIGS. 20A-20C show an energy storage system 2000 according to some embodiments. As shown in FIGS. 20A and 20C, in some embodiments, energy storage system 2000 may include a frame 2010. As shown in FIG. 20B, in some embodiments, energy storage system 2000 may include a housing 2020. In some embodiments, housing 2020 may be ventilated. In some embodiments, housing 2020 may include an access door. In some embodiments, housing 2020 may include a dead front cover. In some embodiments, housing 2020 may include conduit openings, knockout holes, or the like for power and/or communication cables. In some embodiments, housing 2020 may include a window such that a user can see inside housing 2020 while the access door is closed. As shown in FIG. 20C, in some embodiments, energy storage system 2000 may include a converter 2052 and one or more batteries 2058. Converter 2052 and/or batteries 2058 may be coupled to, disposed on, and/or supported by frame 2010. In some embodiments, frame 2010 includes slot(s) for batteries 2058. In some embodiments, converter 2052 may be hung from frame 2010. As shown in FIG. 20C, in some embodiments, energy storage system 2000 may be disposed substantially in a vertical arrangement.

FIGS. 20D-G show an energy storage system 2000B according to some embodiments. In some embodiments, energy storage system 2000B may include a housing 2020B and a door 2030B coupled to housing 2020B, for example via a hinge 2025B such that door 2030B is configured to swing about the hinge between an open position and a closed position. In some embodiments, the hinge 2025B may include half-barrels disposed along a side edge of door 2030B and housing 2020B, where the half-barrels of door 2030B and housing 2020B interlock to receive a pin. In some embodiments, housing 2020B and/or door 2030B may include latches disposed along a side edge of housing 2020B or door 2030B, and/or a padlock disposed, for example, along a bottom edge of housing 2020B or door 2030B to secure door 2030B in the closed position. In some embodiments, door 2030B may include a bottom section 2034 comprised of a metal-based material (e.g., aluminum, steel) and a top section 2032 comprised of a polymer-based material (e.g., polyethylene, polyethylene terephthalate, polyvinyl chloride, polypropylene, polycarbonate). In some embodiments, bottom section 2034 and top section 2032 of door 2030B may be coupled to one another. In some embodiments, door 2030B may include a display 2036 (e.g., user interface 2790 shown in FIG. 30).

In some embodiments, housing 2020B may be mounted to a wall and/or floor (e.g., the ground, a cement or tile floor, etc.) to secure energy storage system 2000B in place and protect it from damage (e.g., from loose equipment stored near the energy storage system, seismic activity, etc.). In some embodiments, housing 2020B may include one or more rails 2024B and a perforated bracket 2026B, for example disposed along the back of housing 2020B, to mount housing 2020B to a wall. In some embodiments, housing 2020B may include one or more (e.g., two, three, or four) feet assembly 2040B, for example disposed along a bottom of housing 2020B. In some embodiments, feet assembly 2040B may include a plurality of bolt-feet 2042B projecting from the bottom of housing 2020B and a floor mounting bracket 2044B disposed at the end of feet 2042B to mount to the floor. In some embodiments, feet assembly 2040B may include concrete anchor bolts to secure bracket 2044B to the floor. In some embodiments, the length of feet 2042B may be adjustable such that feet assembly 2040B is configured to provide a level base for housing 2020B, even if mounted to an uneven floor surface. In some embodiments, feet assembly 2040B is configured to comply with seismic compliance codes. In some embodiments, feet assembly 2040B may be separately installed onto housing 2020B.

In some embodiments, energy control system 2000B may be used outdoors. In some embodiments, housing 2020B meets NEMA-3 enclosure standards by forming a sealed enclosure with door 2030B. In some embodiments, housing 2020B and/or door 2030B may include one or more gaskets 2022B, for example disposed along the side edges and an upper side thereof to form a seal between housing 2020B and door 2030B when set in a closed position. In some embodiments, housing 2020B and/or door 2030B may include a gasket disposed along each longitudinal and upper side thereof to prevent or reduce the amount of water, dirt, or debris, for example, from entering the unit. In some embodiments, the gasket may be formed of a foam-based material having elastic properties.

In some embodiments, housing 2020B is configured to receive one or more converter 2052B and one or more batteries 2058B. In some embodiments, converter 2052B may be disposed within an upper portion of housing 2020B, for example mounted to an interior wall of housing 2020B. In some embodiments, housing 2020B may include a battery mounting unit 2060B, for example disposed within a lower portion of housing 2020B and configured to hold one or more batteries 2058B. In some embodiments, housing 2020B may include a wire harness to hold wires extending between converter 2052B and the one or more batteries 2058B. In some embodiments, battery mounting unit 2060B includes a bracket 2062B, for example disposed on the bottom of housing 2020B and configured to receive one or more batteries 2058B. In some embodiments, battery mounting unit 2060B includes a clamp 2064B configured to couple to a top of the one or more batteries 2058B. In some embodiments, clamp 2064B is configured to snap over the one or more batteries 2058B (e.g., over a top of a battery). In some embodiments, clamp 2064B is configured to be pressure-fitted against the top of the batteries 2058B, and the clamp 2064B may include a knob 2066B to adjust the tension of the pressure-fit against the one or more batteries 2058B. By allowing adjustment of the pressure-fit or establishing securement by snapping, battery mounting unit 2060B enables faster installation of the one or more batteries 2058B within housing 2020B. As such, to insert a battery, a user may lift clamp 2064B, insert a battery onto battery mounting unit 2060B (e.g., by sliding the battery onto battery mounting unit 2060B such that a slot in the battery mates with the battery mounting unit 2060B), and closing the clamp 2064B to secure the battery in place. This arrangement increases the speed and ease with which the user can change the batteries.

In some embodiments, housing 2020B and door 2030B may be ventilated by forced air convection to maintain converter 2052B and the one or more batteries 2058B at an effective operating temperature. In some embodiments, housing 2020B or door 2030B may include an inlet vent 2072, an outlet vent 2074, and a fan 2070 to draw ambient air into housing 2020B via inlet vent 2072 and propel heated air out of housing 2020B via outlet vent 2074. In some embodiments, outlet vent 2074 is disposed proximate to a top of housing 2020B and inlet vent 2072 is disposed proximate to a bottom of housing 2020B, such that ambient air is drawn through a bottom portion housing 2020B and circulated to an upper portion of housing 2020B. In some embodiments, inlet vent 2072 and outlet vent 2074 may include a set of louvers 2076 and/or an air filter to protect against ingress of solid foreign objects (e.g., dirt, dust) and the ingress of liquid (e.g., rain, sleet, snow) such that housing 2020B complies with NEMA-3 standards. In some embodiments, the louvers of inlet vent 2072 and outlet vent 2074 are configured to protect against spraying liquids (e.g., jet-sprayed water) so that water is prevented from reaching the air filter of vents 2072, 2074.

Figure 21:
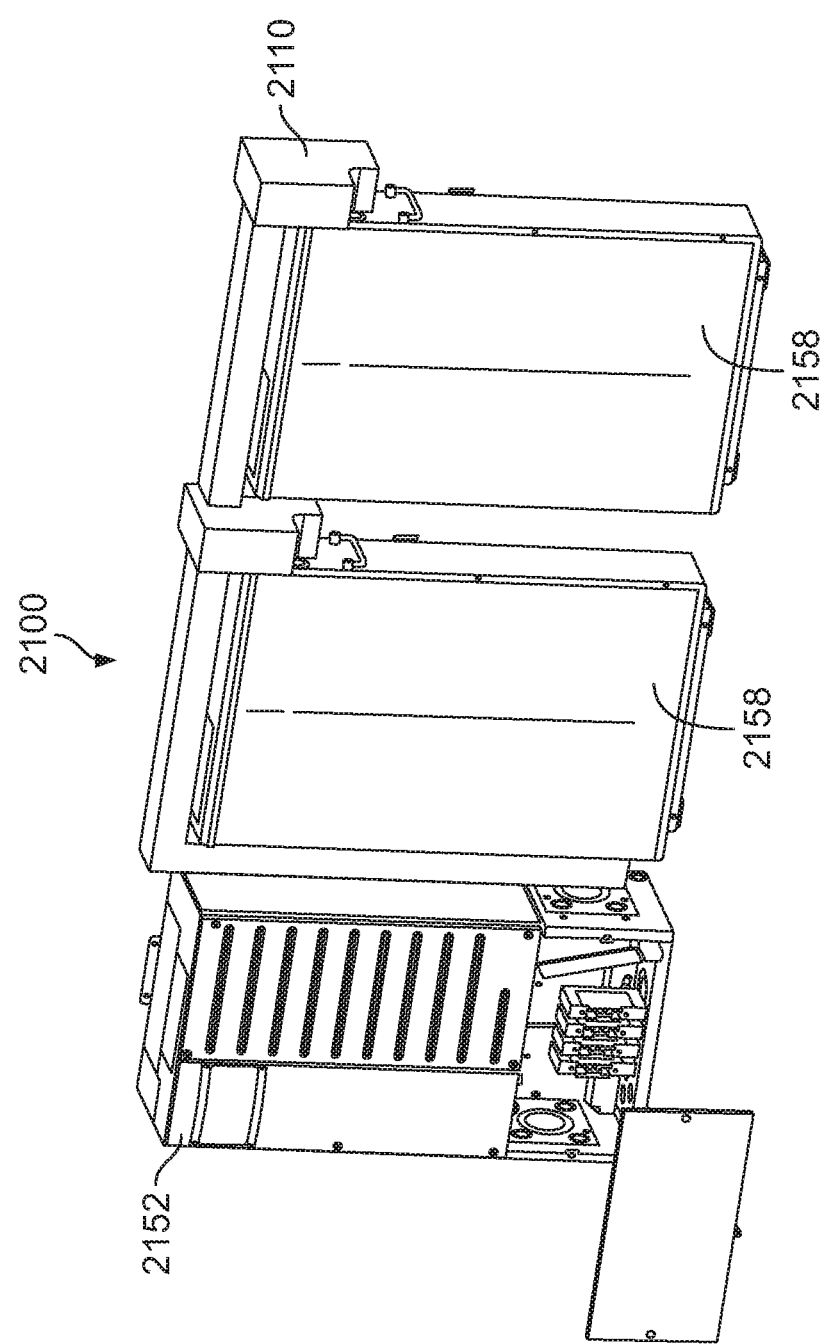
FIG. 21 illustrates an energy storage system according to an embodiment.

FIG. 21 shows an energy storage system 2100 according to some embodiments. As shown in FIG. 21, in some embodiments, energy storage system 2100 may include a frame 2110, a converter 2152, and batteries 2158. As shown in FIG. 21, in some embodiments, energy storage system 2100 may be disposed substantially in a horizontal arrangement. In some embodiments, energy storage system 2100 may be disposed indoors. In some embodiments, energy storage system 2100 may include cable raceways for power and/or communication cables.

Figure 39:
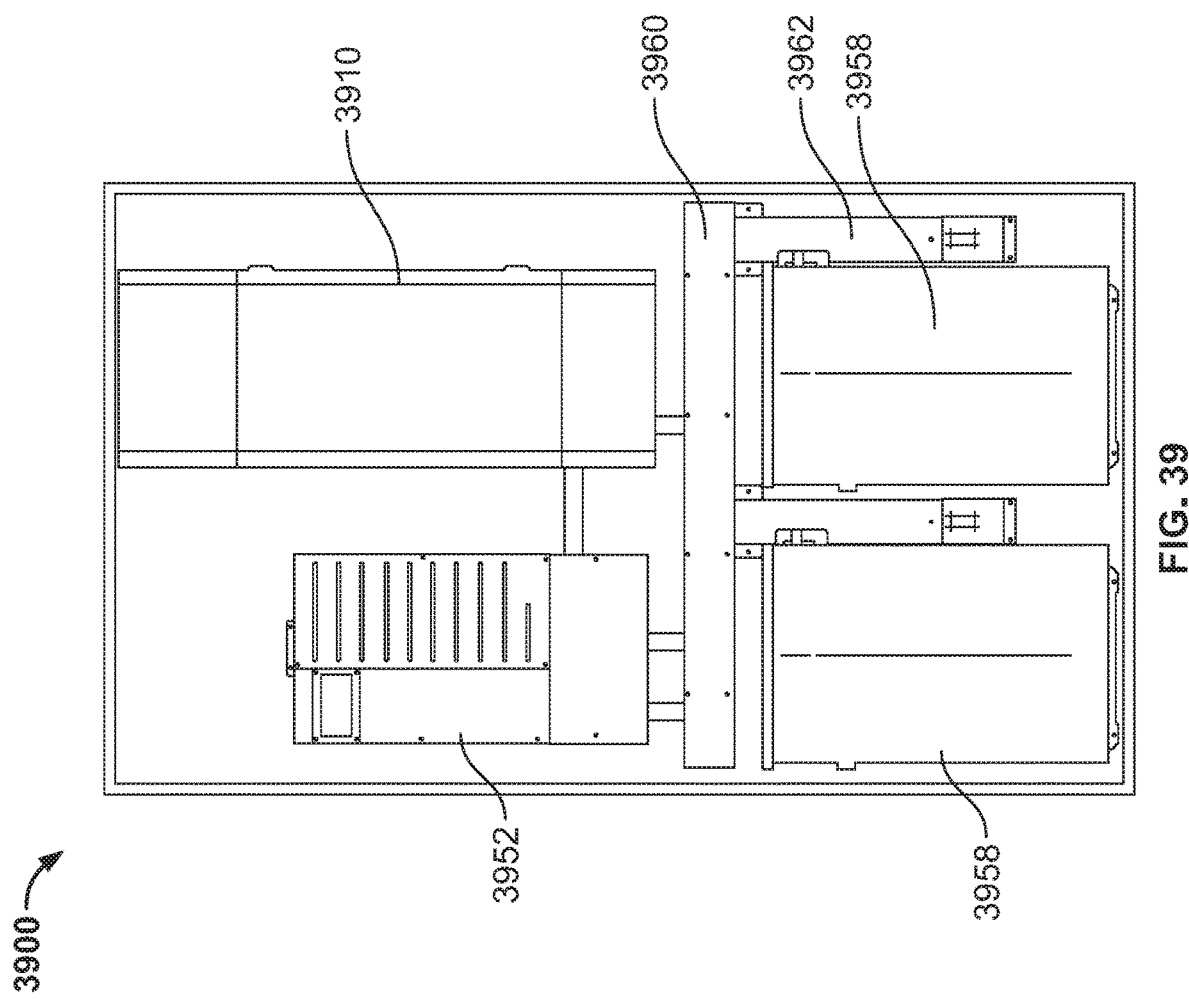
FIG. 39 illustrates an energy storage system according to an embodiment.

FIG. 39 shows an energy storage system 3900 according to some embodiments. As shown in FIG. 39, in some embodiments, energy storage system 3900 may include a converter 3952, batteries 3958, and an energy control system 3910. In some embodiments, energy control system 3910 may be any one of the energy control systems (e.g., energy control system 810 shown in FIG. 8A or energy control system 3310 shown in FIG. 33). In some embodiments, energy storage system 3900 may include raceway conductors 3960 and 3962 electrically connecting batteries 3958 to converter 3952 and energy control system 3910.

Figure 22D:
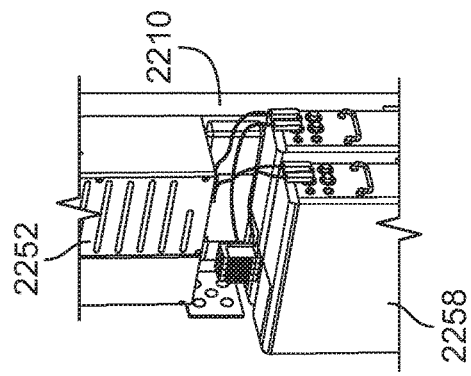
Figure 22C:
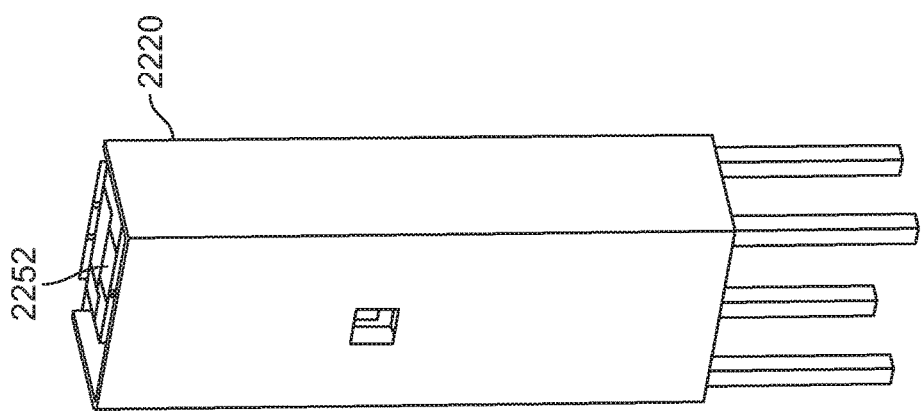
Figure 22B:
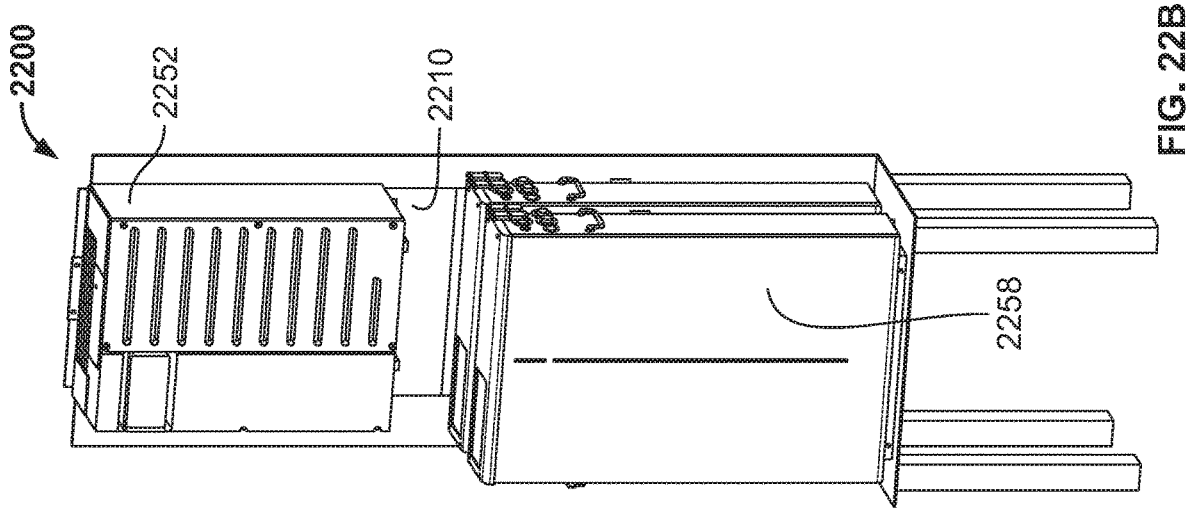

FIGS. 22A-22D show an energy storage system 2200 according to some embodiments. As shown in FIGS. 22A-22D, in some embodiments, energy storage system 2200 may include a frame 2210. As shown in FIG. 22C, in some embodiments, energy storage system 2200 may include a housing 2220. In some embodiments, housing 2220 may include an access door. As shown in FIG. 22B-22D, in some embodiments, energy storage system 2200 may include a converter 2252. As shown in FIGS. 22B and 22D, in some embodiments, energy storage system 2200 may include batteries 2258. In some embodiments, converter 2252 and/or batteries 2258 may be installed in a ventilated housing 2220, for example, a housing that meets NEMA-3 enclosure standards. In some embodiments, energy storage system 2200 may be installed indoors or outdoors. In some embodiments, energy storage system 2200 may be modular and/or customizable based on the installation location.

Some smart devices (e.g., smart outlets, smart plugs, smart bulbs, or the like) may permit a homeowner to, for example, remotely control the state (e.g., on and off) of certain electrical devices (e.g., lamps and light fixtures) and/or monitor the power consumption of the electrical devices to which they are connected. Similarly, some smart appliances (e.g., smart washers, smart refrigerators, or the like) may be configured to be remotely controlled by a user and/or to monitor their power consumption. While such smart devices and smart appliances may afford a homeowner the ability to control their electrical devices remotely, they may be impractical and expensive to implement in a home, for example, if control over a large quantity of devices is desired.

For example, if a homeowner wishes to remotely control the lighting in several rooms of their home, it may be necessary to acquire and install a quantity of smart devices (e.g., smart outlets or smart bulbs) that may be proportional to the number lighting devices over which control is desired. Considering that a home may include many lights (as well as other electric devices that a homeowner may wish to remotely control) it may be expensive and impractical to purchase and install such a large quantity of smart devices in a home. Further, the homeowner may also need to configure and connect each individual device to a home network (e.g., a WIFI™ network), which may be cumbersome and time consuming. Accordingly, for such systems, as the quantity of controlled devices increases, the costs and complexity of installation may also increase.

Embodiments described herein may allow a user to remotely control and/or monitor the power consumption of many electrical devices in a practical and cost-efficient manner. Embodiments may include, for example, a remotely-controllable switch that interrupts the flow of current to an entire electrical circuit, thereby allowing one remotely-controllable switch to control the state of one or more electrical devices connected to the electrical circuit. Further, such a system may allow a homeowner to control and/or monitor the power consumption of "non-smart" appliances (i.e., without network connectivity) in an easy and efficient manner. This may be of particular value for large appliances such as, for example, a washer, dryer, air conditioner, dishwasher, or the like, where the costs and complexity associated with replacing the non-smart appliance with a smart appliance may be high. In some embodiments, each of the remotely-controllable switches may be controlled by a single controller (e.g., controller 2330, described below), which may simplify installation and use of the system, and may allow a homeowner to control many electrical devices in their home using a single, convenient interface.

Figure 23:
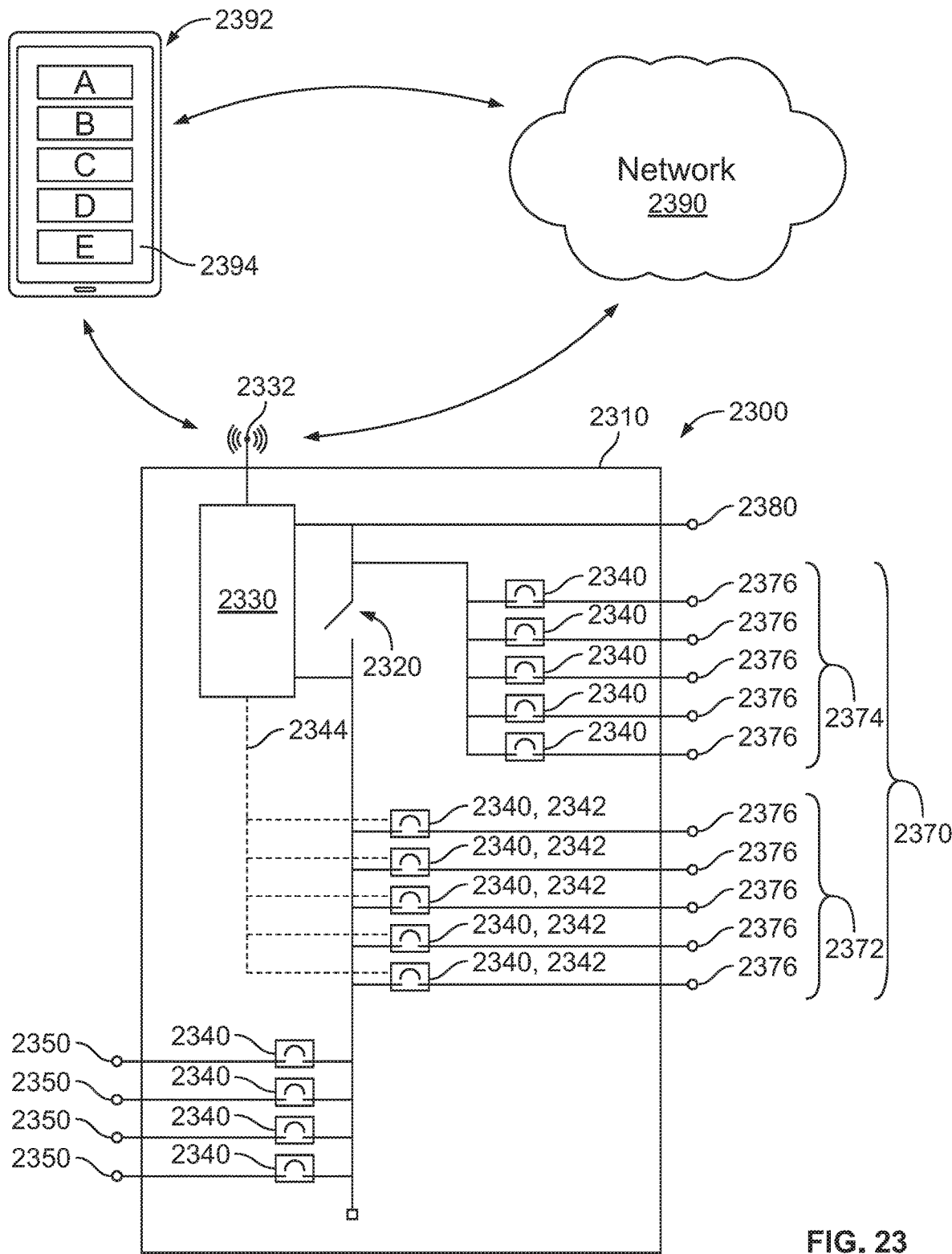
FIG. 23 illustrates an electrical system and a network according to an embodiment.

As shown in FIG. 23, for example, energy control system 2310 may include one or more electrical switches 2340. Electrical switch 2340 may be, for example, a device for interrupting the flow of current in an electrical circuit. In some embodiments, electrical switch 2340 may be or may include, for example, an overcurrent protection device, circuit breaker, fuse, electromechanical circuit breaker, electrical relay, electromechanical relay, reed relay, transistor, solid-state relay, solid-state contactor, and/or solid-state power switch.

In some embodiments, each of electrical switches 2340 may be operated independently of other electrical switches 2340 in electrical system 2300. As shown in FIG. 23, for example, each of electrical switches 2340 may be electrically disposed between an electrical circuit 2376 and the source of power for the electrical circuit 2376 (e.g., grid power 2380, energy storage system 2350, and/or power generation system 2360). Thus, the flow of current to each of electrical circuits 2376 from grid power 2380, energy storage system 2350, and/or power generation system 2360, for example, may be controlled, individually, by opening and closing the corresponding switch for electrical circuits 2376. In some embodiments, electrical switches 2340 may be electrically disposed between loads 2370 and the source of power for loads 2370 (e.g., grid power 2380, energy storage system 2350, and/or power generation system 2360). Thus, opening electrical switches 2340 may interrupt the flow of current to loads 2370 from grid power 2380, energy storage system 2350, and/or power generation system 2360, for example.

In some embodiments, electrical switch 2340 may be a remotely-controllable switch 2342. Remotely-controllable switch 2342 may be configured to be remotely controlled, which is to say that remotely-controllable switch 2342 may be operated without direct physical interaction from a user. In some embodiments, remotely-controllable switch 2342 may be or may include, for example, an overcurrent protection device, circuit breaker, electromechanical circuit breaker, electrical relay, electromechanical relay, reed relay, solid-state relay, solid-state contactor, and/or solid-state power switch that is capable of being operated remotely. In some embodiments, remotely-controllable switch 2342 may be a motorized overcurrent protection device such as, for example, a motorized circuit breaker. In some embodiments, remotely-controllable switch 2342 may be a smart switch, smart breaker, smart relay, or the like.

Energy control system 2310 may include one, two, three, four or more remotely-controllable switches 2342. In some embodiments, each electrical switch 2340 that is disposed between a load 2370 and the source of power for the load 2370 (e.g., grid power 2380, energy storage system 2350, and/or power generation system 2360) may be a remotely-controllable switch 2342. In some embodiments, energy control system 2310 may include remotely-controllable switches 2342 as well as switches that are not remotely-controllable. In some embodiments, each electrical switch 2340 that is disposed between a non-backup load 2374 and the source of power for the non-backup loads 2374 (e.g., grid power 2380) may not be remotely controllable. In some embodiments, each electrical switch 2340 that is disposed between a backup load 2372 and the source of power for the backup load 2372 (e.g., grid power 2380, energy storage system 2350, and/or power generation system 2360) may be a remotely-controllable switch 2342.

In some embodiments, remotely-controllable switch 2342 may be configured to be controlled, for example, by a controller 2330. Controller 2330 may be or may include, for example, a computer, microcontroller, or other processing device. In some embodiments, controller 2330 may be a photovoltaic monitoring system (e.g., photovoltaic monitoring system 330, described above). Remotely-controllable switches 2342 may be connected to controller 2330 using one or more control cables 2344. In some embodiments, control cable 2344 may be, for example, a controller area network (CAN) bus, a power line communication cable (PLC), an RS485 cable, or other cable capable of sending electronic data between controller 2330 and remotely-controlled switches 2342. In some embodiments, controller 2330 and remotely-controllable switches 2342 may be configured to communicate wirelessly and may operate on a variety of frequencies, such as Very High Frequency (e.g., between 30 MHz and 300 MHz) or Ultra High Frequency (e.g., between 300 MHz and 3 GHz) ranges, and may be compatible with certain network standards such as cell phone, WIFI™, or BLUETOOTH® wireless networks, for example.

In some embodiments, remotely-controllable switch 2342 may be configured to receive electronic data from controller 2330, and may be configured to change state (e.g., opening or closing the switch) based on the electronic data received. In some embodiments, remotely-controllable switch 2342 may also be configured to send electronic data to controller 2330. For example, in some embodiments, remotely-controllable switch 2342 may include a load meter (such as, e.g., load meter 340 described above) configured to monitor the flow of current through the switch (and, accordingly, through the corresponding circuit 2376), and remotely-controllable switch 2342 may be configured to send electronic data (e.g., computer-processable data and/or information represented by an analog or digital signal) relating to the flow of current through the switch to controller 2330.

As shown in FIG. 23, for example, controller 2330 may include a transceiver 2332 that is configured to send and receive information wirelessly. Transceiver 2332 may allow controller 2330 to connect to a network 2390, which may include, for example, a Wireless Local Area Network ("WLAN"), Campus Area Network ("CAN"), Metropolitan Area Network ("MAN"), or Wide Area Network ("WAN"). Transceiver 2332 may be configured to operate on a variety of frequencies, such as Very High Frequency (e.g., between 30 MHz and 300 MHz) or Ultra High Frequency (e.g., between 300 MHz and 3 GHz) ranges, and may be compatible with specific network standards such as cell phone, WIFI™, or BLUETOOTH® wireless networks, for example. In some embodiments, controller 2330 may connect to network 2390 using a wired connection (e.g., Ethernet or the like).

In some embodiments, controller 2330 may also be configured to connect to, control, and/or receive information from network-connected smart devices and/or smart appliances (e.g., smart outlets, smart plugs, smart bulbs, smart washers, smart refrigerators). For example, controller 2330 may send electronic data to and receive electronic data from network-connected smart devices and/or smart appliances over network 2390. In this manner, controller 2330 may control devices and/or appliances individually, rather than controlling the entire circuit 2376 to which the devices and/or appliances are connected. Such flexibility in control may allow homeowners to tailor energy control system 2310 to fit the unique needs of their home. Further, such flexibility may allow homeowners to integrate smart devices and/or smart appliances into a single, centralized control system, which may simplify setup and use of energy control system 2310.

In some embodiments, controller 2330 may communicate with a user device 2392 over network 2390. User device 2392 may be, for example, a cell phone, smartphone, tablet computer, laptop computer, desktop computer, personal computer, wearable computer, smartwatch, or other computing device capable of connecting to network 2390 through a wired or wireless connection. In some embodiments, user device 2392 may connect directly to controller 2330 (e.g., using a wired or a peer-to-peer network connection).

In some embodiments, user device 2392 may include a user interface 2394. In some embodiments, user interface 2394 includes a touch screen display for receiving user input and communicating information to the user. In some embodiments, user interface 2394 includes electromechanical buttons for receiving input from a user. In some embodiments, user interface 2394 includes a visual display for communicating with or displaying information to a user. In some embodiments, user interface 2394 includes a combination of touch screens, electromechanical buttons, and/or visual displays.

User interface 2394 may display information about, for example, the type(s) of loads 2370 in electrical system 2300, groupings of loads 2370 in electrical system 2300, present and/or average power consumption of loads 2370 (e.g., an energy demand associated with the plurality of loads), the state of remotely-controllable switches 2342, the amount of power available in energy storage system 2350, the amount of power produced by power generation system 2360, and/or other information relating to energy control system 2310 or electrical system 2300. User interface 2394 may receive input from the user of user device 2392 that may be used, for example, to control functions of energy control system 2310. For example, in some embodiments, a user may control one or more remotely-controllable switches 2342 remotely via user device 2392. In some embodiments, a user may automate remotely-controllable switches 2342 (e.g., automatically opening and/or closing at pre-set times) via user device 2392. In some embodiments, user device 2392 may include an application configured to receive information from and send information to controller 2330.

Controller 2330, user device 2392, and/or another storage device (e.g., a server connected to network 2390) may include memory for storing information about electrical system 2300 and/or energy control system 2310. This information may include, for example, historical data regarding the amount of power consumed by loads 2370 and the times at which the power was consumed. In some embodiments, the information may include historical data regarding the amount of power consumed by each circuit 2376 and the times at which the power was consumed. In some embodiments, the information may include, historical data regarding the amount of power consumed by individual devices and/or appliances and the times at which the power was consumed. In some embodiments, controller 2330 may determine the type of appliance, for example, based on the power profile observed by controller 2330. In some embodiments, the information may include historical data regarding the state of remotely-controllable switches 2342, the amount of power available in energy storage system 2350, the amount of power produced by power generation system 2360, and/or other information relating to energy control system 2310 or electrical system 2300. As described in further detail below, the data collected by controller 2330 may aid in predicting future power consumption rates, which may be used to more efficiently provide power to backup loads 2372 during a power outage.

In order to comply with certain electrical codes and/or to prevent backup loads from drawing more power than a backup power system is able to provide, some backup power systems may be sized such that the backup power system is able to provide power to all of the backup loads simultaneously. In practice, however, the backup loads may not all draw power simultaneously, thus resulting in a backup power system that may be unnecessarily oversized, which may increase the expenses associated with installing and maintaining the backup power system. Alternatively, in order to utilize a smaller backup power system, a homeowner may be required to choose a limited selection of loads to which backup power is provided.

Energy control system 2310 may dynamically supply backup power to backup loads 2372, which may allow a homeowner to provide power to backup loads 2372 using a more efficiently-sized backup power system (e.g., energy storage system 2350 and/or power generation system 2360). In some embodiments, energy control system 2310 may provide power to certain backup loads 2372 sequentially—as opposed to simultaneously—so long as the power consumed by backup loads 2372 at any one time does not exceed the amount of power that the backup power system is capable of supplying. For example, controller 2330 may actively monitor power usage of backup loads 2372, and may turn off certain circuits and/or smart devices if power consumption (e.g., load demand associated with respective backup loads 2372) is too high. Further, controller 2330 may prevent circuits 2376 and/or smart device from being turned on if doing so would (or likely would) exceed power supply thresholds. As described in further detail below, energy control system 2310 may use a series of defaults, rules, and/or checks to make decisions as to which circuits and/or smart devices receive power during a power outage. In this manner, energy control system 2310 may provide backup power to a larger quantity of backup loads 2372 without necessitating an increase in overall size of energy storage system 2350 and/or power generation system 2360.

In some backup power systems, the power lines that provide power to the backup loads may be hardwired (e.g., to an electrical panel). If, for example, a homeowner desires to reconfigure existing backup loads (e.g., to decrease the total backup load or regroup the loads to be supplied backup power), the homeowner may need to rewire portions of the electrical system, which may be difficult, time consuming, and expensive. However, since energy control system 2310 may dynamically supply backup power to backup loads 2372, a homeowner may quickly and easily reconfigure backup loads 2370 (e.g., using an application on a smart phone) without having to rewire the system.

As shown in FIG. 23, for example, in some embodiments, when electrical system 2300 does not receive electricity from grid power 2380 (e.g., during a power outage), micro-grid interconnection device 2320 may be automatically opened (e.g., set in backup mode by controller 2330). While disconnected from grid power 2380, backup loads 2372 may continue to receive power from energy storage system 2350 and/or power generation system 2360.

As mentioned above, in some embodiments, controller 2330 may open or close certain circuits 2376 corresponding to backup loads 2372 using remotely-controllable switches 2342. In some embodiments, controller 2330 may also control other smart devices (e.g., smart outlets, smart plugs, smart bulbs, smart appliances, or the like) that are connected to network 2390 and that receive power from circuits 2376 corresponding to backup loads 2372. Thus, controller 2330 may dynamically adjust the total power consumptions (e.g., energy demand) of backup loads 2372 by changing the state of remotely-controllable switches 2342 and/or the state of other network-connected devices.

As explained above, the amount of power consumed by backup loads 2372 at any one time may not exceed the amount of power that energy storage system 2350 and/or power generation system 2360 may be able to provide at that time. As mentioned above, however, in order to more efficiently size energy storage system 2350 and/or power generation system 2360, the maximum sum of all backup loads 2372 (e.g., if all backup loads 2372 were to draw power simultaneously) may be greater than the amount of power that energy storage system 2350 and/or power generation system 2360 may be able to provide. Accordingly, if energy control system 2310 loses grid power 2380 (e.g., during a grid power outage), certain circuits 2376 corresponding to backup loads 2372 may need to be rapidly disengaged in order to prevent energy storage system 2350 and/or power generation system 2360 from being overloaded. In some embodiments, controller 2330 may be configured to detect a power outage and rapidly open certain remotely-controllable switches 2342 in order to prevent energy storage system 2350 and/or power generation system 2360 from being overloaded. In some embodiments, controller 2330 may detect a power outage and open certain remotely-controllable switches 2342 within approximately 20-200 milliseconds of the detected outage. In some embodiments, controller 2330 may detect a power outage and open certain remotely-controllable switches 2342 within approximately 20-100 milliseconds of the detected outage.

Figure 24:
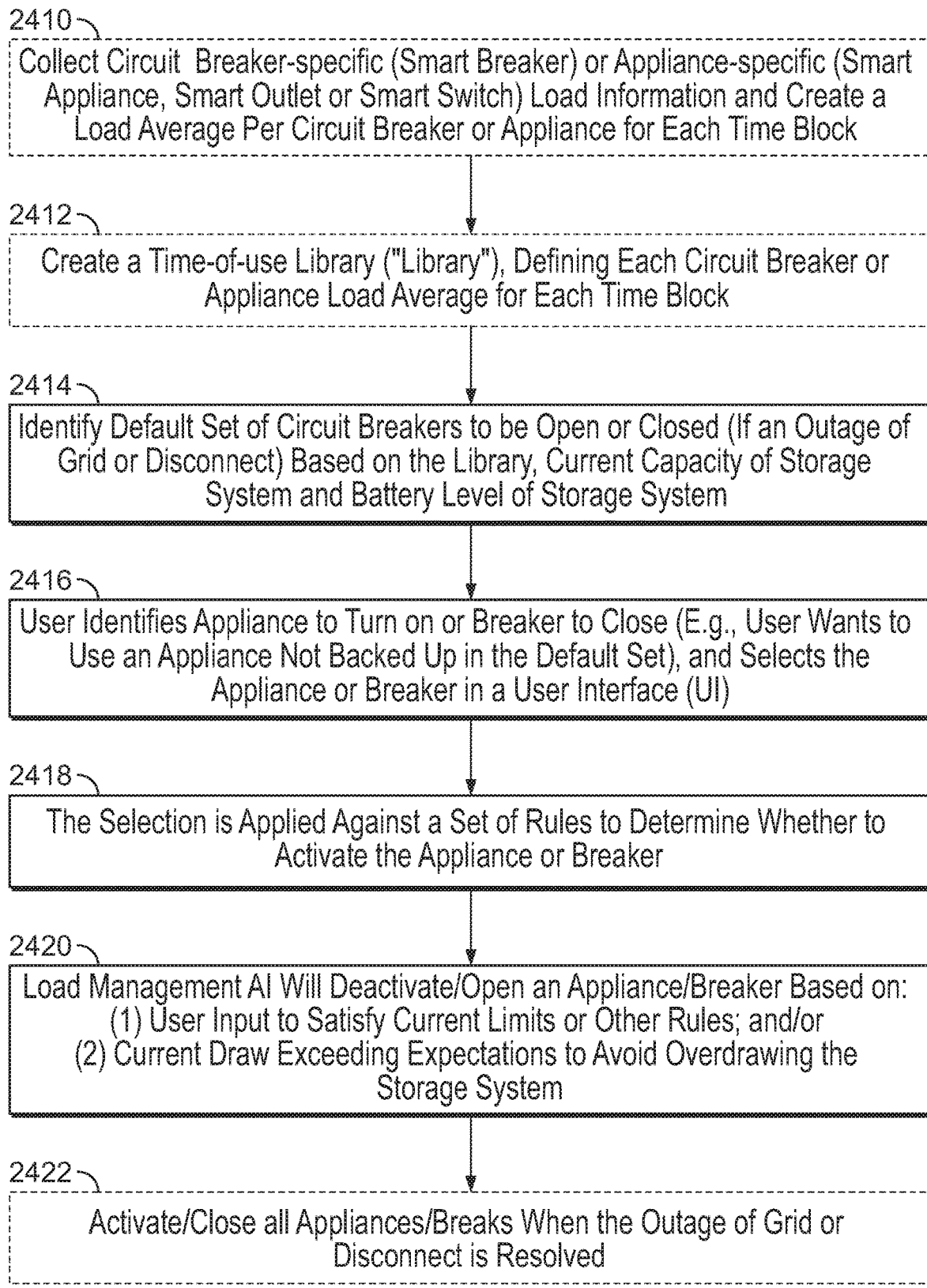
FIG. 24 illustrates an exemplary block diagram showing aspects of a method of controlling an energy control system according to an embodiment.

FIG. 24 shows an exemplary block diagram illustrating aspects of a method of controlling an energy control system according to embodiments (e.g., the embodiment shown in FIG. 23).

At step 2410, controller 2330 may collect information relating to energy control system 2310 and/or electrical system 2300 during normal operation (e.g., not during a grid power outage). As described above, the information may include, for example, data regarding the amount of power consumed by circuits 2376 and the times at which the power was consumed. Further, the information may include data regarding the amount of power consumed by individual smart devices and/or smart appliances and the times at which the power was consumed. In some embodiments, controller 2330 may use the collected electronic data to determine a load average per circuit and/or a load average per smart device corresponding to discrete blocks of time throughout the day. Time blocks may be broken down, for example, into 1-hour blocks, 2-hour blocks, 3-hour blocks, or other time blocks, including, for example, user-designated time blocks (e.g., times when the user may be asleep, at home, or out of the house). In some embodiments, controller 2330 may use the collected data to determine an energy demand based on the amount of power consumed by circuits 2376.

At step 2412, controller 2330 may create a time-of-use library (e.g., a database or other structured set of data) that may define a circuit load average for each circuit 2376 and/or a smart device load average for each smart device with respect to the discrete blocks of time throughout the day. As described below, controller 2330 may use this information to determine which backup loads 2372 receive power as a default during a grid power outage.

At step 2414, controller 2330 may detect a power outage. Then, in some embodiments, controller 2330 may determine a default set of circuits 2376 (and/or default smart devices disposed on circuits 2376) to which backup power will be provided. Controller 2330 may, for example, determine the amount of power that energy storage system 2350 and/or power generation system 2360 are able to provide, the amount of power currently stored in energy storage system 2350, and/or the amount of power currently being produced by power generation system 2360. Controller 2330 may also query the time-of-use library described above at step 2412 to determine, for example, which circuits and/or devices will most likely require power for the instant block of time, and the amount of power that such circuits and/or devices will likely require. Based on this information, controller 2330 may then determine which circuits 2376 (and/or smart devices disposed on circuits 2376) will receive power as a default after the power outage is detected. Then, controller 2330 may change the state of certain remotely-controllable switches 2342 and/or smart devices in accordance with the determined default setting. In some embodiments, a user may modify the default circuits 2376 (and/or smart devices disposed on circuits 2376) as determined by controller 2330. In some embodiments, a user may manually choose which circuits 2376 (and/or smart devices disposed on circuits 2376) will receive backup power as a default after a power outage is detected.

At step 2416, after the default circuits 2376 (and/or smart devices disposed on circuits 2376) have been determined and engaged, a user may request that certain circuits or devices other than the predetermined defaults be turned on. The user may make such a selection using, for example, user device 2392. As described below, controller 2330 may then perform a series of calculations and/or checks to determine if the request may be fulfilled.

At step 2418, after controller 2330 receives a selection from a user (e.g., via user device 2392), controller 2330 may perform a series of calculations and/or checks to determine if the request may be fulfilled. For example, controller 2330 may query the time-of-use library described above to determine the expected load requirement of the selected circuit and/or device. Controller 2330 may also determine the current total power usage of backup loads 2372. Then, controller 2330 may add the expected load requirement of the selected circuit and/or device to the current total power usage of backup loads 2372. If the expected total load with the selected circuit and/or device engaged is greater than the amount of power that energy storage system 2350 and/or power generation system 2360 is able to provide, the user's request may be denied. Controller 2330 may also determine if engaging the selected circuit and/or device would, for example, rapidly deplete energy storage system 2350, violate any electrical codes (e.g., exceeding the maximum allowable current passing through the wires), and/or exceed the current draw limitations of energy storage system 2350 (which may, e.g., damage energy storage system 2350). If controller 2330 determines that engaging the selected circuit and/or device would violate the predetermined rules, the user's request may be denied. If a user's request is denied, user device 2392 may prompt the user to select a different circuit or/and device (or several circuits or/and devices) to disengage such that the backup load 2372 satisfies the necessary requirements in order to supply power to the desired circuit.

At step 2420, after making the above determinations and receiving any necessary user input, controller 2330 may then engage and/or disengage the selected circuits or/and devices in order to complete the user's request. Controller 2330 may then monitor the power consumption of backup loads 2372 to ensure that the loads do not exceed the expected amounts. If backup loads 2372 do draw more power than energy storage system 2350 and/or power generation system 2360 may provide, controller 2330 may, for example, revert to the default state or turn off power to one or more loads in order to prevent energy storage system 2350 and/or power generation system 2360 from being overloaded.

At step 2422, once grid power 2380 is restored, controller 2330 may then close all remotely-controllable switches 2342, thus restoring power to all circuits 2376.

In some embodiments, some or all of the queries, calculations, and/or determinations described above as being performed by controller 2330 may be performed by a remote computing device, such as for example, a server connected to network 2390.

Figure 25:
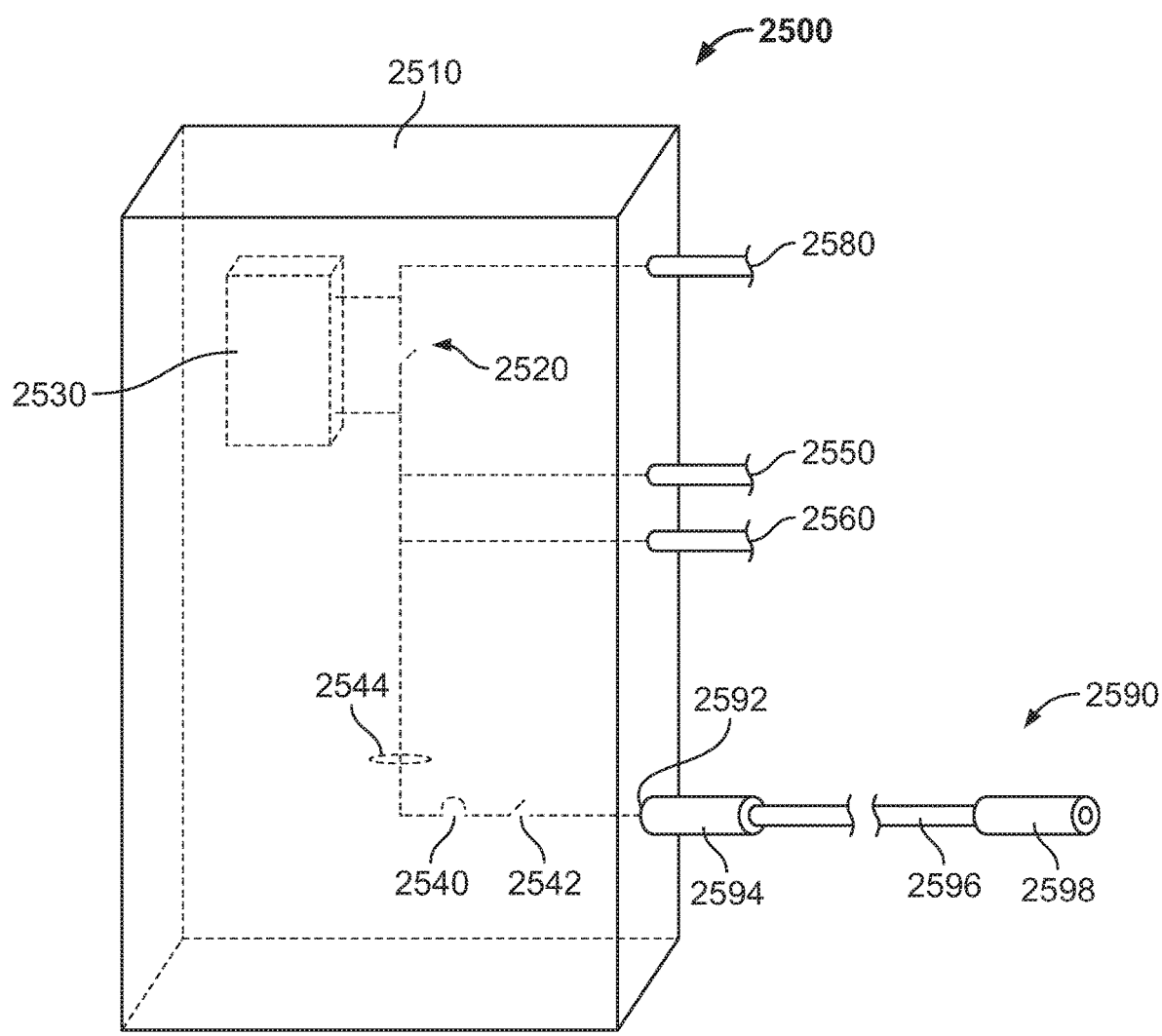
FIG. 25 illustrates an electrical system according to an embodiment.

FIG. 25 shows and electrical system 2500 according to some embodiments. In some embodiments, energy control system 2510 may be configured to provide metered and controllable electrical vehicle ("EV") charger integration. For example, in some embodiments, energy control system 2510 may include an EV charger system 2590. In some embodiments, EV charger system 2590 includes an EV charger cable 2596 for connecting an electric vehicle to energy control system 2510 in order to charge and/or discharge the electric vehicle. In some embodiments, EV charger cable 2596 may include an EV charger handle 2598 that may be configured to be connected to the charging port of an electric vehicle. In some embodiments, EV charger cable 2596 may include an EV charger connector 2594 that may be configured to be received by an EV charger port 2592 of energy control system 2510. In some embodiments, EV charger connector 2594 may be removable from EV charger port 2592. In some embodiments, energy control system 2510 may include a cable management system (e.g., an automatic cable retractor) for storing and organizing EV charger cable 2596. In some embodiments, EV charger system 2590 may be a wireless charging system (e.g., an induction charging system).

In some embodiments, the status and power consumption of EV charger system 2590 may be controlled and monitored using controller 2530, which may include features of controller 2330 described above. In some embodiments, an electrical switch 2542 (e.g., an electric relay) may be disposed between EV charger port 2592 and the source of power for charging the electric vehicle (e.g., grid power 2580, energy storage system 2550, and/or power generation system 2560). In some embodiments, the state (e.g., opened or closed) of electrical switch 2542 may be controlled by controller 2530. Further, in some embodiments, a load meter 2544 may be configured to monitor the amount of power consumed by EV charger system 2590, and controller 2530 may be configured to receive electronic data from load meter 2544 pertaining to the amount of power consumed by EV charger system 2590. In some embodiments, an overcurrent protection device 2540 (e.g., a circuit breaker, electromechanical circuit breaker, fuse, or the like) may also be disposed between EV charger port 2592 and the source of power for charging the electric vehicle (e.g., grid power 2580, energy storage system 2550, and/or power generation system 2560).

In some embodiments, switching and metering of EV charger system 2590 may be performed by a remotely-controllable switch (such as, e.g., remotely-controllable switch 2342 described above). In some embodiments, controller 2530 may be configured to determine, for example, the charge level of a connected electric vehicle. In some embodiments, controller 2530 may be configured to control the state of charging (e.g., whether or not the vehicle is being charged, the rate of vehicle charging, and/or the type of power provided to the vehicle) of a connected electric vehicle. In some embodiments, controller 2530 may send and receive over a network (such as, e.g., network 2390 described above) electronic data pertaining to the charge level and state of charging of a connected electric vehicle. In some embodiments, the charge level and state of charging of a connected electric vehicle may be monitored and/or controlled by a network-connected user device (e.g., user device 2392 described above).

In some embodiments, the energy storage system (e.g., batteries) of an electric vehicle connected to EV charger system 2590 may be used as an energy storage system for energy control system 2510, for example, by discharging the power from the EV. In some embodiments, during a power outage, for example, energy control system 2510 may use energy stored in a connected electric vehicle to power certain backup loads (e.g., backup loads 2372 described above). Accordingly, in some embodiments, the supplemental power provided by a connected electric vehicle may increase the total amount of power that backup power system (e.g., energy storage system 2550 and/or power generation system 2560) is able to provide.

Figure 26:
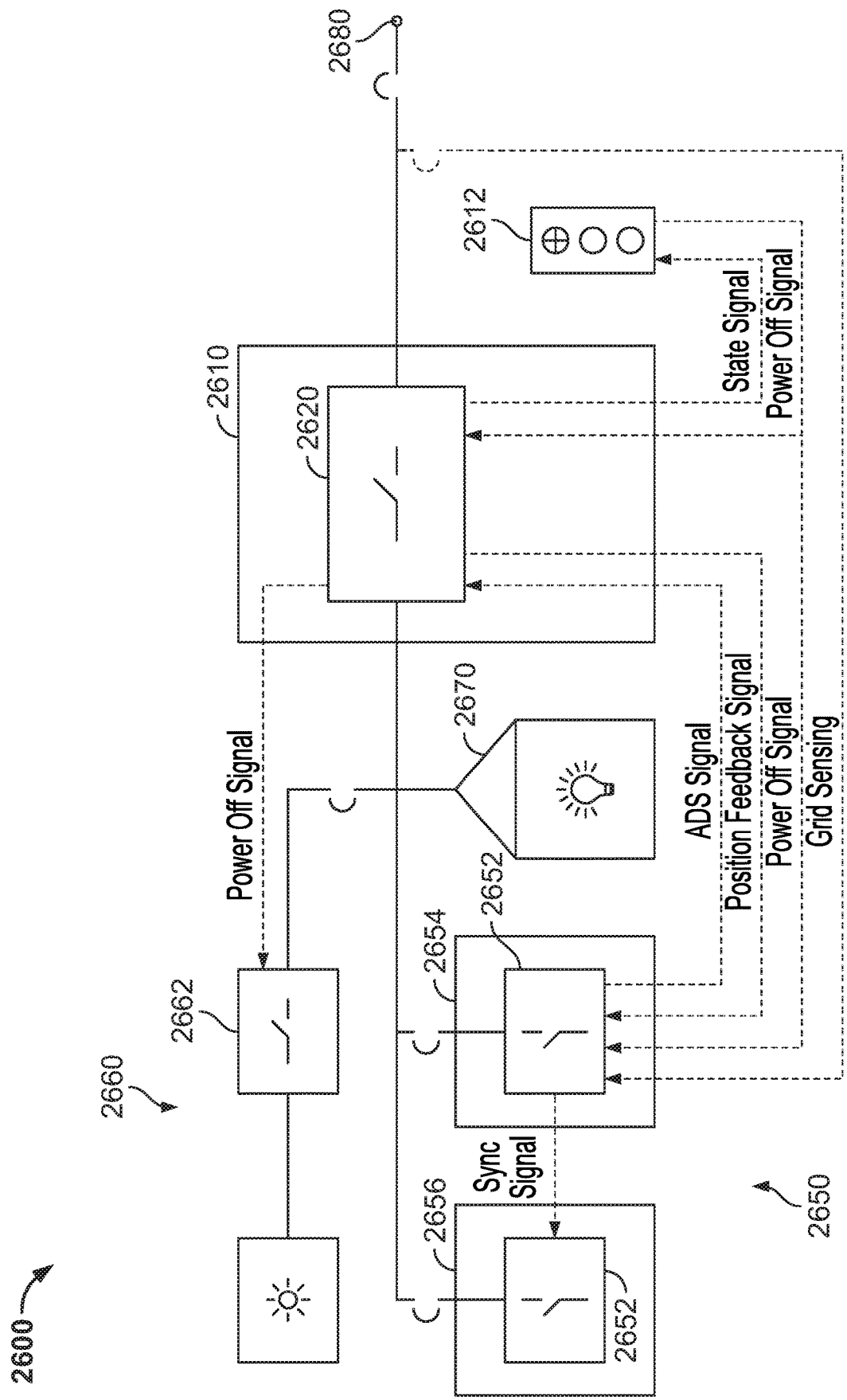
FIG. 26 illustrates an electrical system according to an embodiment.

FIG. 26 shows an electrical system 2600 according to some embodiments. In some embodiments, portions of electrical system 2600 may be configured to be rapidly de-energized, for example, in order to comply with certain electrical codes and/or to improve safety conditions for personnel (e.g., first responders) operating in the vicinity of electrical system 2600. For example, in some embodiments, electrical system 2600 may include a rapid shutdown switch 2612 (which may include features of rapid shutdown switch 624, described above) that is configured to rapidly de-energize portions of electrical system 2600 (e.g., portions of energy storage system 2650 and/or power generation system 2660). For example, during an emergency (e.g., a fire), persons such as first responders (e.g., firefighters) may use rapid shutdown switch 2612 to quickly de-energize portions of energy storage system 2650 and/or power generation system 2660 in order to safely operate in the vicinity of the de-energized portions of energy storage system 2650 and/or power generation system 2660.

In some embodiments, certain portions of electrical system 2600 may be de-energized, for example, by opening certain electrical switches or discharging energy from certain electrical components. In some embodiments, when rapid shutdown switch 2612 is engaged (e.g., pressed), energy control system 2610 may directly or indirectly receive a command (e.g., "Power Off Signal") from rapid shutdown switch 2612, and then microgrid interconnection device ("MID" or "ATS" or "ADS") 2620 may open (set in backup mode) in order to disconnect energy control system 2610 from grid power 2680. In some embodiments, when rapid shutdown switch 2612 is engaged, energy storage system 2650 may be disconnected from other portions of electrical system 2600. For example, converter 2652 may directly or indirectly receive a command (e.g., "Power Off Signal") from rapid shutdown switch 2612, and then may, for example, open a switch or otherwise disconnect energy storage system 2650 from other portions of electrical system 2600. In some embodiments, when rapid shutdown switch 2612 is engaged, power generation system 2660 may be disconnected from other portions of electrical system 2600. For example, converter 2662 may directly or indirectly receive a command (e.g., "Power Off Signal") from rapid shutdown switch 2612, and then may, for example, open a switch or otherwise disconnect power generation system 2660 from other portions of electrical system 2600. In some embodiments, when rapid shutdown switch 2612 is engaged, energy storage system 2650 and power generation system 2660 may be disconnected from each other and from other portions of electrical system 2600 (e.g., loads 2670), and energy control system 2610 may be disconnected from grid power 2680.

In some embodiments, during a power outage, for example, energy control system 2610 may be configured to automatically transition from an on-grid configuration to an off-grid (e.g., micro-grid) configuration. To facilitate on-grid operation, some or all of converters 2652 and/or converter 2662 may include a grid following mode. In grid following mode, converters 2652 and/or 2662 may follow the power characteristics (e.g., voltage magnitude and frequency) of grid power 2680, for example, by controlling the current and phase angle of power distributed by the converter. To facilitate micro-grid operation, some or all of the converters 2652 and/or converter 2662 may include a grid forming mode. In grid forming mode, converters 2652 and/or 2662 may emulate the characteristics of grid power 2680 (e.g., voltage magnitude and frequency) by controlling, for example, the voltage magnitude and frequency of power distributed by the converter.

In some embodiments, energy storage system 2650 may include a master storage unit 2654 and one or more slave storage units 2656. In some embodiments, master storage unit 2654 may send commends (e.g., "Sync Signal") to slave storage units 2656, for example, in order to synchronize power distribution of converters 2652 of slave storage units 2656 with power distribution of converter 2652 of master storage unit 2654.

During a power outage, converter 2652 of master storage unit 2654 may sense a disconnection from grid power 2680 (e.g., via a voltage drop on a "Grid Sensing" wire). Then, converter 2652 of master storage unit 2654 may send a signal (e.g., "ADS Signal") to energy control system 2610 to open microgrid interconnection device 2620 (set in backup mode). Then, converter 2652 of master storage unit 2654 may cease grid following mode. Then, energy control system 2610 may open microgrid interconnection device 2620 (set in backup mode) and check for a position feedback signal (e.g., "Position Feedback Signal") to confirm that the microgrid interconnection device 2620 is open (set in backup mode). Then, the position feedback signal may be relayed to converter 2652 of master storage unit 2654. Then, converter 2652 of master storage unit 2654 may start grid forming mode. As mentioned above, in some embodiments, the power characteristics (e.g., voltage magnitude and frequency) of converter 2652 of slave storage units 2656 may be synchronized with the power characteristics of converter 2652 of master storage unit 2654.

After a connection to grid power 2680 is restored, converter 2652 of master storage unit 2654 may sense the grid restoration (e.g., via a voltage applied on the "Grid Sensing" wire). Then, converter 2652 of master storage unit 2654 may cease grid forming mode, and may also jitter the frequency of power in order to restart a reconnection timer. Then, converter 2652 of master storage unit 2654 may send a signal (e.g., "ADS Signal") to energy control system 2610 to close microgrid interconnection device 2620 (set in on-grid mode). Then, energy control system 2610 may close microgrid interconnection device 2620 (set in on-grid mode) and check for a position feedback signal (e.g., "Position Feedback Signal") to confirm that the switch is closed. Then, the position feedback signal may be relayed to converter 2652 of master storage unit 2654. Then, converter 2652 master storage unit 2654 may start phase synchronization in order to reenter grid following mode.

Some power generation systems (e.g., photovoltaic panels or wind turbines) may produce power based on environmental factors (e.g., sun or wind) that are independent of the power demands or status of other portions of the electrical system to which the power generation system is connected. Thus, at times, the amount of power produced by the power generation system may exceed the amount of power consumed by the loads of the electrical system. In some situations, the excess power may be, for example, exported to the electrical grid and/or directed to an energy storage system. However, during a grid outage, for example, the excess power may not be exported to the grid. Although the excess power may be directed to an energy storage system, the energy storage system may store only a finite amount of energy. Thus, in some cases (e.g., during a grid outage when the energy storage system is at capacity), it may be necessary and/or desirable to limit the amount of power being produced by the power generation system so as to prevent damage to the electrical system, to prevent system faults, and/or to prevent a shutdown of the system (e.g., due to excess current, voltage, and/or frequency levels or overcharging of the energy storage system).

Similarly, for some grid-connected electrical systems, it may be desirable or required to have a net zero site consumption at the point of interconnection to the grid. For example, regulations in some jurisdictions may require that a user's local power generation system does not export more power to the grid than the user's local electrical system consumes from the grid. Thus, in a manner similar to that described above with respect to an off-grid system, some grid-connected systems may need to actively control the amount of power produced by the power generation system so that power production does not exceed power consumption.

Some embodiments as described herein may provide an electrical system including an energy control system, an energy storage system, and a power generation system. The energy control system may include a controller that is configured to communicate with the energy storage system and the power generation system. The controller may also receive real-time load consumption information (e.g., from one or more load meters 340 or from one or more remotely-controllable switches 2342 described above) and/or may use collected historical load information (e.g., stored in the time-of-use library described above) to predict load consumption. As mentioned above, the desired amount of power production of the power generation system may depend on the available storage capacity (e.g., charge capacity) of the energy storage system and/or the power consumption of the loads. In some embodiments, the available storage capacity corresponds to a difference between a total storage capacity and a current state of charge of the energy storage system. Accordingly, the controller may determine the desired power production of the power generation system based on, for example, the received or estimated information regarding the storage capacity of the energy storage system and/or the power consumption of the loads. Then, the controller may enable and/or disable the power generation system (or portions thereof) to match the desired power production. In this manner, the power production of the power generation system may be tailored dynamically and in real-time to match the needs of the electrical system, which may increase the efficiency and/or reliability of the system.

Figure 27A:
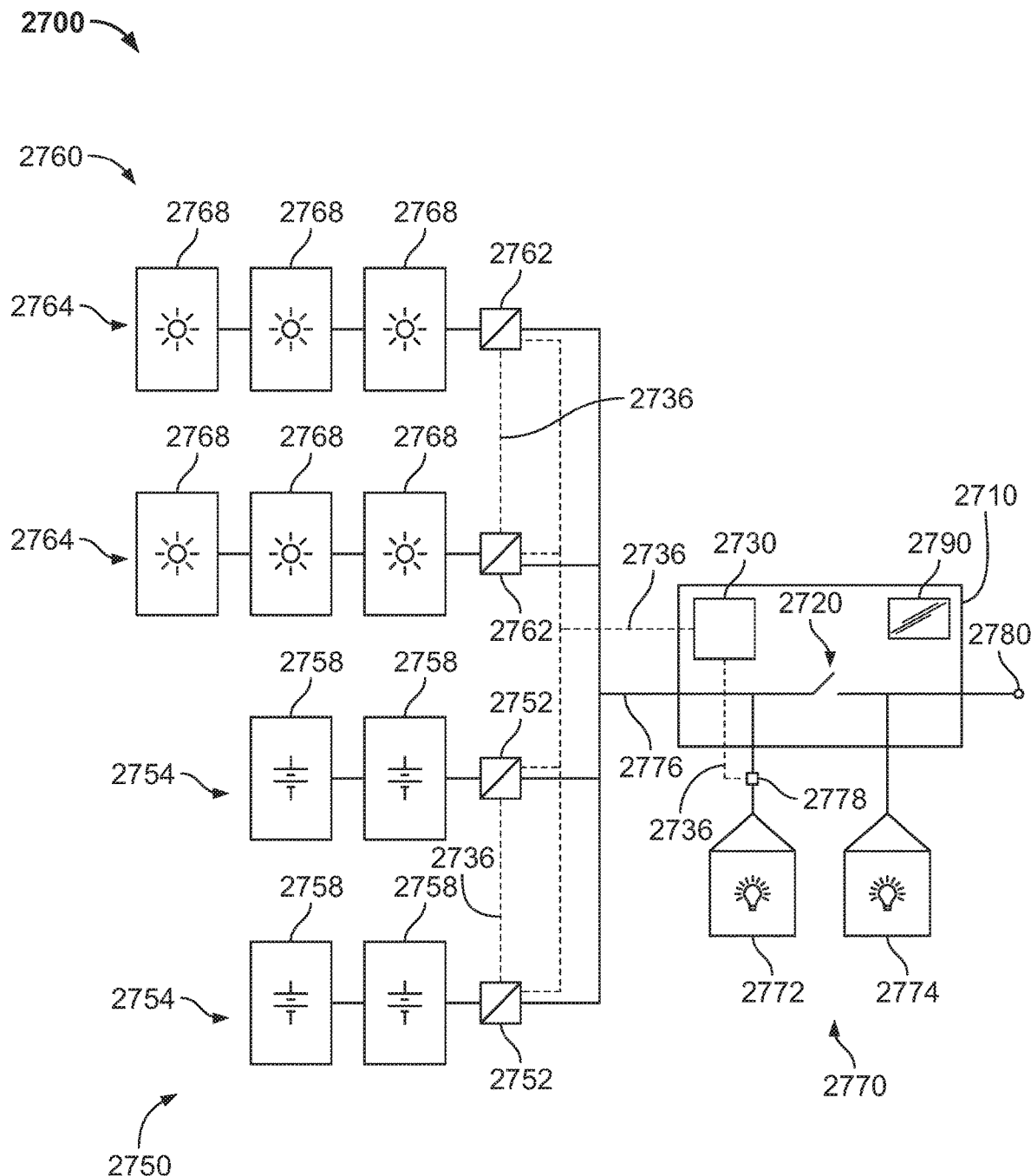
FIG. 27A-27C illustrate an electrical system according to an embodiment.

As shown in FIG. 27A, for example, electrical system 2700 may include an energy control system 2710, an energy storage system 2750, a power generation system 2760, and loads 2770 (e.g., including backup loads 2772 and non-backup loads 2774). Energy control system 2710 may also include a microgrid interconnection device 2720 and may be interconnected to grid power 2780. In some embodiments, energy storage system 2750, power generation system 2760, and loads 2770 may be interconnected via a power bus 2776. Power bus 2776 may be, for example, one or more shared power conductors. In some embodiments, power bus 2776 may be a shared AC power bus.

In some embodiments, energy storage system 2750 and/or power generation system 2760 may be configured to communicate with and/or to be controlled by a controller 2730. Controller 2730 may be or may include, for example, a computer, microcontroller, or other processing device. In some embodiments, controller 2730 may be a photovoltaic monitoring system (e.g., photovoltaic monitoring system 330, described above). In some embodiments, controller 2730 may be or may include features of controller 2330 described above.

Energy storage system 2750 and/or power generation system 2760 may be connected to controller 2730 using, for example, one or more control cables 2736. In some embodiments, control cable 2736 may be, for example, a controller area network (CAN) bus, a power line communication cable (PLC), an RS485 cable, or other cable capable of sending electronic data (e.g., computer-processable data and/or information represented by an analog or digital signal) between controller 2330 and energy storage system 2750 and/or power generation system 2760. In some embodiments, controller 2730 and energy storage system 2750 and/or power generation system 2760 may be configured to communicate wirelessly and may operate on a variety of frequencies, such as Very High Frequency (e.g., between 30 MHz and 300 MHz) or Ultra High Frequency (e.g., between 300 MHz and 3 GHz) ranges, and may be compatible with certain network standards such as cell phone, power-line communication, WIFI™, or BLUETOOTH® wireless networks, for example. As mentioned above, in some embodiments, controller 2730 may also receive real-time load consumption information from a load monitor 2778 via a wired (e.g., control cable 2736) or wireless connection. Load monitor 2778 may be, for example, one or more load meters 340 and/or one or more remotely-controllable switches 2342 as described above.

As shown in FIG. 27A, energy storage system 2750 may include one or more energy storage units 2754 (e.g., a master storage 2654 and one or more slave storage units 2656 described above (see FIG. 26)), and each energy storage unit 2754 may include one or more batteries 2758. In some embodiments, energy storage system 2750 may include one or more converters 2752 (e.g., a bi-directional converter). In some embodiments, converter 2752 may be or may include features of converter 2652 described above. In some embodiments, each energy storage unit 2754 may include a corresponding converter 2752.

In some embodiments, converter 2752 may be configured to send electronic data to and/or receive electronic data from controller 2730. In some embodiments, converter 2752 may be configured to receive electronic data (e.g. commands) from controller 2730, and may be configured to change state (e.g., absorbing power or discharging power) based on the electronic data received. In some embodiments, converter 2752 may also be configured to send electronic data to controller 2730. For example, in some embodiments, converter 2752 may be configured to send to controller 2730 electronic data relating to the state of energy storage system 2750 (e.g., the charge level of batteries 2758).

Figure 27B:
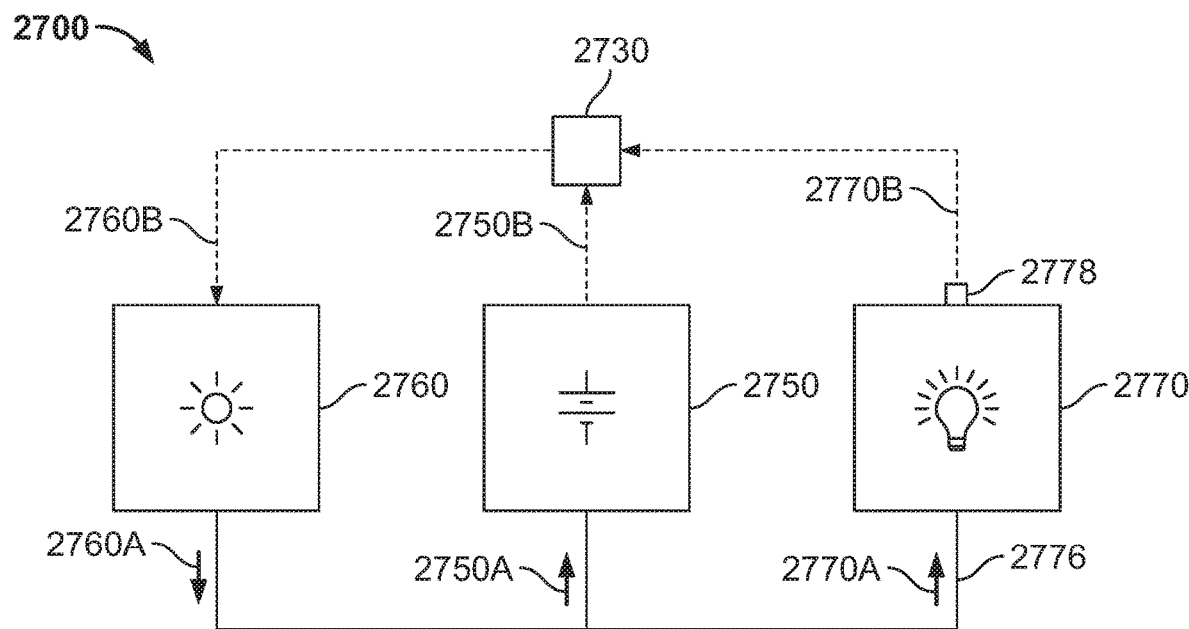
Figure 27C:
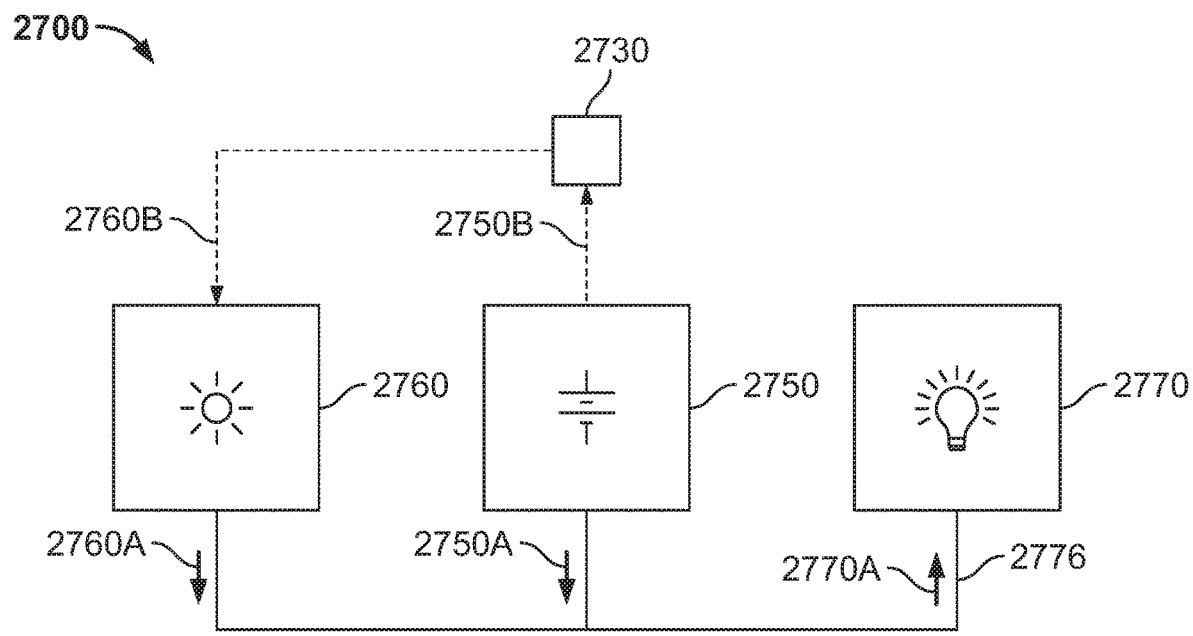
Figure 27D:
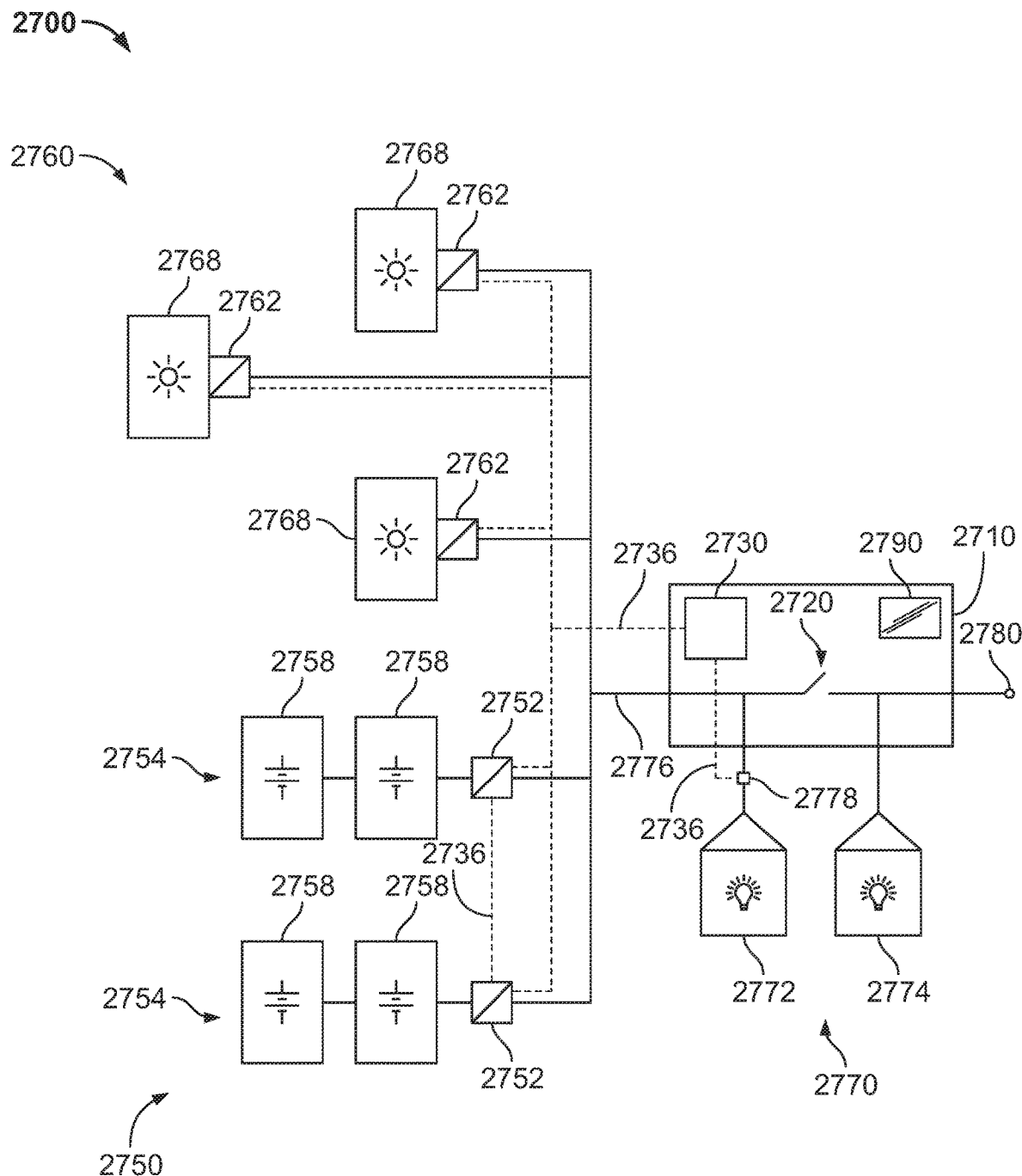
FIG. 27D illustrates an electrical system according to an embodiment.

Power generation system 2760 may include one or more power generation arrays 2764 (e.g., a photovoltaic panel array), and each power generation array 2764 may include one or more power generation units 2768 (e.g., a photovoltaic panel). In some embodiments, power generation system 2760 may include one or more converters 2762. In some embodiments, converter 2762 may be or may include features of converter 2662 described above. In some embodiments, converter 2762 may be, for example, a string inverter associated with multiple photovoltaic panel (as depicted in FIG. 27A), a microinverter associated with or part of a photovoltaic panel (as depicted in FIG. 27D), or the like. In some embodiments, each power generation array 2764 may include a corresponding converter 2762. In some embodiments, each power generation unit 2768 may include a corresponding converter 2762 (e.g., a microinverter). In some embodiments, converter 2762 may be a part of power generation unit 2768. In some embodiments, one, two, three, four, or more power generation units 2768 may be interconnected to a single converter 2762 (e.g., a string inverter). In some embodiments, power generation system 2760 includes one or more power optimizers (not shown) such as, for example, DC power optimizers.

In some embodiments, converter 2762 may be configured to send electronic data to and/or receive electronic data from controller 2730. In some embodiments, converter 2762 may be configured to receive electronic data from controller 2730, and may be configured to change state (e.g., exporting power or not exporting power, increasing or decreasing amount of power exporting) based on the electronic data received. In some embodiments, converter 2762 may also be configured to send electronic data to controller 2730. For example, in some embodiments, converter 2762 may be configured to send to controller 2730 electronic data relating to the state of power generation system 2760 (e.g., the amount of power being exported).

As mentioned above, controller 2730 may be configured to enable and/or disable power generation system 2760 (or portions thereof) to match the desired power production amount. For example, in some embodiments, controller 2730 may be configured to send commands to converter 2762, and converter 2762 may change the amount of power that it exports based on the received commands. As mentioned above, in some embodiments, one, two, three, four, or more power generation units 2768 (e.g., photovoltaic panels) may be interconnected to a single converter 2762 (e.g., a string inverter). Thus, controller 2730 may limit the power export of several power generation units 2768 via communication with a single converter 2762. In some embodiments, however, each power generation unit 2768 (e.g., a photovoltaic panel) may include a corresponding converter 2762 (e.g., a microinverter) that is in communication with controller 2730. In this manner, controller 2730 may limit the power export of each power generation unit 2768 individually, which may facilitate relatively precise control of the total power export of power generation system 2760.

In some embodiments, controller 2730 may also control the amount of power exported by power generation system 2760 (or portions thereof) by opening and/or closing certain remotely controllable switches (e.g., remotely controllable switches 2342 (see FIG. 23)). In this manner, controller 2730 may enable and or disable, for example, the entire power generation system 2760, individual power generation arrays 2764, or individual power generation units 2678, depending on how power generation system 2760 is interconnected to energy control system 2710.

In order to determine the amount of power that is desired to be produced (or is acceptable to be produced) by power generation system 2760, controller 2730 may receive electronic data from other portions of electrical system 2700 and/or may make calculations to determine the desired (or required) power output of power generation system 2760. As shown in FIGS. 27B and 27C, for example, controller 2730 may receive electronic data from energy storage system 2750 and/or load monitor 2778 and may use the data to determine the desired power output 2760A of power generation system 2760.

With reference to FIG. 27B, in some embodiments, controller 2730 may receive electronic data 2750B, 2770B related to energy storage system 2750 and loads 2770, respectively, and may use electronic data 2750B, 2770B to determine the desired power output 2760A of power generation system 2760. For example, controller 2730 may receive electronic data 2750B from energy storage system 2750 and electronic data 2770B from load monitor 2778. Electronic data 2750B may include, for example, information relating to the amount of energy currently stored in energy storage system 2750 and/or the amount of energy that energy storage system 2750 is capable of absorbing (e.g., via charging). Electronic data 2770B may be, for example, the amount of power that loads 2770 are using and/or are expected to use (e.g., based on the time-of-use library described above). In some embodiments, the desired power output 2760A of power generation system 2760 may be the sum of power 2750A capable of being absorbed by energy storage system 2750 and the power 2770A used or predicted to be used by loads 2770. In this manner, power generation system 2760 may simultaneously provide power to loads 2770 while charging energy storage system 2750. Controller 2730 may then send electronic data 2760B to power generation system 2760. Electronic data 2760B may include, for example, data regarding the desired amount of power to be produced, or commands to enable and/or disable certain portions of power generation system 2760 to facilitate production of the desired amount of power.

With reference to FIG. 27C, in some embodiments, controller 2730 may receive electronic data 2750B related only to energy storage system 2750, and may use electronic data 2750B to determine the desired power output 2760A of power generation system 2760. For example, controller 2730 may receive electronic data 2750B from energy storage system 2750. Electronic data 2750B may include, for example, information relating to the amount of energy currently stored in energy storage system 2750, the amount of energy that energy storage system 2750 is capable of absorbing (e.g., via charging), and/or the amount of energy being discharged or predicted to be discharged (e.g., based on the time-of-use library described above) from energy storage system 2750. In some embodiments, the desired power output 2760A of power generation system 2760 may be the power 2750A being discharged by or predicted to be discharged by energy storage system 2750. Controller 2730 may then send electronic data 2760B to power generation system 2760. Electronic data 2760B may include, for example, data regarding the desired amount of power to be produced, or commands to enable and/or disable certain portions of power generation system 2760 to facilitate production of the desired amount of power.

FIG. 27D shows electrical system 2700 in another configuration. Electrical system 2700 as shown in FIG. 27D may include features and/or functionality similar to or the same as electrical system 2700 described above with reference to FIG. 27A-27C. FIG. 27A, for example, shows each power generation array 2764 to have three power generation units 2768 interconnected to a single converter 2762 (e.g., a string inverter). FIG. 27D, for example, shows each power generation unit 2768 to include a corresponding converter 2762 (e.g., a microinverter) that may be, for example, interconnected to, disposed on, or integrally formed with the respective power generation unit 2768.

Figure 28:
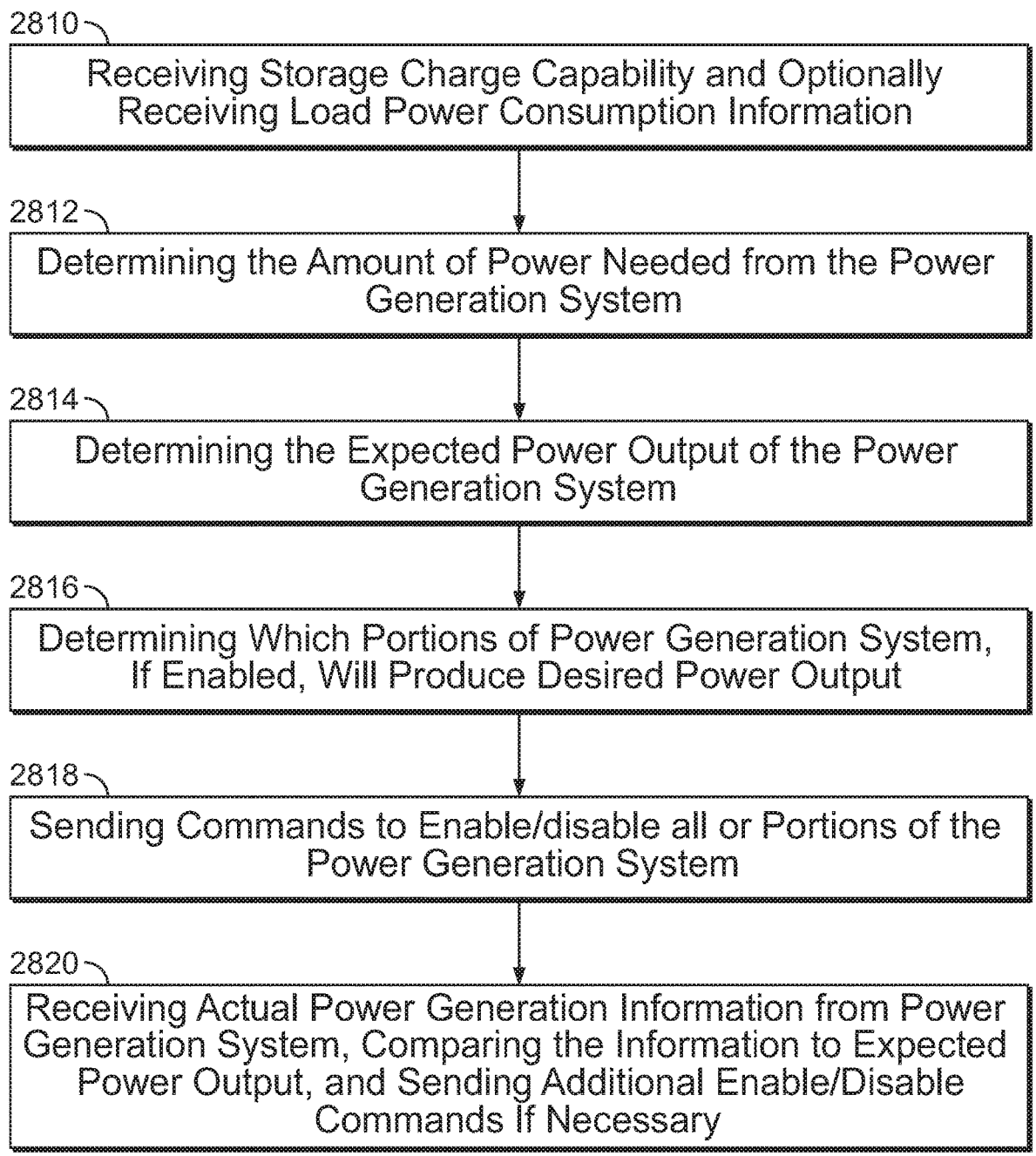
FIG. 28 illustrates a block diagram showing aspects of a method of controlling an electrical system according to an embodiment.

FIG. 28 shows an example block diagram illustrating aspects of a method of controlling an electrical system according to embodiments (e.g., the embodiments shown in FIGS. 27A-27C and/or FIG. 27D).

At step 2810, controller 2730 may receive electronic data relating to energy storage system 2750, power generation system 2760, loads 2770, and/or other components of energy control system 2710 or electrical system 2700. As described above, the data may include, for example, information relating to the amount of energy currently stored in energy storage system 2750, the amount of energy that energy storage system 2750 is capable of absorbing (e.g., via charging), the amount of power that loads 2770 are using and/or are expected to use (e.g., an energy demand), and/or the amount of energy being discharged or predicted to be discharged from energy storage system 2750.

At step 2812, controller 2730 may determine the desired output power 2770A of power generation system 2760. As described above, in some embodiments, the desired power output 2760A of power generation system 2760 may be the sum of power 2750A capable of being absorbed by energy storage system 2750 and the power 2770A (e.g., an energy demand) used or predicted to be used by loads 2770. In some embodiments, the desired power output 2760A of power generation system 2760 may be the power 2750A being discharged by or predicted to be discharged by energy storage system 2750.

At step 2814, controller 2730 may determine the expected power output of power generation system 2760—or portions of power generation system 2760—based on, for example, the time of day, date, predicted weather conditions, measured weather conditions, geographic location, past power generation data, or the like.

At step 2816, after determining the expected power output of power generation system 2760 and/or portions of power generation system 2760, controller 2730 may determine which portions of power generation system 2760 should be enabled in order to produce the desired amount of power output. For example, controller 2730 may calculate the sum of the expected power outputs of two or more portions of power generation system 2760 (e.g., one or more power generation arrays 2764 and/or one or more power generation units 2768), and compare the calculated sum to the desired power output in order to determine if the expected power output for the selected portions is approximately equal to (or within a certain tolerance, e.g., 1%, 2%, 3%, 4%, 5%, or some other tolerance) of the desired power output.

At step 2818, controller 2730 may send commands (e.g., via electronic data 2760B) to power generation system 2760 to enable and/or disable certain portions of power generation system 2760. For example, controller 2730 may command one or more converters 2762 to begin exporting power and/or command one or more converters 2762 to cease exporting power.

At step 2820, controller 2730 may receive actual power generation information from power generation system 2760 (e.g., via electronic data 2760B), and may compare the actual power output to the estimated power output. If the actual power output is higher than the estimated power output, controller 2730 may send additional commands to power generation system 2760 to disable portions of the system to decrease the total power output. Similarly, if the actual power output is lower than the estimated power output, controller 2730 may send additional commands to power generation system 2760 to enable portions of the system to increase the total power output. In some embodiments, a predetermined amount of storage capacity (e.g., 1% to 10% of total storage capacity, or any combination of percentage in between) may be reserved in energy storage system 2750 (e.g., at the high state of charge end of the storage capacity) so that if the actual power output is higher than the predicted power output, energy storage system 2750 may absorb the excess energy. Further, if the actual power output is lower than the predicted power output, controller 2730 may send commands to energy storage system 2750 (e.g., via electronic data 2750B) to discharge power to compensate for the lower than expected power output.

In some embodiments, energy storage system 2750 may include features or follow certain protocols in order to increase the efficiency of the system, to maintain operation of the system, and/or to prolong the life of the system.

Figure 29:
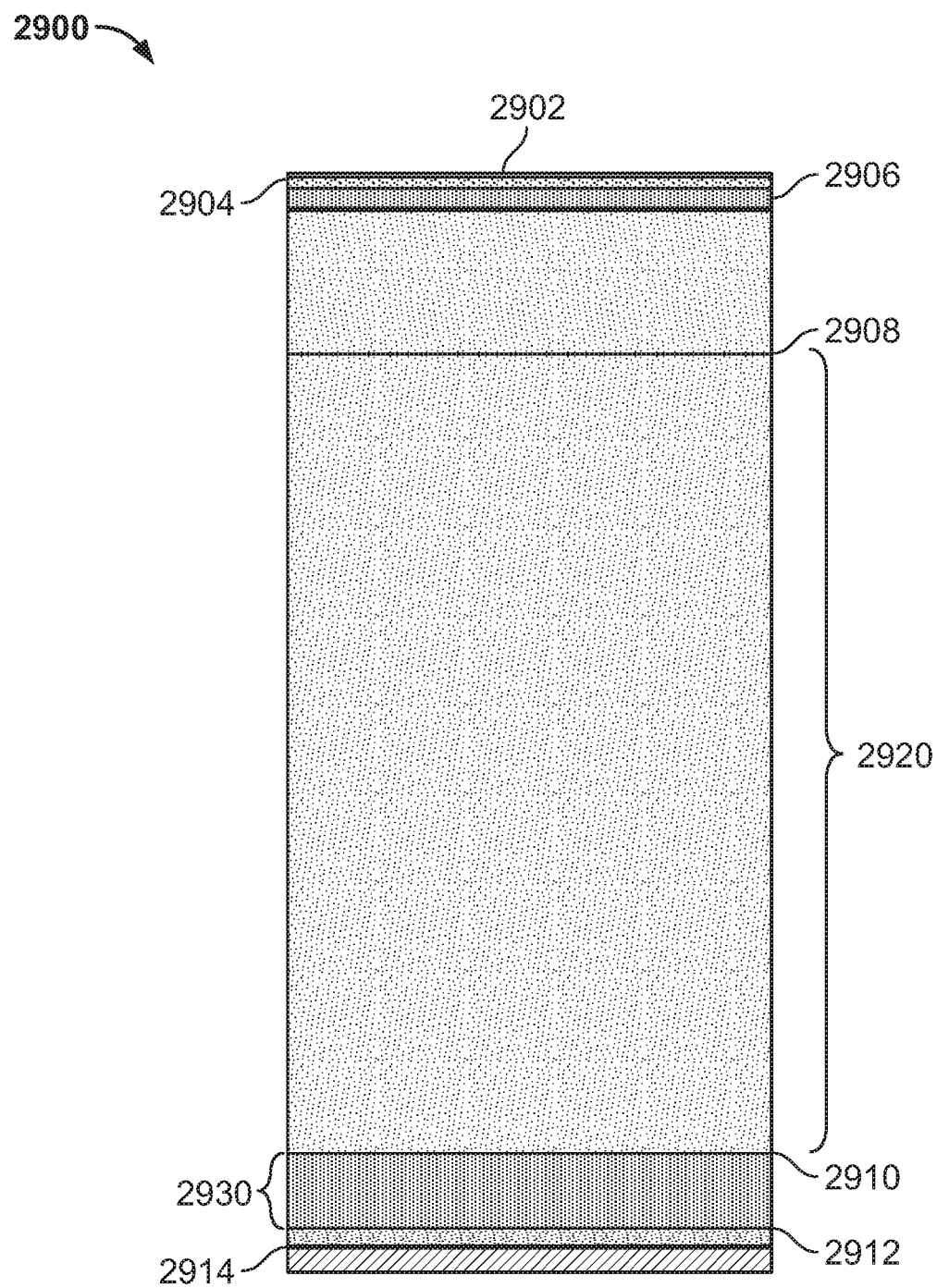
FIG. 29 illustrates a diagram showing aspects of an energy storage system according to an embodiment.

With reference to FIG. 29, for example, energy storage system 2750 may change state or operations based on the amount of energy stored in energy storage system 2750 relative to the capacity of the system (e.g., the charge level or state of charge (SOC)). As shown, in some embodiments, energy storage system 2750 may include an end-of-charge (EOC) or upper limit SOC threshold 2902 (e.g., approximately 100% charge level) where energy storage system 2750 has reached its maximum storage capacity. In some embodiments, energy storage system 2750 may include a high-end-protection threshold 2904 (e.g., any percentage of charge level within approximately 90% to approximately 99% charge level, such as approximately 99% charge level) where energy storage system 2750 may, for example, cease charging and/or take other precautions in order to prevent overcharging of the system and/or to leave a sufficient buffer to absorb sudden increases in power from power generation system 2760. In some embodiments, energy storage system 2750 may include a near-full threshold 2906 (e.g., any percentage of charge level within approximately 90% to 99% charge level, such as approximately 97% charge level) where energy storage system 2750 may, for example, slow charging or take other precautions (e.g., disconnecting from power bus 2776) in order to prevent overcharging of the system. In some embodiments, energy storage system 2750 may include a recharging initiation threshold 2908 (e.g., any percentage of charge level within approximately 85% to approximately 95% charge level, such as approximately 90% charge level) where energy storage system 2750 may, for example, send electronic data (e.g., electronic data 2750B) to controller 2730 to indicate that energy storage system 2750 may be recharged. These threshold levels may be modified as appropriate for a particular energy storage system.

In some embodiments, energy storage system 2750 may include a power bus down threshold 2910 (e.g., any percentage of charge level within approximately 1% to approximately 15% charge level, such as approximately 10% charge level) where energy storage system 2750 may, for example, cease to provide power (e.g., AC power) to loads 2770 via power bus 2776 in order to conserve power. In some embodiments, energy storage system 2750 may include a battery sleep threshold 2912 (e.g., any percentage of charge level within approximately 1% to approximately 10% charge level, such as approximately 3% charge level) where energy storage system 2750 may, for example, enter a sleep mode to further conserve energy until further charging is expected or available. In some embodiments, energy storage system 2750 may be brought out of sleep mode, for example, via a wake signal (e.g., a voltage signal or a logic signal) from energy control system 2710, which may initiate an immediate restart of energy storage system 2750 or a time-delayed restart of the system. In some embodiments, energy storage system 2750 may include an low-end-protection threshold 2914 (e.g., approximately 1% to approximately 10% charge level, such as approximately 1% charge level, or any combination of percentage in between) where energy storage system 2750 may, for example, take precautions in order to prevent damage to the system from excessive discharge. These threshold levels may be modified as appropriate for a particular energy storage system.

In some embodiments, energy storage system 2750 may include a power bus up region 2920 (e.g., between approximately 97%-10% charge level, such as approximately 95% to approximately 10% charge level, approximately 90% to approximately 15% charge level, or any combination of percentage in between) where energy storage system 2750 may, for example, provide power to loads 2770 via power bus 2776. In some embodiments, energy storage system 2750 may include a communication up region 2930 (e.g., between approximately 10%-3% charge level, or any combination of percentage in between) where energy storage system 2750 may, for example, provide power to only the communication systems (e.g., controller 2730) of electrical system 2700. These threshold levels may be modified as appropriate for a particular energy storage system.

In some embodiments, the thresholds and regions described above may vary, and may be dynamically adjusted (e.g., by a user or according to program logic) based on, for example, environmental conditions, state of grid connection, battery performance, operational mode, or other factors.

In some embodiments, energy storage system 2750 may include a self-consumption mode (e.g., a solar self-consumption mode), where energy storage system 2750 may attempt to minimize usage of grid power 2780 by, for example, maximizing the amount of energy captured by power generation system 2760 and discharge from energy storage system 2750. In self-consumption mode, energy storage system 2750 may permit a relatively wide depth of charge and discharge of batteries 2758 in order to increase the amount of energy that may be captured and utilized as a result of power generation system 2760. In some embodiments, for example, the range of charge and discharge of batteries 2758 may be between approximately 99%-1% or any combination of percentage in between. In self-consumption mode, if energy storage system 2750 has reached its desired storage capacity (e.g., the near-full threshold), excess power produced by power generation system 2760 may be, for example, exported to electrical grid 2780 or may be curtailed (e.g., using the power limiting procedures described above) to match the demand of loads 2770 and/or the discharge of energy from energy storage system 2750.

In some embodiments, energy storage system 2750 may include a backup mode, where energy storage system 2750 may reserve a set amount energy in energy storage system 2750 in order to maintain certain operations of electrical system 2700 during, for example, a grid power outage. In backup mode, energy control system 2710 may permit a narrower depth of charge and discharge of batteries 2758 in order to maintain prolonged operation of the system during an outage. In some embodiments, the range of charge and discharge of batteries 2758 may be between approximately 95%-10% or any combination of percentage in between.

In backup mode, energy storage system 2750 may reserve energy (e.g., communication up region) to maintain power to communication systems of electrical system 2700. In some embodiments, such a reserve of power may be used to maintain logic communication between power generation system 2760 and energy storage system 2750. In this manner, power generation system 2760 may detect (e.g., automatically) the sunrise and communicate the event to energy storage system 2750. Then, energy storage system 2750 may, for example, change state or operation based on the anticipated power production of power generation system 2760. In some embodiments, energy storage system 2750 may begin to provide power to loads 2770 via power bus 2776 even if energy storage system 2750 is below the power bus down threshold, based on a detected sunrise or based on an estimated time of sunrise. In some embodiments, energy storage system 2750 may attempt to provide power to loads 2770 via power bus 2776 based on the estimated sunrise time and, if power production is less than expected (or none), may cease to provide power to power bus 2776. Then, energy storage system 2750 may periodically reattempt to provide power to power bus 2776 while monitoring power production. The length of each periodic reattempt to provide power may be inversely proportional to the load consumption during the reattempt (e.g., higher loads may result in a shorter attempt duration, and lighter loads may result in a longer attempt duration).

In some embodiments, energy storage system 2750 may include a time-of-use mode. Time of use mode may permit customers and utilities to support grid resilience by, for example, charging energy storage system 2750 at off-peak power use hours and discharging energy storage system 2750 at peak power use hours. In some embodiments, the depth of charge and discharge of batteries 2758 may be relatively narrow in order to increase lifespan of energy storage system 2750 due to more frequent cycling. In some embodiments, the range of charge and discharge of batteries 2758 may be between approximately 85%-20% or any combination of percentage in between.

In some embodiments, energy storage system 2750 may attempt to limit the degradation of battery sub units 2754 equally in system 2700. For example, controller 2730 may send equal power commands to each storage converter 2752. As another example, over the battery lifetime, battery health information received by the controller may also be used to modify the cycling characteristics across the multiple battery sub units 2758 in energy storage system 2750.

In some embodiments, controller 2730 may command energy storage system 2750 (e.g. via converter 2752) to increase or decrease battery charge or discharge rates for individual batteries 2758, which may be forecasted dynamically based on forecasted PV generation and the battery recommended peak SOE level (e.g. <80%). For example, the charge rate of the battery may be reduced from a C/2 rate to a C/3 rate from forecasted photovoltaic energy generation by generation system 2760.

Figure 31A:
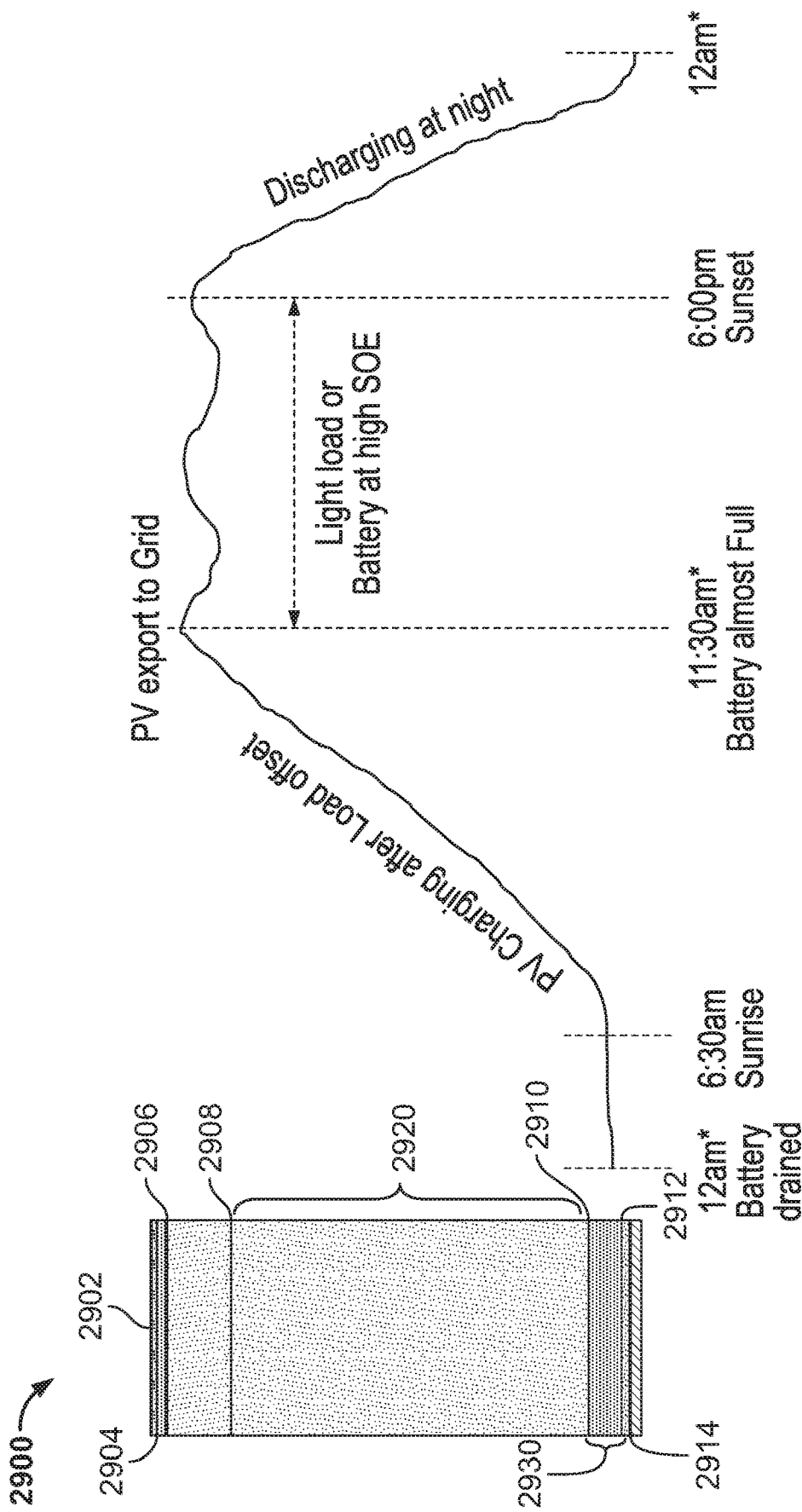
FIGS. 31A-31B illustrate schematics of the state of charging of an energy storage system according to embodiments.
Figure 31B:
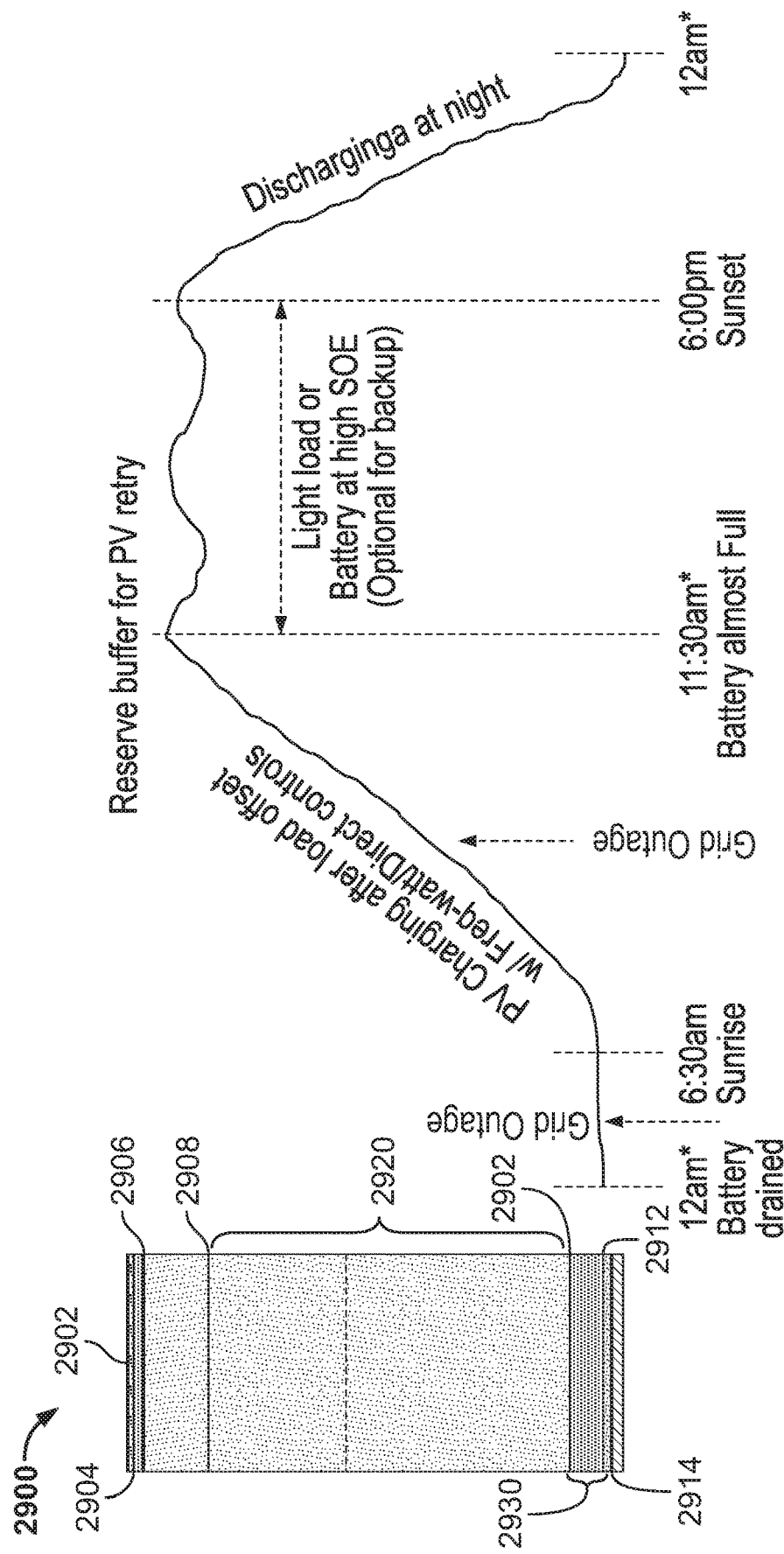

Referring to FIGS. 31A-31B, for example, the amount of energy stored in energy storage system 2750 may change over a period of time (e.g., a day) and may, for example, correspond to the quantity and duration of sunlight available to power generation system 2760, the power required by loads 2770, and/or the mode of operation of the energy storage system (e.g., self-consumption, backup, or time-of-use). FIG. 31A, for example, shows the state of charging of energy storage system 2750 operating in a self-consumption mode (described above). FIG. 31B, for example, shows the state of charging of energy storage system 2750 operating in a backup mode (described above). As shown, the amount of energy stored in energy storage system 2750 may increase after sunrise until energy storage system 2750 reaches its capacity (or a predetermined level). Then, power may be, for example, exported to grid 2780 and/or power production of power generation system 2760 may be curtailed as described above. After sunset, energy may be discharged from energy storage system 2750, for example, to power loads 2770. As shown in FIG. 31B, for example, energy storage system 2750 may include a dynamic reserve setting, which may reserve a varying amount of energy in energy storage system 2750 (e.g., to maintain certain operations of electrical system 2700) that may be determined and set based on, for example, the time of day at which a power outage occurs, the predicted amount of power required by loads 2770, or other factors.

Figure 30:
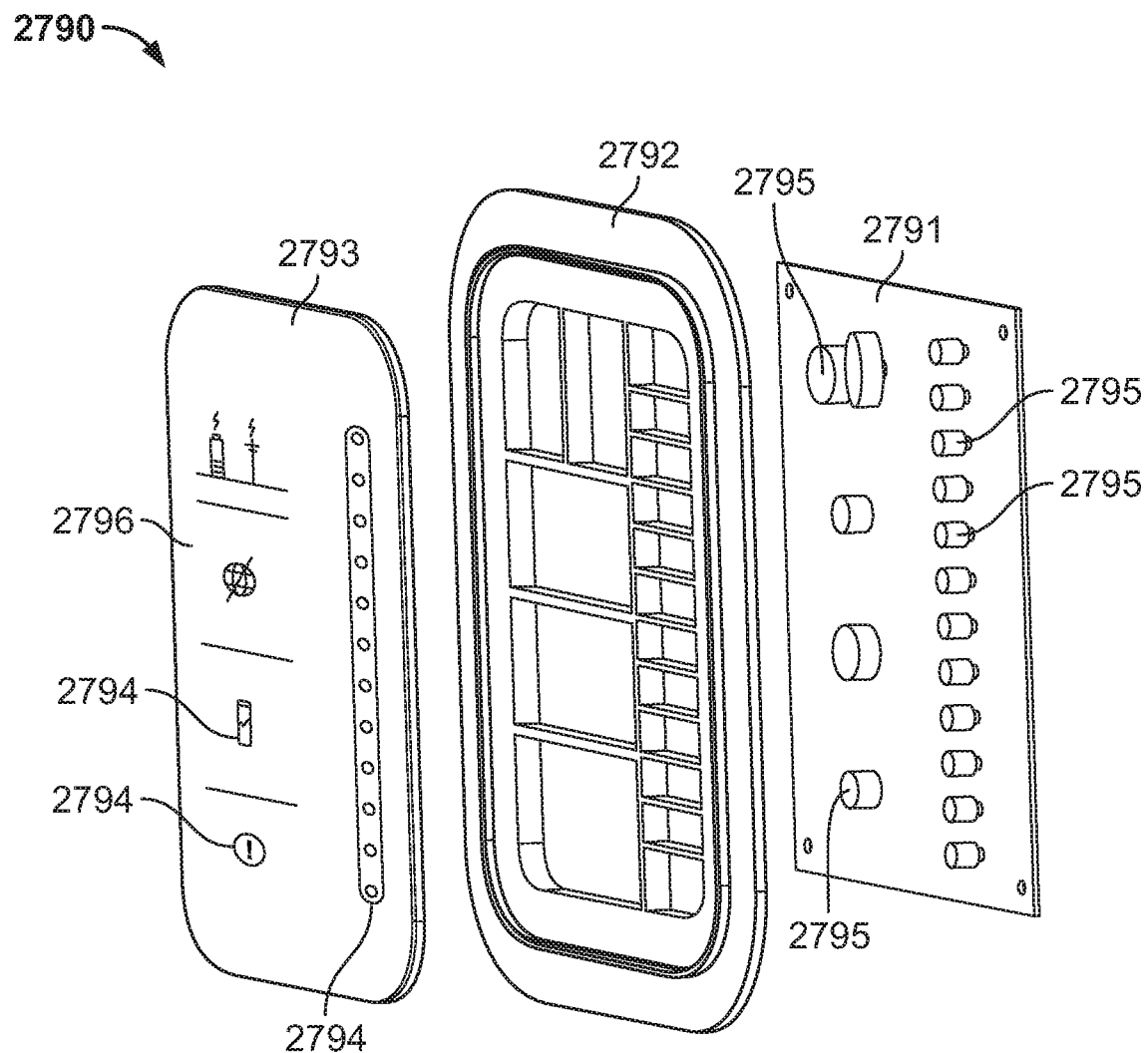
FIG. 30 illustrates a user interface for an electrical system according to an embodiment.

As shown in FIG. 27A and FIG. 30, for example, electrical system 2700 may include a user interface 2790. In some embodiments, user interface 2790 may include, for example, a printed circuit board (PCB) 2791, a carrier portion 2792 (e.g., made of plastic, metal, or the like) within which the PCB 2791 may be seated and which may include adhesive to affix to electrical system 2700, a lens 2793 (e.g., made of polycarbonate, glass, plastic, or the like) covering the PCB 2791 and/or carrier portion 2792, and/or a silkscreen 2796 that may be attached to a front or rear side of the lens 2793 and that may include one or more symbols 2794 to provide information to a user. In some embodiments, user interface 2790 may include a visual display for communicating with or displaying information to a user. In some embodiments, user interface 2790 may include one, two, three, four, or more lights 2795 (e.g., LEDs, which may be disposed on PCB 2791) for conveying information to a user. In some embodiments, user interface 2790 may include light pipes that receive and transfer light from lights 2795 to provide even illumination at lens 2793. In some embodiments, the number of illuminated lights may indicate the storage level of energy storage system 2750 (e.g., 0% to 100%). In some embodiments, the color of lights may indicate the status (e.g., charging or discharging) of energy storage system 2750. For example, green may indicate charging and yellow or red may indicate discharging. Specific lights may indicate certain status whether illuminated or non-illuminated, for example, back-up mode operation if illuminated or grid connected mode if non-illuminated. In some embodiments, the lights may turn on and off (e.g., flash) in sequence, and the rate (e.g., every 0.2 s, 0.5 s, 1 s, 2 s, or 3 s) at which the lights turn on and off may indicate, for example, the rate of charge and/or discharge (e.g., 5 kW, 3 kW, or 1 kW) of energy storage system 2750. In some embodiments, lights 2795 may change color based on ambient conditions. In some embodiments, user interface 2790 may include a motion sensor (e.g., passive infrared sensor) to detect user motion proximate to energy storage system housing. In some embodiments, lights 2795 may change color when the motion sensor detects user motion.

In some embodiments, user interface 2790 may include electromechanical buttons for receiving input from a user. In some embodiments, user interface 2790 may include a touch screen display for receiving user input and communicating information to the user. In some embodiments, user interface 2790 may include a combination of touch screens, electromechanical buttons, and/or visual displays. In some embodiments, user interface 2790 may include motion detectors configured to detect the presence of a user. In some embodiments, user interface 2790 may include sensor configured to detect user gestures. In some embodiments, user interface 2790 may include a light sensor that detects the intensity of ambient light, and the brightness of user interface 2790, for example, may adjust based on the intensity of ambient light. In some embodiments, a user may manipulate user interface 2790 to change the state of, or operations of electrical system 2700.

In some embodiments, user interface 2790 may be disposed on energy control system 2710. In some embodiments, user interface 2790 may be disposed on energy storage system 2750. In some embodiments, electrical system 2700 may include multiple user interfaces 2790 disposed at various locations of electrical system 2700.

In some embodiments, user interface 2790 may display information regarding the status of electrical system 2700, or portions of electrical system 2700. For example, in some embodiments, user interface 2790 may display information regarding the amount of energy stored in energy storage system 2750, the mode of energy storage system 2750 (e.g., self-consumption, backup, or time-of-use), whether energy control system 2710 is connected to grid power 2780, whether energy control system 2710 is connected to a connected to a local or remote network (e.g., network 890 described above) or server, and/or whether electrical system 2700 is operating as expected (e.g., whether or not there are any system warnings and/or alerts).

Figure 32:
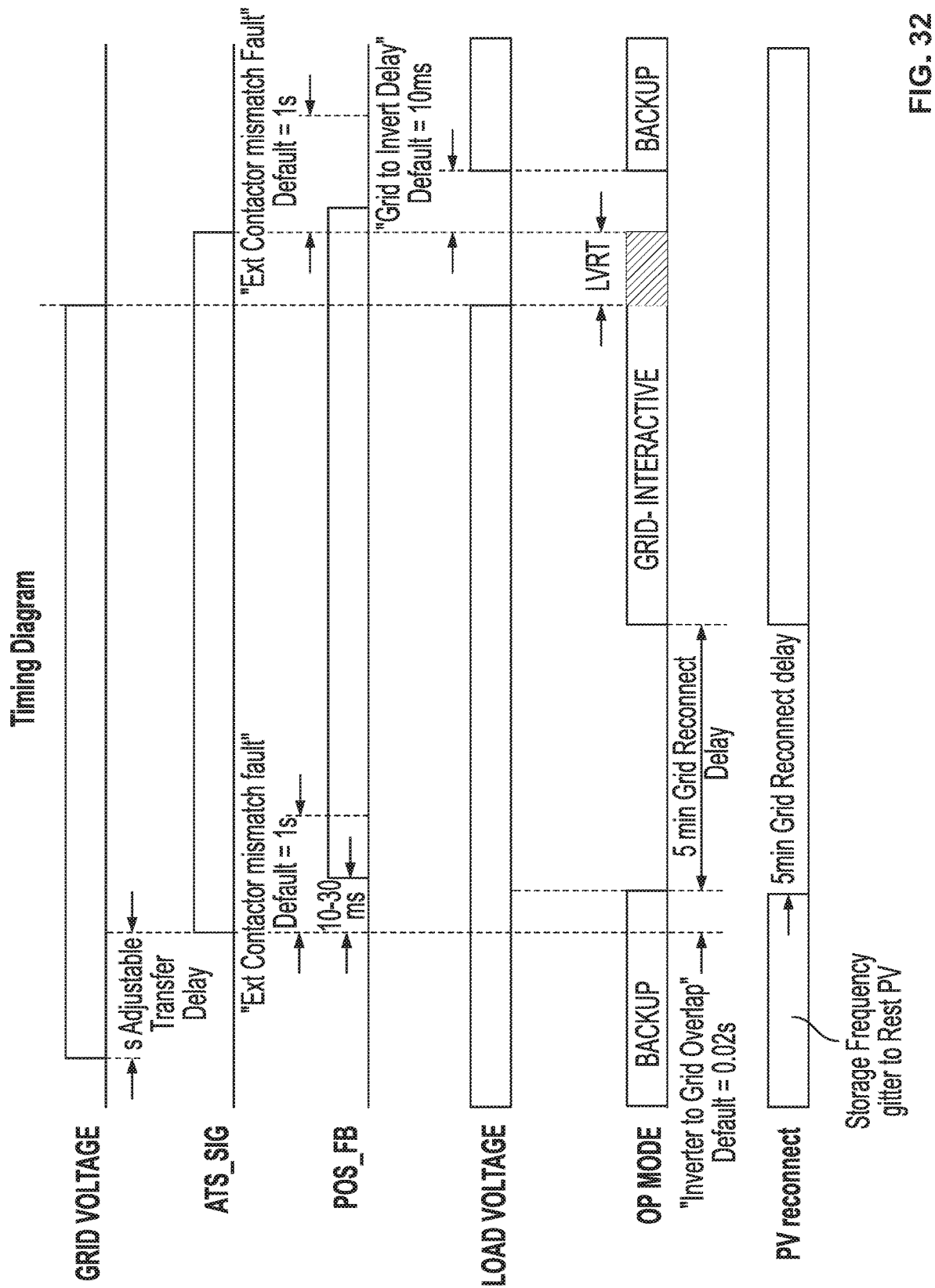
FIG. 32 illustrates a timing diagram showing aspects of an electrical system according to an embodiment.

FIG. 32 shows a diagram illustrating the timing of certain operations and changes of state of certain portions of an electrical system when switching from a non-backup mode (e.g., receiving power from the electrical grid) to a backup mode (e.g., not receiving power from the electrical grid). In some embodiments, energy control units as described herein (e.g., energy control unit 2610 described above) may permit a rapid transition from grid power to backup power (e.g., stored in energy storage system 2750 described above), and may coordinate the transition, for example, by synchronizing changing of the state of the microgrid interconnection device (e.g., microgrid interconnection device 2620 described above) with other changes to the electrical system. In some embodiments, energy control units as described herein may enable a transition from grid power to backup power in less than 1 second. In some embodiments, energy control units as described herein may enable a transition from grid power to backup power in less than 0.5 seconds. In some embodiments, energy control units as described herein may enable a transition from grid power to backup power in approximately 1/30th of a second.

Figure 35:
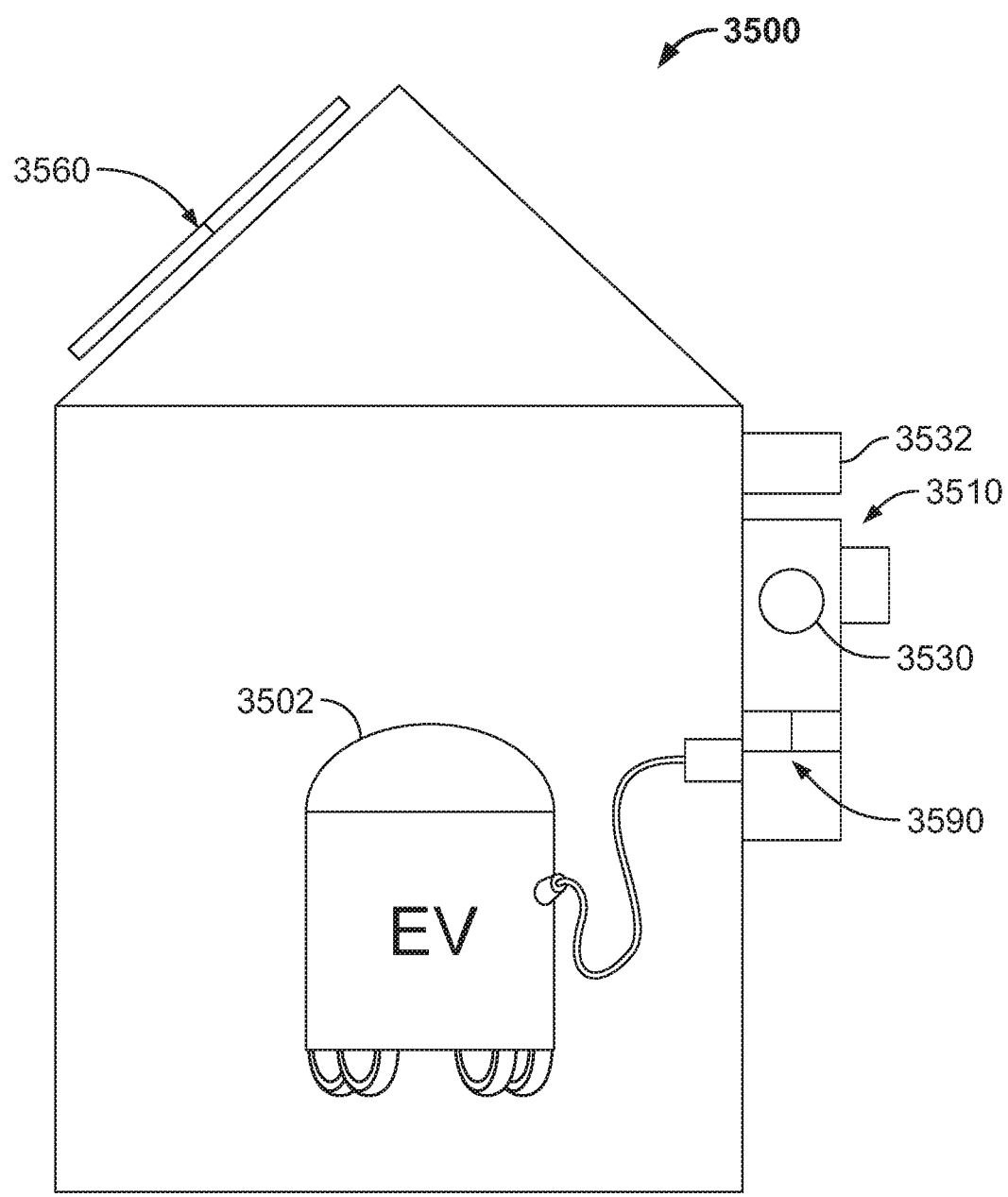
FIG. 35 illustrates an electrical system according to an embodiment.

FIG. 35 shows and electrical system 3500 according to some embodiments.

Electrical system 3300 may include the same or similar features as the electrical system embodiments described herein. In some embodiments, electrical system 3500 may include an energy control system 3510, an energy storage system (e.g., any one of the energy storage system embodiments shown in FIGS. 1-8 and 26-27D) electrically coupled to energy control system 3510, and a PV system 3360 (a power generation system) electrically coupled to energy control system 3510. In some embodiments, energy control system 3510 may be configured to receive electrical energy from a utility grid, the energy storage system, and PV system 3560. In some embodiments, energy control system 3310 may control the distribution of electrical energy received from energy storage system 3350, PV system 3360, and utility grid 384 to a plurality of loads via a backup load interconnection and a non-backup load interconnection (e.g., any one of the energy storage system embodiments shown in FIGS. 1-8 and 26-27D).

In some embodiments, energy control system 3510 may be configured to provide metered and controllable EV charger integration. For example, in some embodiments, energy control system 3510 may include an EV charger system 3590 configured to charge and/or discharge electrical energy between energy control system 3510 and an electric vehicle 3502. In some embodiments, EV charger system 3590 may include the same or similar features as EV charger system 2590 shown in FIG. 25. For example, EV charger system 3590 may include an EV charger port and an EV charger cable having an EV charger connector connected to the EV charger port and an EV charger handle 2598 connected to electric vehicle 3502.

In some embodiments, energy control system 3510 may include a controller 3530 to monitor and control the status and power consumption of EV charger system 3590. In some embodiment, energy control system 3510 may include a PV monitoring system 3532 configured to monitor the status and performance of PV system 3560 and/or control operation of PV system 3560. In some embodiments, controller 3530 may be linked to PV monitoring system 3532 such that controller 3530 receives electronic data related to PV system 3560. In some embodiments, electronic data related to PV system 3560 may indicate current power output of PV system 3560 and a predicted power output of PV system 3560.

Figure 36A:
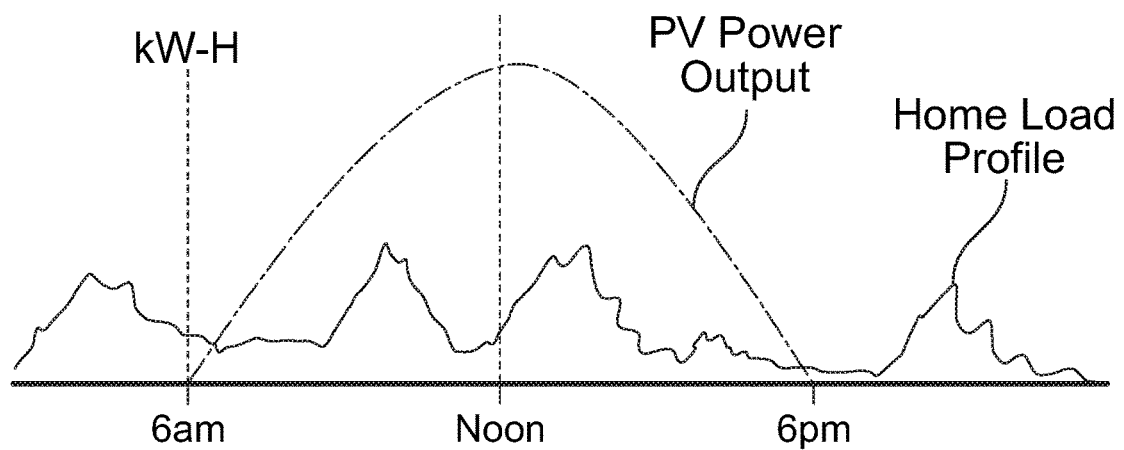
FIGS. 36A-36C illustrate graphs showing charging profiles of an electrical system according to embodiments.
Figure 36B:
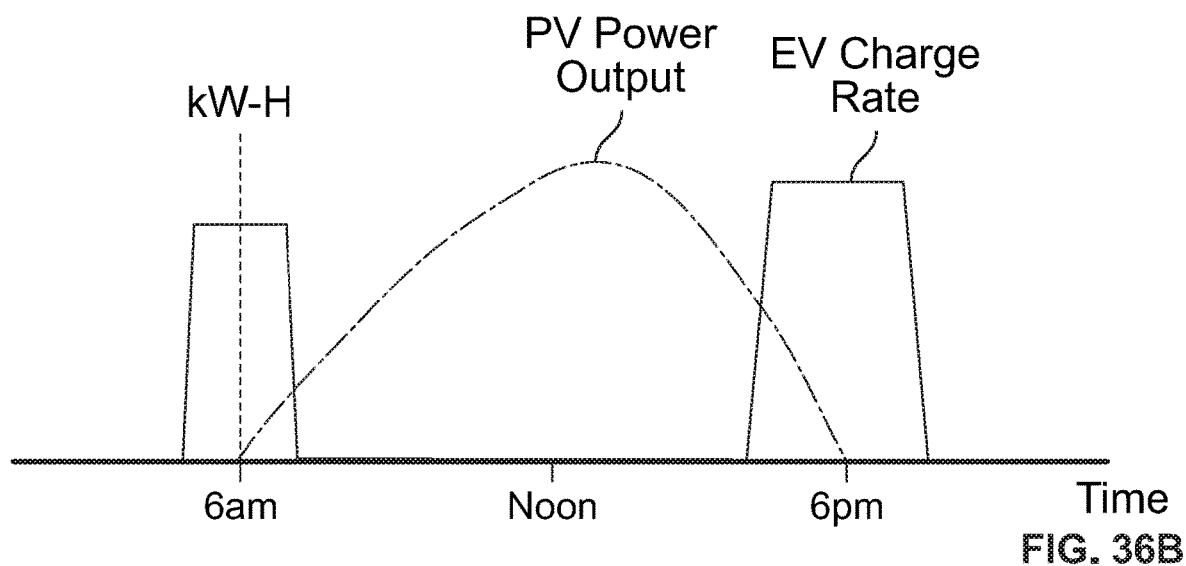
Figure 36C:
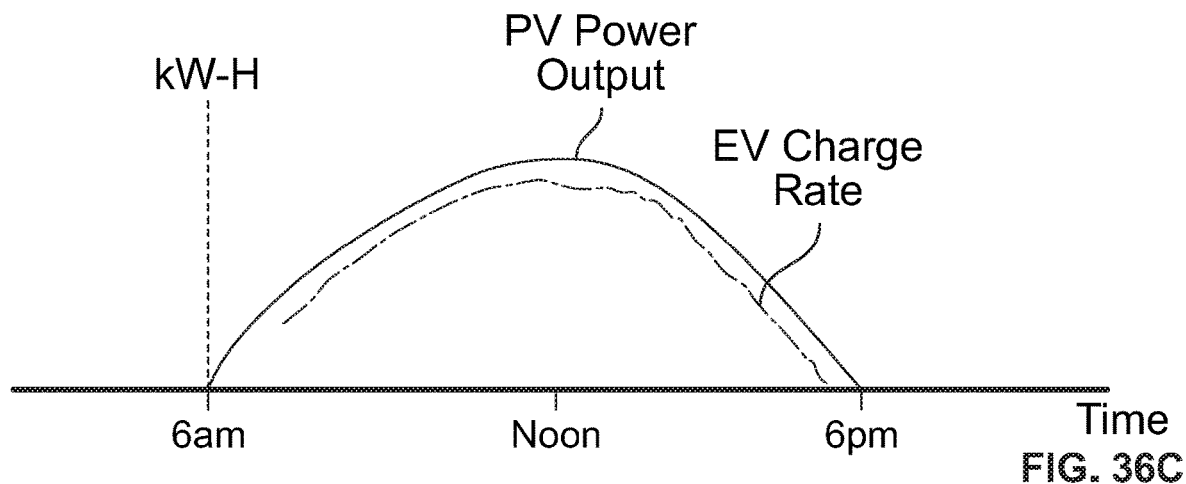

As shown in FIGS. 36A-C, for example, electronic data related to PV system 3560 may indicate the PV power output over the course of a selected time period (e.g., a day). As shown in FIG. 36A for example, the power output of PV system 3560 during a typical day increases to a peak power output around midday and then decreases to approximately zero at night. However, during the same time, the home load profile (e.g., energy demand by the home) fluctuates throughout day, not necessarily matching the power output of PV system 3560 such that there is an excess between the power output of PV system 3560 and the energy demand of the home throughout the day.

In some embodiments, controller 3530 may control status and power consumption of EV charger system 3590 based on electronic data related to PV system 3560 such as adjusting the power consumption based on the available excess power output between the PV system 3560 and the energy demand of the home shown in FIG. 36A. For example, controller 3530 may set EV charger system 3590 to an on-demand mode or a dynamic mode. In some embodiments, under the dynamic mode, controller 3530 may prioritize the EV charger system 3590 as a special load to receive any excess power from PV system 3560 over other non-prioritized loads.

In some embodiments, controller 3530 may set in the EV charger system 3590 to the on-demand mode so that electric vehicle 3502 is charged at a predetermined rate for a period of time selected by a user. In some embodiments, when set in on-demand mode, EV charger system 3590 may allow electric vehicle 3502 to receive power from either the utility grid, the electronic storage system, or PV system 3560 to meet the user demand. As shown in FIG. 36B for example, in some embodiments, under on-demand mode, EV charger system 3590 may charge electric vehicle 3502 at a fixed charging rate (e.g., a maximum charging rate) over a user-selected period of time, even when the monitored PV power output is minimal.

In some embodiments, controller 3530 may set the EV charger system 3590 to a dynamic mode such that EV charger system 3590 dynamically charges the electric vehicle 3502 based on the electronic data related to PV system 3560. As shown in FIG. 36C for example, in some embodiments, under the priority mode, EV charger system 3590 may charge electric vehicle 3502 at a dynamic rate that corresponds to the monitored PV power output of PV system 3560. For example, as the PV power output of PV system 3560 increases, the charging rate by EV charger system 3590 increases proportionally. In some embodiments, under the dynamic mode, controller 3530 may not allow power received from the utility grid to be transferred to the EV charger system 3590.

Figure 37:
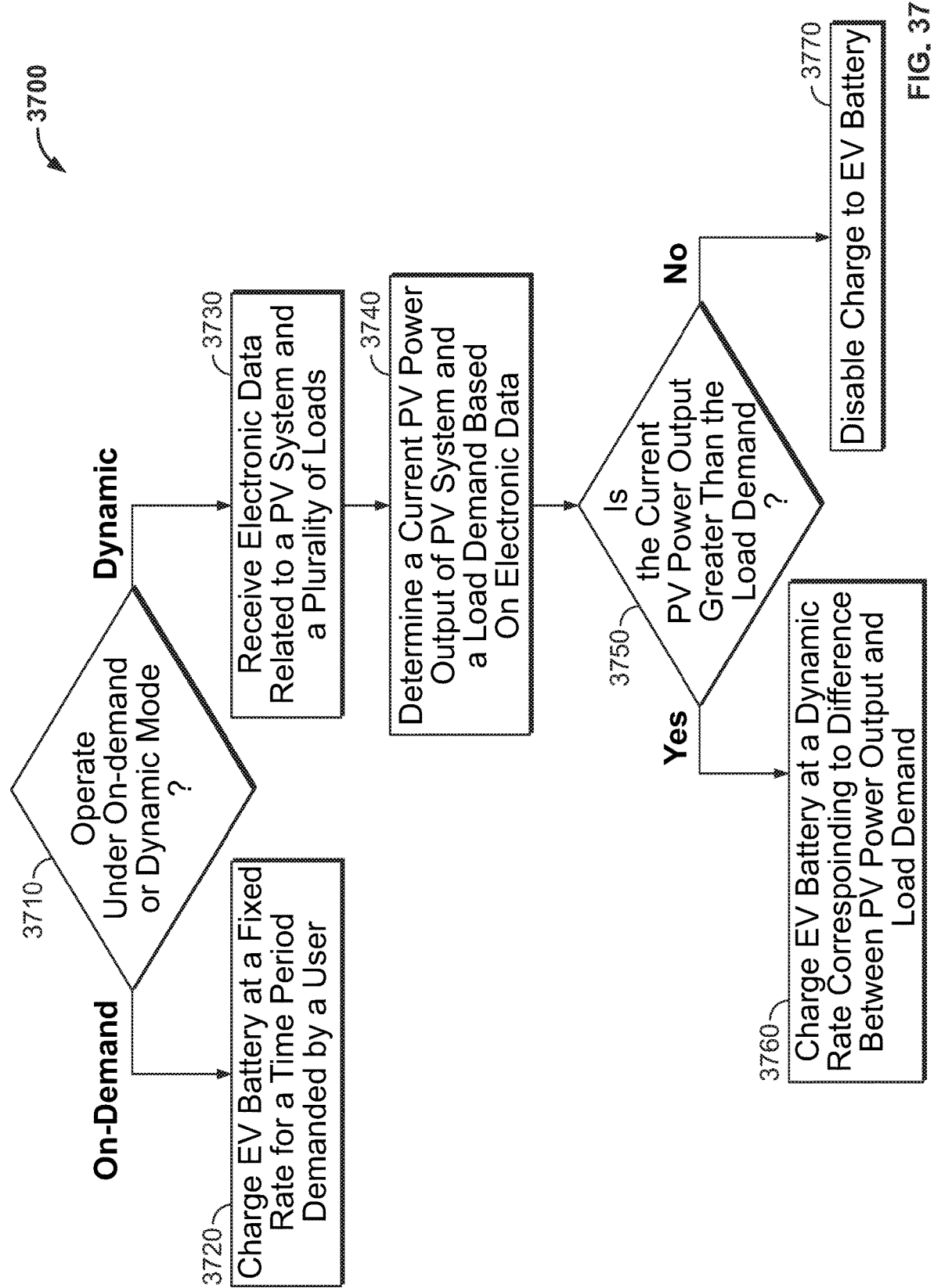
FIG. 37 illustrates a block diagram showing aspects of a method of controlling an energy control system according to an embodiment.

FIG. 37 shows an example block diagram illustrating aspects of a method 3700 of controlling EV charger system 3590 (e.g., as shown in FIGS. 25 and 35).

In some embodiments, method 3700 may include a step of 3710 of determining whether EV charger system 3590 is operating under the on-demand mode or the dynamic mode. In some embodiment, step 3710 may include monitoring a user selection from a user device indicating whether EV charger system 3590 is operating under the on-demand mode or the dynamic mode, and the determination of operating mode may be based on the user selection. In some embodiments, step 3710 may include receiving electronic data related to PV system 3560, the energy storage system, utility grid, and/or the plurality of loads, and the determination of operating mode may be based on the electronic data.

In some embodiments, after determining that EV charger system 3590 is set in the on-demand mode, method 3700 may include a step 3720 of charging the battery of electric vehicle 3502 at a fixed rate for a time period demanded by a user. For example, in some embodiments, a user may demand to charge the battery of electric vehicle 3502 at a maximum charge rate for a selected period of time, and in response, EV charger system 3590 charges the battery of electric vehicle 3502 at the maximum charge rate for the selected period of time. In some embodiments, step 3720 may include using EV charger system 3590 to charge the battery of electric vehicle 3502.

In some embodiments, after determining that EV charger system 3590 is set in the dynamic mode, method 3700 include a step 3730 of receiving electronic data related to PV system 3560 and/or the plurality of loads. In some embodiments, the electronic data related to the PV system 3560 may include electronic data captured by PV monitoring system 3532. In some embodiments, the electronic data related to the plurality of loads may be data captured by load meters or data stored in memory of controller 3530.

In some embodiments, method 3700 may include a step 3740 of determining current PV power output of PV system 3560 and a load demand based on the electronic data received in step 3730. In some embodiments, step 3740 may include applying one or more algorithms to the electronic data received in step 3730 to determine the load demand and the current PV power output.

In some embodiments, method 3700 may include a step 3750 of determining whether the current PV power output is greater than the load demand. In some embodiments, the current PV power output and the load demand used in step 3750 are based on the determinations made in step 3740.

In some embodiments, if the current PV power output is greater than the load demand, method 3700 may include a step 3760 of charging the battery of electric vehicle 3502 at a dynamic rate corresponding to the excess difference between the current PV power output and the load demand. For example, in some embodiments, the charging rate under step 3760 may be proportional to the excess difference, such that as the difference between the current PV power output and the demand increases, the charging rate increases, as well. In some embodiments, step 3760 may include using the EV charge system 3590 to charge the battery of electric vehicle 3502. In some embodiments, step 3750 may include interrupting power distribution from the utility grid to the EV charger system 3590.

In some embodiments, if the current PV power output is less than the load demand, method 3700 may include a step 3770 of disabling charge to the battery of electric vehicle 3502. In some embodiments, step 3770 may include disabling the EV charger system 3590 to disable charge to electric vehicle 3502. In some embodiments, step 3770 may include actuating a switch electrically coupled to EV charger system 3590 to an open position.

Figure 40:
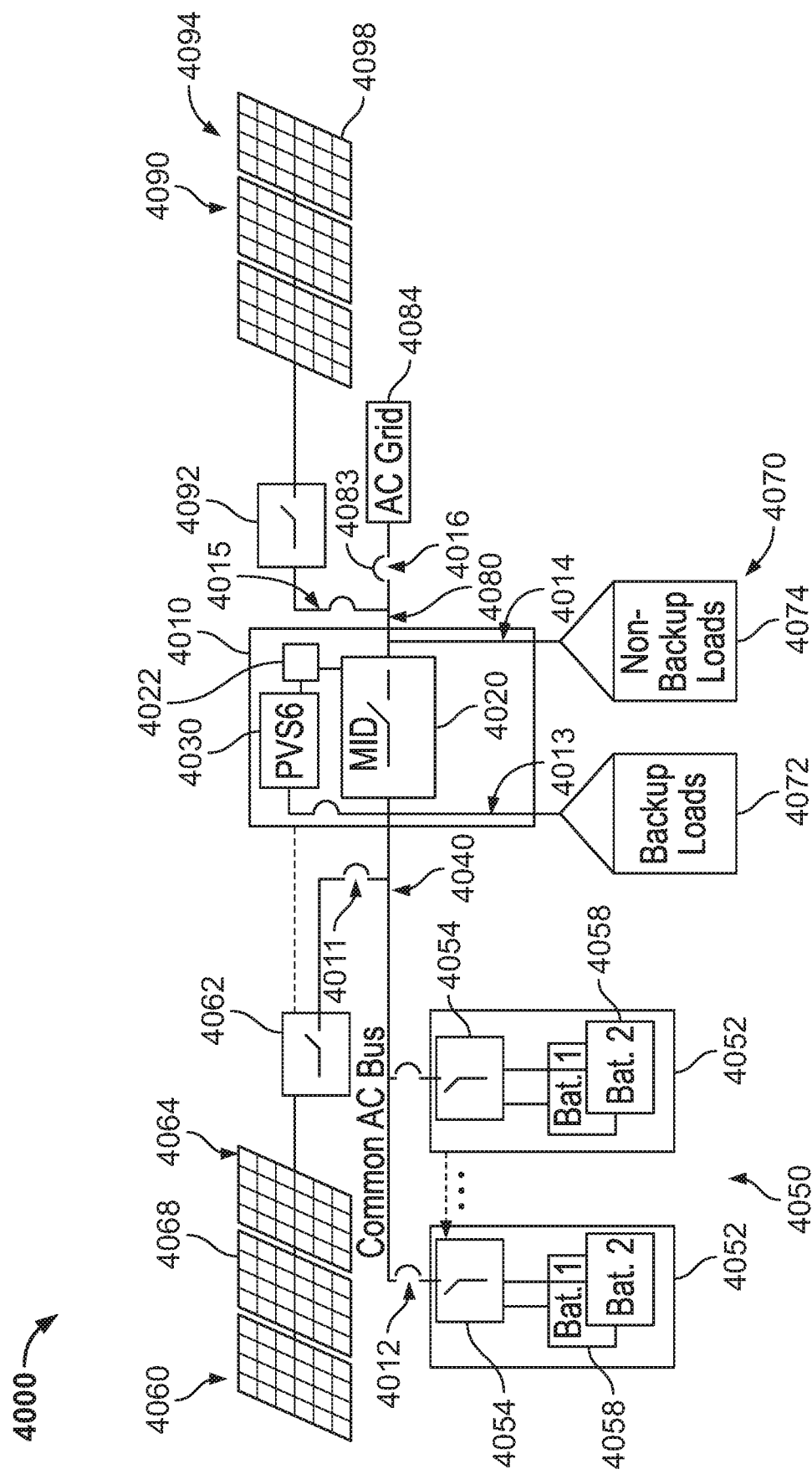
FIG. 40 illustrates an electrical system according to an embodiment.

FIG. 40 shows an electrical system 4000 according to some embodiments. Electrical system 4000 may include the same or similar features as the embodiments of the electrical systems described herein (e.g., any one of electrical systems 100-3300). In some embodiments, electrical system 4000 may include an energy control system 4010. In some embodiments, electrical system 4000 may include an energy storage system 4050 electrically coupled to energy control system 4010. In some embodiments, electrical system 4000 may include a backup PV system 4060 electrically coupled to energy control system 4010. In some embodiments, electrical system 4000 may include a plurality of loads 4070 electrically coupled to energy control system 4010. In some embodiments, the plurality of loads 4070 may be separated into a plurality of backup loads 4072 and a plurality of non-backup loads 4074. In some embodiments, electrical system 4000 may include a non-backup PV system 4090 electrically coupled to energy control system 4010.

In some embodiments, backup PV system 4060 may include one or more power generation arrays 4064 (e.g., a photovoltaic panel array), and each power generation array 4064 may include one or more power generation units 4068 (e.g., a photovoltaic panel). In some embodiments, backup PV system 4060 may include one or more PV converters 4062. In some embodiments, PV converter 4062 may include the features of any one of the converters (e.g., converters 2662, 2762) described herein.

In some embodiments, non-backup PV system 4090 may include one or more power generation arrays 4094 (e.g., a photovoltaic panel array), and each power generation array 4094 may include one or more power generation units 4098 (e.g., a photovoltaic panel). In some embodiments, non-backup PV system 4090 may include one or more PV converters 4092. In some embodiments, PV converter 4092 may include the features of any one of the converters (e.g., converters 2662, 2762) described herein.

In some embodiments, energy storage system 4050 may include one or more storage units 4052. In some embodiments, storage unit 4052 may include one or more batteries 4058. In some embodiments, storage unit 4052 may include a storage converter 4054 configured to adjust a charging rate and a discharging rate of the one or more batteries 4058.

In some embodiments, energy control system 4010 may include a backup power bus 4040 electrically coupled to backup PV system 460 via a backup PV interconnection 4011, energy storage system 4050 via a storage interconnection 4012, and the plurality of backup loads 4072 via a backup load interconnection 4013. In some embodiments, energy control system 4010 may include a non-backup power bus 4080 electrically coupled to the plurality of non-backup loads 4074 via a non-backup load interconnection 4014, non-backup PV system 490 via a non-backup PV interconnection 4015, and a utility grid 4084 via a grid interconnection 4016. Any one of interconnections 4011-4016 may include an AC bus, a panel, a sub-panel, a circuit breaker, any type of conductor, or a combination thereof.

In some embodiments, energy control system 4010 may include a microgrid interconnection device 4020 (e.g., an automatic transfer or disconnect switch) electrically coupled to backup power bus 4040 and non-backup power bus 4080, such that microgrid interconnection device 4020 is electrically coupled to backup PV interconnection 4011, storage interconnection 4012, backup load interconnection 4013, non-backup load interconnection 4014, non-backup PV interconnection 4015, and grid interconnection 4016. In some embodiments, microgrid interconnection device 4020 may include any combination of switches, relays, and/or circuits to selectively connect and disconnect interconnections 4011-4016.

In some embodiments, microgrid interconnection device 4020 may be configured to operate under an on-grid mode, in which microgrid interconnection device 4020 electrically connects the backup power bus 4040 to the non-backup power bus 4080. In some embodiments, when operating under the on-grid mode, microgrid interconnection device 4020 may be configured to distribute electrical energy received from utility grid 4084 and non-backup PV system 4090 to backup loads 4072. In some embodiments, when operating under the on-grid mode, microgrid interconnection device 4020 may be configured to distribute electrical energy received from energy storage system 4050 and backup PV system 4060 to non-backup loads 4074.

In some embodiments, microgrid interconnection device 4020 may be configured to operate under a backup mode, in which microgrid interconnection device 4020 electrically disconnects non-backup power bus 4080 from backup power bus 4040. In some embodiments, when operating under the backup mode, microgrid interconnection device 4020 may disrupt electrical energy received from non-backup PV system 4090 from reaching backup loads 4072. In some embodiments, when operating under the backup mode, microgrid interconnection device 4020 may disrupt electrical communication between backup loads 4072 and utility grid 4084. In some embodiments, when operating under the backup mode, microgrid interconnection device 4020 may disrupt electrical energy received from energy storage system 4050 and backup PV system 4060 from reaching non-backup loads 4074.

In some embodiments, energy control system 4010 may include a controller 4022 in communication with microgrid interconnection device 4020 and configured to control the distribution of electrical energy between energy storage system 4050, backup PV system 4060, the plurality of loads 4070, utility grid 4084, and non-backup PV system 4090. In some embodiments, controller 4022 may be configured to detect the status (e.g., power outage or voltage restoration) of grid interconnection 4016 and switch microgrid interconnection device 4020 between the on-grid mode and the backup mode based on the status of grid interconnection 4016. If the status of grid interconnection 4016 indicates a power outage, controller 4022 may be configured to switch microgrid interconnection device 4020 to the backup mode. If the status of grid interconnection 4016 indicates a voltage restoration, controller 4022 may be configured to switch microgrid interconnection device 4020 to the on-grid mode.

In some embodiments, energy control system 4010 may include a PV monitoring system 4030 in communication with backup PV system 4060 and/or non-backup PV system 4090 such that PV monitoring system 4030 receives electronic data related to backup PV system 4060 and/or non-backup PV system 4090. In some embodiments, controller 4022 may be linked to PV monitoring system 4030 to receive the electronic data related to backup PV system 4060 and/or non-backup PV system 4090. In some embodiments, controller 4022 may control distribution of energy based on the electronic data related to backup PV system 4060 and/or non-backup PV system 4090.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An energy control system, comprising:
   a grid interconnection electrically coupled to a utility grid;
   a backup power interconnection electrically coupled to a backup power source;
   a backup load interconnection electrically coupled to at least one backup load;
   a non-backup load interconnection electrically coupled to at least one non-backup load;
   a microgrid interconnection device electrically coupled to the grid interconnection, the backup power interconnection, the backup load interconnection, and the non-backup load interconnection; and
a controller in communication with the microgrid interconnection device,
wherein the microgrid interconnection device is configured to switch between: (1) an on-grid mode electrically connecting the grid interconnection and the backup power interconnection to the backup and non-backup load interconnections, and (2) a backup mode electrically disconnecting the grid interconnection and the non-backup load interconnection from the backup power interconnection.

2. The energy control system of claim 1, wherein the controller is configured to detect a power outage at the grid interconnection, and upon detecting the power outage, the controller is configured to switch the microgrid interconnection device from the on-grid mode to the backup mode.

3. The energy control system of claim 2, wherein the controller is electrically coupled to the microgrid interconnection device and in communication with a converter of the backup power source, and the controller is configured to exchange information with the converter of the backup power source to detect the power outage at the grid interconnection.

4. The energy control system of claim 2, wherein the controller is electrically coupled to the microgrid interconnection device, and the controller is configured to monitor the operating status of the grid interconnection to detect the power outage at the grid interconnection.

5. The energy control system of claim 1, wherein the backup load interconnection comprises a plurality of remotely-controllable switches electrically coupled to a plurality of backup loads, and
wherein each of the remotely-controllable switches is configured to switch between: (1) a closed position electrically connecting a respective backup load to the microgrid interconnection device, and (2) an open position electrically disconnecting the respective backup load from the microgrid interconnection device.

6. The energy control system of claim 5, wherein the controller is in communication with the plurality of remotely-controllable switches, and upon detecting the power outage at the grid interconnection, the controller is configured to switch one or more of the plurality of remotely-controllable switches from the closed position to the open position.

7. The energy control system of claim 5, wherein the controller is in communication with a user device, and upon receiving an input from the user device, the controller is configured to switch one or more remotely-controllable switches from the open position to the closed position or from the closed position to the open position.

8. The energy control system of claim 1, wherein the backup load interconnection comprises an electric vehicle charging port configured to charge electrical energy through the backup load interconnection to an electric vehicle and discharge electrical energy from the electric vehicle to the backup load interconnection.

9. The energy control system of claim 1, wherein the backup power source comprises a photovoltaic (PV) power generation system, and the backup power interconnection is configured to receive electrical energy generated by the PV power generation system.

10. The energy control system of claim 1, wherein the backup power source comprises an energy storage system, and the backup power interconnection is configured to receive electrical energy discharged from the energy storage system.

11. The energy control system of claim 1, further comprising:
an enclosure housing the grid interconnection, the backup power interconnection, the backup load interconnection, the non-backup load interconnection, the microgrid interconnection device, and the controller.

12. The energy control system of claim 1, further comprising:
a non-backup power interconnection electrically coupled to a non-backup power source and the microgrid interconnection device,
wherein the microgrid interconnection device is configured to electrically connect the non-backup power interconnection to the backup and non-backup load interconnections during the on-grid mode and electrically disconnect the non-backup power interconnection from the backup and non-backup load interconnections during the backup mode.

13. An electrical system, comprising:
a power generation system including a plurality of photovoltaic (PV) panel arrays configured to generate and supply power and a converter configured to adjust an output of the power supplied from the plurality of PV panel arrays;
an energy storage system configured to store power supplied by the power generation system; and
an energy control system in communication with the power generation system and the energy storage system,
wherein the energy control system comprises a controller configured to receive electronic data from the energy storage system and configured to transmit a command to the converter of the power generation system to adjust a power output of one or more of the PV panel arrays based on the electronic data from the energy storage system.

14. The electrical system of claim 13, wherein the electronic data from the energy storage system indicates an available storage capacity of the energy storage system, wherein the available storage capacity corresponds to a difference between a total storage capacity and a current state of charge of the energy storage system.

15. The electrical system of claim 14, wherein the command transmitted by the controller indicates a desired power output of the power generation system corresponding to the available storage capacity of the energy storage system.

16. The electrical system of claim 14 wherein the energy control system comprises a load interconnection electrically coupled to a plurality of loads configured to consume power,
wherein the energy control system is configured to receive power supplied from the power generation system and the energy storage system, and the energy control system is configured to distribute the received power to the plurality of loads through the load interconnection.

17. The electrical system of claim 16, wherein the controller is configured to receive electronic data indicating an energy demand associated with the plurality of loads.

18. The electrical system of claim 13 wherein the controller determines a predicted power output of the power generation system based on a forecasted or an instantaneous PV generation by the plurality of PV panel arrays.

19. An electrical system, comprising:

an energy control system;

a photovoltaic (PV) power generation system electrically coupled to the energy control system, the PV power generation system configured to generate power; and an energy storage system electrically coupled to the energy control system, the energy storage system having one or more energy storage units, wherein each storage unit comprises:
- a battery configured to be charged by the power generated by the power generation system and configured to discharge power to the energy control system, and
- a storage converter configured to adjust a charging rate and a discharging rate of the battery, wherein the energy control system comprises a controller configured to receive electronic data from the PV power generation system, the energy storage system, or both, and the controller is configured to transmit a command to the storage converter of at least one energy storage unit to adjust the charging rate or discharging rate of the battery, wherein the energy control system is configured to operate in an on-grid mode electrically connecting the PV power generation system to a utility grid and a backup mode electrically disconnecting the PV power generation system from the utility grid, wherein the electronic data indicates a current state of charge of the battery, and the controller is configured to cease discharge of the battery when the current state of charge reaches a first lower threshold during the on-grid mode and a second lower threshold during the backup mode, wherein the second lower threshold is greater than the first lower threshold.

20. The electrical system of claim 19, wherein the electronic data indicates a predicted amount of power generated by the PV power generation system, and the command transmitted by the controller adjusts the charging rate or discharging rate of the battery based on the predicted amount of power generated by the PV power generation system.

21. The electrical system of claim 19, wherein the controller is configured to cease charging the battery when the current state of charge reaches a first upper threshold during the on-grid mode and a second upper threshold during the backup mode, wherein the second upper threshold is greater than the first upper threshold.

22. The electrical system of claim 19, wherein the electrical control system further comprises:
- a backup load interconnection electrically coupled to at least one backup load; and
- a non-backup load interconnection electrically coupled to at least one non-backup load, wherein the controller is configured to receive load consumption data from the backup and non-backup load interconnections, and the controller is configured to transmit a command to the storage converter of at least one energy storage unit to adjust the charging rate or discharging rate of the battery based on the load consumption data.

* * * * *